United States Patent
Lee et al.

(10) Patent No.: US 10,529,098 B2
(45) Date of Patent: Jan. 7, 2020

(54) METHOD AND APPARATUS FOR PERFORMING TILE BINNING FOR PATH RENDERING

(71) Applicant: Samsung Electronics Co., Ltd., Suwon-si (KR)

(72) Inventors: Jaedon Lee, Yongin-si (KR); Jeongjoon Yoo, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 578 days.

(21) Appl. No.: 14/943,679

(22) Filed: Nov. 17, 2015

(65) Prior Publication Data

US 2016/0307342 A1 Oct. 20, 2016

(30) Foreign Application Priority Data

Apr. 14, 2015 (KR) ........................ 10-2015-0052459

(51) Int. Cl.
*G06T 11/20* (2006.01)
*G06T 11/00* (2006.01)
*G06T 11/40* (2006.01)

(52) U.S. Cl.
CPC .......... *G06T 11/203* (2013.01); *G06T 11/001* (2013.01); *G06T 11/40* (2013.01); *G06T 2210/12* (2013.01)

(58) Field of Classification Search
CPC ....... G06T 11/40; G06T 11/203; G06T 17/00; G06T 11/001; G06T 11/00
See application file for complete search history.

(56) References Cited

U.S. PATENT DOCUMENTS

| | | | | |
|---|---|---|---|---|
| 6,483,519 B1 * | 11/2002 | Long | ...................... | G06T 11/40 345/619 |
| 6,784,884 B1 * | 8/2004 | Hsieh | .................... | G06T 15/005 345/421 |
| 7,167,171 B2 * | 1/2007 | Heim | ...................... | G06T 11/40 345/418 |
| 7,301,537 B2 | 11/2007 | Strom et al. | | |
| 7,408,553 B1 * | 8/2008 | Toksvig | .................. | G06T 11/40 345/423 |
| 8,059,119 B2 | 11/2011 | Barone et al. | | |
| 8,072,452 B1 * | 12/2011 | Brown | .................... | G06T 17/20 345/419 |

(Continued)

FOREIGN PATENT DOCUMENTS

| | | |
|---|---|---|
| EP | 2 985 735 A2 | 2/2016 |
| EP | 2 985 735 A3 | 3/2016 |

(Continued)

OTHER PUBLICATIONS

Extended European Search Report dated Oct. 6, 2016, in counterpart European Application No. 161654165 (6 pages, in English).

*Primary Examiner* — Abderrahim Merouan
(74) *Attorney, Agent, or Firm* — Harness, Dickey, & Pierce, P.L.C.

(57) ABSTRACT

A method and apparatus to perform tile binning for tile-based rendering include obtaining information about paths defining an object to be rendered. The method classifies one of the paths into a first group and another of the paths into a second group based on shapes of the paths, and performs the tile binning based on the classification.

29 Claims, 37 Drawing Sheets

(56) References Cited

U.S. PATENT DOCUMENTS

| | | | |
|---|---|---|---|
| 8,139,058 B2 | 3/2012 | Cai et al. | |
| 9,892,534 B2* | 2/2018 | Yoo | G06T 11/203 |
| 2002/0145616 A1* | 10/2002 | Doan | G06T 11/40 345/629 |
| 2004/0164985 A1* | 8/2004 | Kato | G06T 11/40 345/441 |
| 2006/0244748 A1* | 11/2006 | Long | G06T 11/40 345/422 |
| 2006/0256115 A1* | 11/2006 | Cao | G06T 11/20 345/442 |
| 2007/0146378 A1* | 6/2007 | Sorgard | G06T 15/00 345/581 |
| 2009/0046098 A1* | 2/2009 | Barone | G06T 11/40 345/420 |
| 2010/0265254 A1* | 10/2010 | Liland | G06T 11/40 345/441 |
| 2011/0242109 A1* | 10/2011 | Huang | G06T 11/203 345/442 |
| 2011/0285724 A1* | 11/2011 | Kilgard | G06T 15/005 345/443 |
| 2011/0285736 A1* | 11/2011 | Kilgard | G06T 15/005 345/584 |
| 2011/0298813 A1* | 12/2011 | Barringer | G06T 15/005 345/506 |
| 2012/0206455 A1* | 8/2012 | Shreiner | G06T 15/005 345/420 |
| 2013/0113799 A1* | 5/2013 | Woo | G06T 15/005 345/421 |
| 2014/0015838 A1 | 1/2014 | Woo et al. | |
| 2014/0043342 A1* | 2/2014 | Goel | G06T 9/00 345/501 |
| 2014/0160125 A1* | 6/2014 | Yoo | G06T 11/203 345/423 |
| 2014/0267259 A1 | 9/2014 | Frascati et al. | |
| 2014/0333620 A1* | 11/2014 | Park | G06T 15/04 345/422 |
| 2014/0347357 A1* | 11/2014 | Kim | G06T 15/005 345/420 |
| 2015/0077420 A1* | 3/2015 | Bolz | G06T 11/203 345/442 |
| 2015/0178961 A1* | 6/2015 | Karras | G06T 11/203 345/442 |
| 2016/0042561 A1* | 2/2016 | Yoo | G06T 11/203 345/426 |

FOREIGN PATENT DOCUMENTS

| | | |
|---|---|---|
| GB | 2469525 A | 10/2010 |
| KR | 10-0762811 B1 | 10/2007 |
| KR | 10-2012-0135819 A | 12/2012 |
| KR | 10-2013-0051275 A | 5/2013 |
| KR | 10-2014-0009634 A | 1/2014 |

* cited by examiner

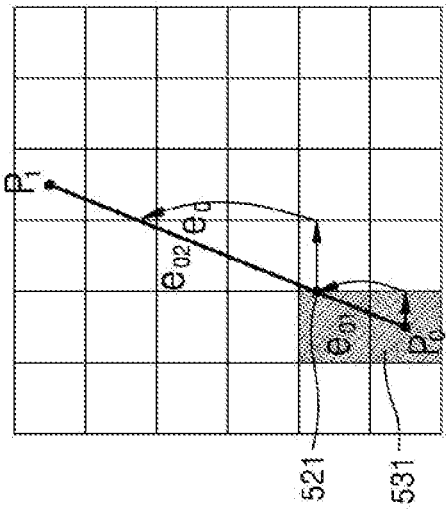
FIG. 5B
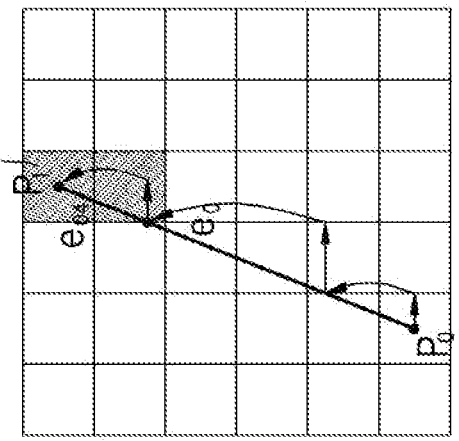
FIG. 5E
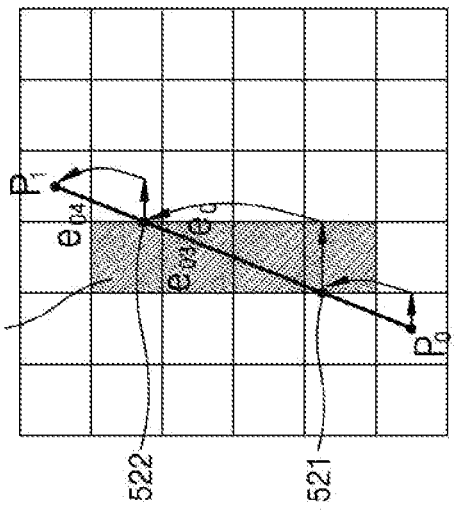
FIG. 5D
FIG. 5A
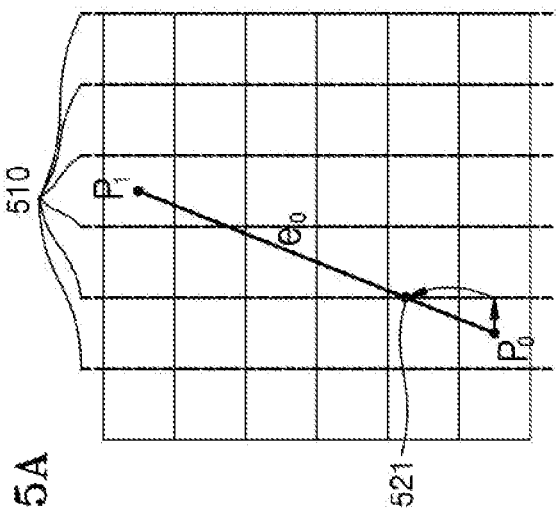
FIG. 5C
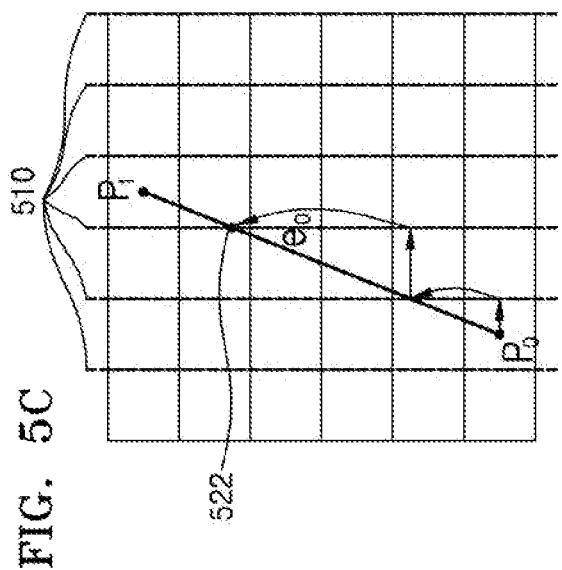

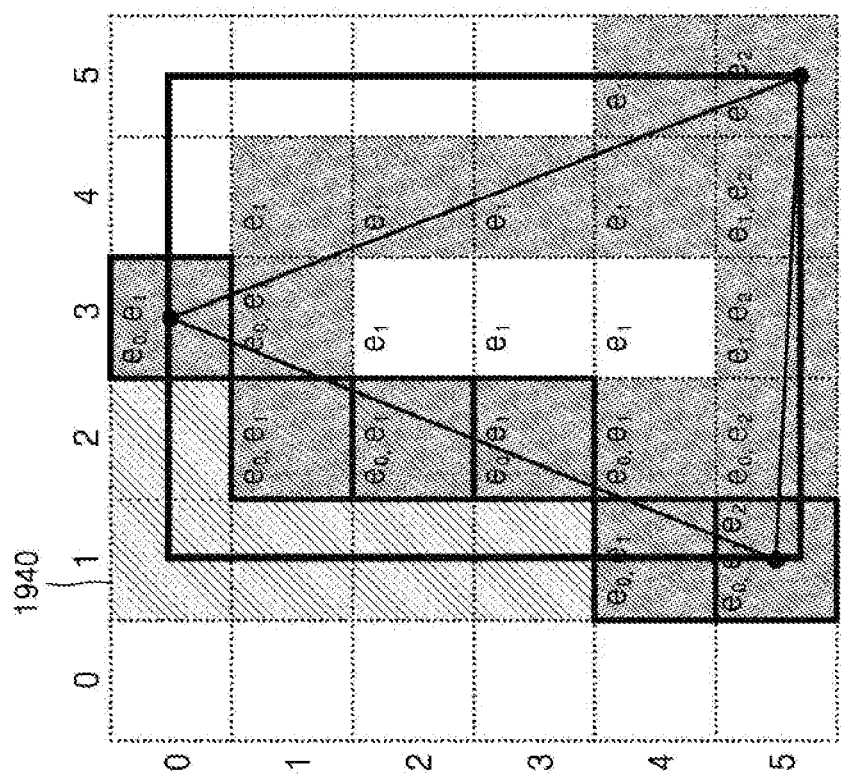
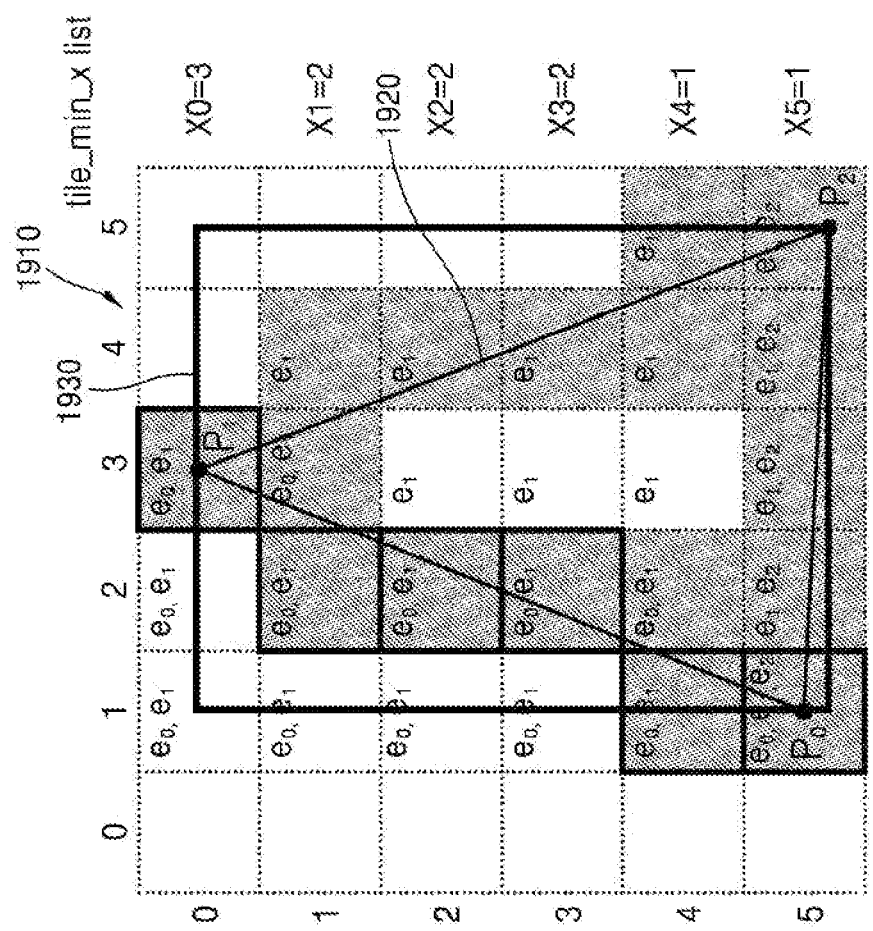
FIG. 21A
FIG. 21B

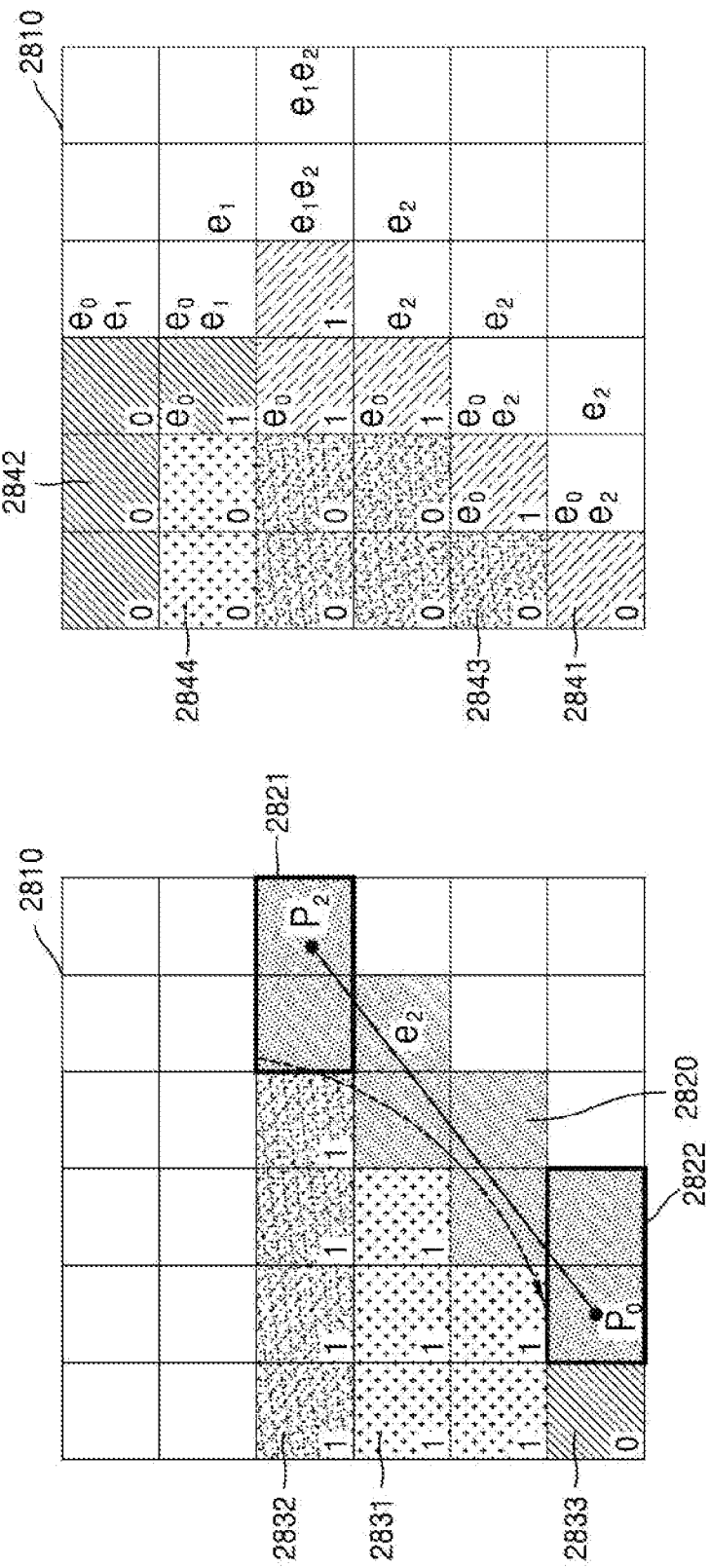

METHOD AND APPARATUS FOR PERFORMING TILE BINNING FOR PATH RENDERING

CROSS-REFERENCE TO RELATED APPLICATION

This application claims the benefit under 35 USC 119(a) of Korean Patent Application No. 10-2015-0052459, filed on Apr. 14, 2015, in the Korean Intellectual Property Office, the entire disclosure of which is incorporated herein by reference for all purposes.

BACKGROUND

1. Field

The following description relates to methods and apparatuses for performing tile binning for path rendering.

2. Description of the Related Art

Studies are being conducted on a method to enhance acceleration performance of a graphic processing unit (hereinafter, referred to as GPU) when vector graphics or path rendering is performed. In a case of path rendering, input data includes a combination of commands and vertices, instead of triangles. Thus, enhancing acceleration performance of the GPU when path rendering is performed is difficult and complex.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method of performing tile binning, including: obtaining information about paths defining an object to be rendered; classifying one of the paths into a first group and another of the paths into a second group based on shapes of the paths; and performing the tile binning based on the classification.

The performing of the tile binning may include selecting tiles that include the one of the paths included in the first group, from among tiles included in a frame; and assigning, to the selected tiles and one of the tiles arranged in one direction from the selected tiles, an identification value of the one of the paths in the first group.

The selected tiles may include a first tile, which may include a starting point of the one of the paths in the first group and a second tile, which may include an end point of the one of the paths in the first group.

The direction may be one of a left direction, a right direction, an upward direction, and a downward direction with respect to locations of the selected tiles.

The method may also include setting a bounding box of the frame based on coordinates corresponding to vertices defining the one of the paths in the first group; and allocating the identification value to a tile included in the bounding box.

The bounding box may be rectangular shaped, and a diagonal of the bounding box connects a first coordinate to a second coordinate of the coordinates, wherein the first coordinate may be determined based on a maximum value of values of horizontal components and a maximum value of values of vertical components, and the second coordinate may be determined based on a minimum value of the values of the horizontal components and a minimum value of the values of the vertical components of the coordinates.

The method may also include removing the identification value assigned to the selected tiles based on a relationship between locations of the selected tiles.

The removing of the identification value may include selecting the tiles including coordinates with vertical components having values equal to values of vertical components of coordinates corresponding to the tiles in the frame, obtaining a minimum horizontal component value by comparing values of horizontal components of the tiles which are among the selected tiles and include the one of the paths of the first group, and removing an identification value assigned to a tile from the selected tiles when a value of a horizontal component of the tile is smaller than a value of the minimum horizontal component.

The removing of the identification value may include selecting a tile having coordinates with horizontal components having values equal to values of horizontal components of coordinates corresponding to the tiles in the frame, obtaining a minimum horizontal component value and a maximum vertical component value by comparing values of vertical components of the tiles among the selected tiles and include the one of the paths in the first group, and removing an identification value assigned to a tile from the selected tiles when a value of a vertical component of the tile is smaller than a value of the minimum vertical component and when the value of the vertical component of the at least one tile is greater than the value of the maximum vertical component.

The method may also include calculating an initial winding number for a tile arranged in a direction away from a third tile selected from the selected tiles that include the one of the paths in the first group, wherein the third tile is different from a first tile that may include a starting point of the one of the paths in the first group and a second tile that may include an end point of the one of the paths in the first group and is among the selected tiles that include the one of the paths in the first group.

The calculating of the initial winding number may include calculating the initial winding number based on a form in which the one of the paths in the first group passes through the third tile.

The calculating of the initial winding number may include increasing the initial winding number by a value in response to the one of the paths in the first group passing through two boundaries of the third tile that face each other, and traveling in a clockwise direction, and decreasing the initial winding number by a value in response to the one of the paths in the first group passing through two boundaries of the third tile that face each other, and traveling in a counterclockwise direction.

The calculating of the initial winding number may include decreasing the initial winding number by a value in response to the one of the paths in the first group passing through two boundaries of the third tile that face each other, and traveling in a clockwise direction, and increasing the initial winding number by a predetermined value in response to the one of the paths in the first group passing through two boundaries that face each other, and traveling in a counterclockwise direction.

The performing of the tile binning may include selecting tiles that include an outer triangle corresponding to the one of the paths in the second group, from among tiles included in the frame; and assigning, to the selected tiles, an identification value of the another of the paths in the second group and a tile arranged in a direction away from the selected tiles.

The one of the paths in the first group may include an edge defining the object, and the one of the paths in the second group may include a curve defining the object.

In accordance with an embodiment, there is provided a non-transitory computer-readable recording storage medium having stored thereon a computer program which, when executed by a computer, performs the method described above.

In accordance with an embodiment, there is provided an apparatus configured to perform tile binning for tile-based rendering, the apparatus including: an obtainer configured to obtain information about paths defining an object to be rendered and classify one of the paths into a first group and another of the paths into a second group based on shapes of the paths; and an allocator configured to perform the tile binning based on the classification.

The allocator may select tiles that include the one of the paths in the first group, from among tiles included in a frame, and assign, to the selected tiles and at least one tile arranged in one direction from the selected tiles, an identification value of the one of the paths in the first group.

The selected tiles may include a first tile, which may include a starting point of the one of the paths in the first group and a second tile, which may include an end point of the one of the paths in the first group.

The direction may be one of a left direction, a right direction, an upward direction, and a downward direction with respect to locations of the selected tiles.

The apparatus may also include a setter configured to set a bounding box for the frame based on coordinates respectively corresponding to vertices defining the one of the paths in the first group, wherein the allocator allocates the identification value to a tile included in the bounding box.

The bounding box may be rectangular shaped, and a diagonal of the bounding box connects a first coordinate to a second coordinate of the coordinates, wherein the first coordinate may be determined based on a maximum value of values of horizontal components and a maximum value of values of vertical components, and the second coordinate may be determined based on a minimum value of the values of the horizontal components and a minimum value of the values of the vertical components of the coordinates.

The apparatus may also include a remover configured to remove the identification value assigned to the selected tiles based on a relationship between locations of the selected tiles.

The remover may select tiles including coordinates with vertical components having values equal to values of vertical components of coordinates corresponding to the tiles in the frame, obtain a minimum horizontal component value by comparing values of horizontal components of the tiles, which are among the selected tiles, and include the one of the paths in the first group, and remove an identification value assigned to a tile from the selected tiles when a value of a horizontal component of the tile is smaller than a value of the minimum horizontal component.

The remover may select a tile including coordinates with horizontal components having values equal to values of horizontal components of coordinates corresponding to the tiles in the frame, obtain a minimum horizontal component value and a maximum vertical component value by comparing values of vertical components of the tiles, which are among the selected tiles, and include the one of the paths in the first group, and remove an identification value assigned to a tile from the selected tiles when a value of a vertical component of the tile is smaller than a value of the minimum vertical component and when the value of the vertical component of the at least one tile is greater than the value of the maximum vertical component.

The apparatus may also include an operator configured to calculate an initial winding number for a tile arranged in a direction away from a third tile selected from the selected tiles that include the one of the paths in the first group, wherein the third tile may be different from a first tile that may include a starting point of the one of the paths in the first group and a second tile that may include an end point of the one of the paths in the first group and is among the selected tiles that include the one of the paths in the first group.

The operator may calculate the initial winding number based on a form in which the one of the paths in the first group passes through the third tile.

The operator may increase the initial winding number by a value in response to the one of the paths in the first group passing through two boundaries of the third tile that face each other, and traveling in a clockwise direction, and decrease the initial winding number by a predetermined value in response to the one of the paths in the first group passing through two boundaries of the third tile that face each other, and traveling in a counterclockwise direction.

The operator may decrease the initial winding number by a value in response to the one of the paths in the first group passing through two boundaries of the third tile that face each other, and traveling in a clockwise direction and increase the initial winding number by a value in response to the one of the paths in the first group passing through two boundaries that face each other, and traveling in a counterclockwise direction.

In accordance with an embodiment, there is provided a method of performing tile-based rendering, the method including: obtaining information about a path defining an object to be rendered; classifying one of the paths into a first group and another of the paths a second group based on shapes of the paths; performing the tile binning based on the classification; calculating winding numbers of tiles included in a frame based on a location of each of the paths and a direction in which each of the paths proceeds; and shading pixels in the frame based on the calculated winding numbers.

The shading of the pixels may include shading the pixels based on a rule, and the rule may include assigning a first color value to pixels having a winding number that is an even number or zero and assigning a second color value to pixels having a winding number that is an odd number.

In accordance with an embodiment, there is provided a non-transitory computer-readable recording storage medium having stored thereon a computer program which, when executed by a computer, performs the method described above.

Other features and aspects will be apparent from the following detailed description, the drawings, and the claims.

BRIEF DESCRIPTION OF THE DRAWINGS

FIGS. 5A through 5E illustrate diagrams showing an example of selecting, performed by the allocator, of tiles through which a path passes, from among tiles included in a frame, according to an embodiment;

FIGS. 21A and 21B illustrate diagrams describing an example of operating the remover when a bounding box is set for a frame, according to an embodiment;

FIGS. 30A and 30B illustrate diagrams describing an example of operating by the operator of a third initial winding number for tiles arranged in a direction away from a tile through which a third path passes, from among tiles included in a frame, according to an embodiment;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
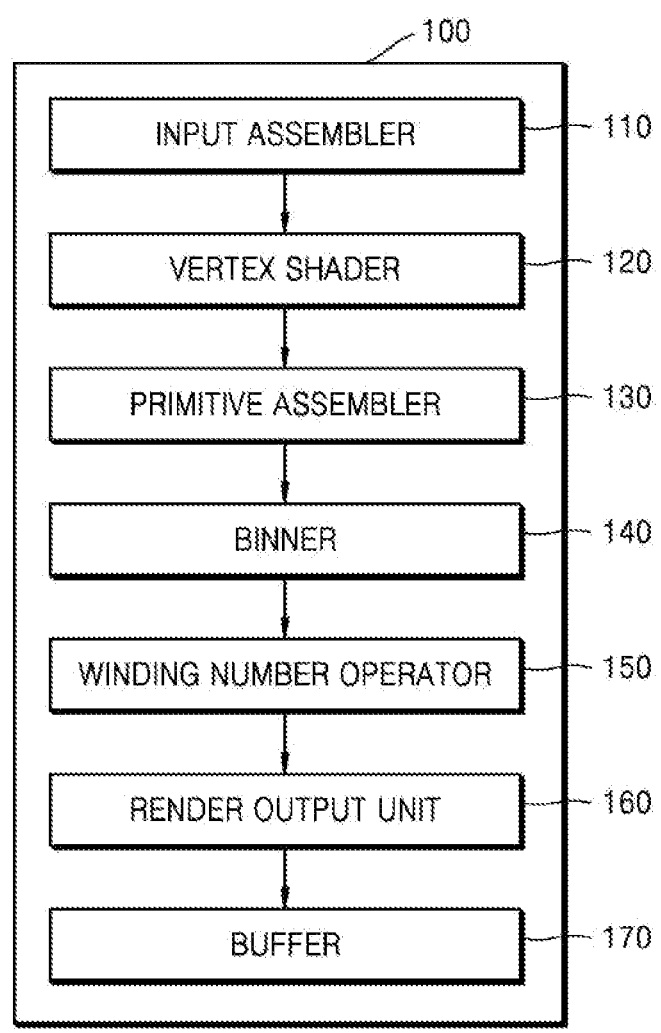
FIG. 1 illustrates a structural block diagram showing an example of an apparatus to perform path rendering, according to an embodiment.

FIG. 1 illustrates a structural block diagram showing an example of showing a rendering apparatus 100 according to an exemplary embodiment.

Referring to FIG. 1, the rendering apparatus 100 includes an input assembler 110, a vertex shader 120, a primitive assembler 130, a binner 140, a winding number operator 150, a render output unit 160, and a buffer 170. The rendering apparatus 100, shown in FIG. 1, may include other structural elements in addition to those illustrated in FIG. 1. Furthermore, although the structural elements of the rendering apparatus 100 are illustrated as individual or separate structural elements, a person of ordinary skill in the relevant art will appreciate that some or all of such structural elements may be combined as a single structural element.

The rendering apparatus 100 shown in FIG. 1 correspond to one or more processors. A processor may be implemented as an array of a plurality of logic gates or as a combination of a general-use microprocessor and a memory storing a program executable in the microprocessor. Alternatively, it may be understood by one of ordinary skill in the art that the rendering apparatus 100 is hardware. For example, the rendering apparatus 100 is a graphics processing unit (GPU).

The rendering apparatus 100 performs path rendering. In one illustrative example, a path is a component of an object that is a target of rendering, and includes an edge or a curve. An edge refers to a line connecting two different vertices to each other, and a curve refers to a curved line connecting a plurality of vertices to each other. The plurality of vertices may be same or may be different from each other. A vertex includes a vertex corresponding to a starting point of a path or a vertex corresponding to an end point of a path.

For example, an object includes a closed polygon or a closed path which is formed by connecting at least one path to each other.

The rendering apparatus 100 receives a command indicating at least one path, analyzes the command, and determines respective colors of pixels included in a frame. In one example, the determining of the respective colors of the pixels includes determining whether to assign a color value to a pixel, and determining which color to assign to the pixel. Accordingly, as the rendering apparatus 100 operates, an object is output to a screen.

For example, in response to an edge extending from a first pixel to a second pixel, from among pixels included in a frame, being defined to be a path, vertices are points each corresponding to the first pixel or the second pixel. Accordingly, a command includes coordinates of a first vertex corresponding to the first pixel, coordinates of a second vertex corresponding to the second pixel, and information to form a line between the first vertex to the second vertex. Accordingly, information about a direction of a path and information about respective coordinates of vertices of the path are determined with reference to the command. Additionally, the command includes information about a color value that is to be set for each pixel.

For example, the rendering apparatus 100 performs tile-based rendering. The tile-based path rendering refers to dividing a frame into virtual tiles and performing path rendering on each virtual tile. Among some of the many advantages and benefits associated with the structural and functional configuration of the rendering apparatus 100 performing tile-based path rendering, consumption of time and power needed to perform rendering is reduced.

The input assembler 110 reads data regarding at least one vertex that forms a path from a memory, and transmits the read data to the vertex shader 120. The vertex shader 120 executes a vertex shading code, written by a user, on a vertex. The vertex shading code refers to the command described above. In other words, the vertex shader 120 interprets the command indicating the path. For example, a shading core of a GPU performs a function of the vertex shader 120.

The primitive assembler 130 forms a primitive by assembling vertices that passed through the vertex shader 120. The primitive refers to a path including vertices, and is a component of an object. According to an exemplary embodiment, a primitive includes an edge or a curve.

The binner 140 performs tile binning. In detail, the binner 140 classifies a path into a first group or a second group according to a shape of the path, and tile binning is performed by differentiating a path included in the first group from a path included in the second group. In other words, the binner 140 performs tile binning differently depending on whether the path is an edge or a curve. For example, the binner 140 allocates an identification value of a path to tiles included in a frame. For example, for each tile, the binner 140 generates a list, which includes a name of a primitive (an edge or a curve) that needs to be processed when tile rendering is performed. Hereinafter, a list that includes a name of an edge is referred to as an 'Edge_List', and a list that includes a name of a curve is referred to as a 'Curve_List'.

A tile refers to a group of pixels included in a frame. For example, if it is assumed that 1024*768 pixels are included in a frame and the frame is divided into 4 tiles, a tile includes 512*384 pixels.

An identification value of a path refers to a path, and corresponds to a predetermined name of the path. For example, in FIG. 4, an identification value of a path corresponding to a first path $e_0$ may be '$e_0$'. However, if the identification value of the path is reserved information indicating a particular path, the identification value of the path corresponds to an identification value without limitation. Examples of allocating an identification value of a path to tiles, which is performed by the binner 140, are described with reference to FIGS. 2 through 19 and FIGS. 29 and 30.

Additionally, the binner 140 operates an initial winding number for each tile based on a position of a path and a direction in which the path proceeds. Examples of operating an initial winding number for each path, which is performed by the binner 140, are described with reference to FIGS. 20 through 28. However, if the binner 140 does not operate an initial winding number, the winding number operator 150 operates an initial winding number.

The winding number operator 150 operates a winding number for pixels included in each tile based on a location of a path and a direction in which the path proceeds. For example, the winding number operator 150 is embodied as hardware that operates on a shading core. Examples of operating an initial winding number for a pixel, which is performed by the winding number operator 150, are described with reference to FIGS. 31 through 35.

FIG. 1 shows that the winding number operator 150 is included in the rendering apparatus 100, but is not limited thereto. In other words, the winding number operator 150 may be a single apparatus independent from the rendering apparatus 100. For example, an independent winding number operator (not shown) receives information about respective coordinates of vertices included in a path and information about a coordinate of a pixel included in a frame. Further, the independent winding number operator (not shown) operates a winding number for the pixel using the received information, and returns the operated winding number to the rendering apparatus 100.

In other words, the winding number operator 150 is configured so that an initial winding number for a pixel is operated on a shading core included in the rendering apparatus 100 or as hardware device independent from the rendering apparatus 100.

The render output unit 160 writes data generated when the pixel shader operates and information is transmitted to the buffer 170. The data may include information about a color of a pixel. In other words, the pixel shader determines respective colors of pixels included in a frame, and the render output unit 160 merges the information about the respective colors of the pixel, and writes the merged information to the buffer 170.

For example, the pixel shader receives information about pixels included in a frame, and determines respective colors of the pixels. In other words, the pixel shader performs shading on pixels based on a winding number for each pixel. Shading refers to a process of setting a color for each pixel, but is not limited thereto. For example, shading may be a process of setting a lighting contrast for each pixel or a process of applying a texture to each pixel. Additionally, the pixel shader performs shading on a pixel based on texture. For example, the pixel shader determines a color of a pixel based on a predetermined rule. An example of determining a color of a pixel, which is performed by the pixel shader, is described with reference to FIG. 36.

The render output unit 160 writes information about a color of a pixel to the buffer 170.

Figure 2A:
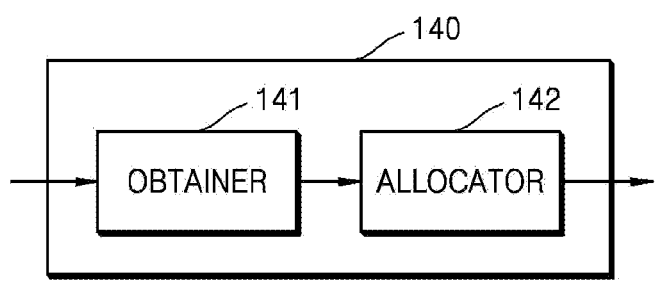
FIG. 2A illustrates a structural block diagram showing an example of a binner, according to an embodiment.

FIG. 2A illustrates a structural block diagram showing an example of the binner 140, according to an embodiment.

Referring to FIG. 2A, the binner 140 includes an obtainer 141 and an allocator 142. The obtainer 141 or the allocator 142 corresponds to one or more processors. A processor is implemented as an array of a plurality of logic gates or as a combination of a general-use microprocessor and a memory storing a program executable in the microprocessor. Alternatively, it may be understood by one of ordinary skill in the art that the obtainer 141 or the allocator 142 may be embodied as hardware in another structural form.

The obtainer 141 obtains information about at least one path of an object. An object refers to a target on which rendering is performed, and includes at least one edge or curve. In other words, the obtainer 141 obtains information about a path, such as an edge or a curve, from the primitive assembler 130. Information about a path includes a coordinate of a vertex corresponding to a starting point of the path, a coordinate of a vertex corresponding to an end point of the path, and a direction in which the path proceeds, that is, a direction in which the path is drawn.

Additionally, the obtainer 141 classifies a path into a first group or a second group according to a shape of the path. In one example, the first group refers to a group that includes an edge, and a second group refers to a group that includes a curve. For example, the obtainer 141 determines whether each path is included in the first group or the second group. Information about a path includes information about coordinates of vertices included in the path and a direction in which the path proceeds. Accordingly, the obtainer 141 classifies a path into the first group or the second group. Hereinafter, an example of classifying a path, which is performed by the obtainer 141, is described with reference to FIG. 2B.

Figure 2B:
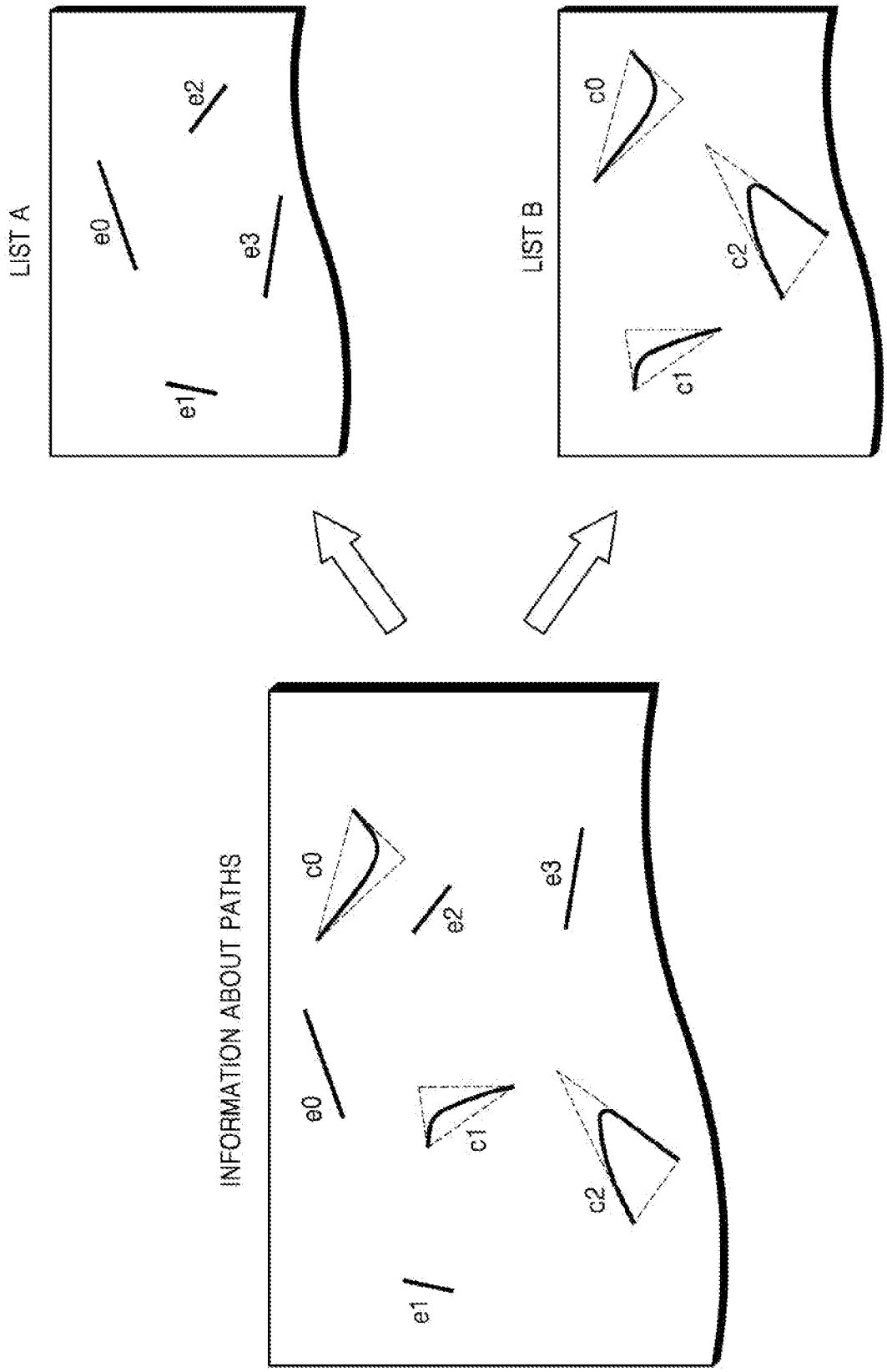
FIG. 2B illustrates a diagram showing an example of classifying a path performed by an obtainer, according to an embodiment.

FIG. 2B illustrates a diagram showing an example of classifying a path, the classifying being performed by the obtainer 141, according to an embodiment.

The binner 140 obtains information about a path from the primitive assembler 130. In one illustrative example, when an object consists of a plurality of paths, the binner 140 obtains information about the plurality of paths. Referring to FIG. 2B, an example to obtain information about seven paths such as $e_0$, $e_1$, $e_2$, and $e_3$, which are edges, and $c_0$, $c_1$, and $c_2$ which are curves, the obtaining being performed by the binner 140, as shown.

The obtainer 141 classifies the respective paths $e_0$, $e_1$, $e_2$, $e_3$, $c_0$, $c_1$, and $c_2$, into a first group (a list A) or a second group (a list B). For example, the obtainer 141 forms the first group (the list A) by combining information about edges $e_0$, $e_1$, $e_2$, and $e_3$, and forms the second group (the list B) by combining information about curves $c_0$, $c_1$, and $c_2$.

As the obtainer 141 classifies the paths $e_0$, $e_1$, $e_2$, $e_3$, $c_0$, $c_1$, and $c_2$ into the first group or the second group, the obtainer 141 performs tile binning in parallel according to a shape of a path. In other words, the binner 140 performs tile binning on the edges $e_0$, $e_1$, $e_2$, and $e_3$ and the curves $c_0$, $c_1$, and $c_2$ in parallel with each other.

As described with reference to FIGS. 2A and 2B, the obtainer 141 classifies paths into an edge or a curve. However, embodiments are not limited thereto. In other words, the primitive assembler 130 transmits information about an edge and information about a curve to the binner 140, by differentiating the information about the edge and the information about the curve from each other.

Referring back to FIG. 2A, the allocator 142 differentiates a path included in the first group and a path included in the second group from each other, and performs tile binning on the paths.

As an example, assuming that a path is a path, such as an edge, included in the first group, the allocator 142 selects tiles that include the path, from among tiles included in the frame. Additionally, the allocator 142 assigns an identification value of the path to the selected tiles and to at least one tile arranged in a direction away from each of the selected tiles. An example of operating the obtainer 141 and the allocator 142, when a path is an edge, is described with reference to FIGS. 3 through 7.

As another example, assuming that a path is a path, such as a curve, included in the second group, the allocator 142 selects tiles that include an outer triangle corresponding to a path, from among tiles included in a frame. Additionally, the allocator 142 assigns an identification value of the path to the selected tiles and to at least one tile arranged in a direction away from each of the selected tiles. An example of operating the obtainer 141 and the allocator 142 when a path is a curve is described with reference to FIG. 8.

Figure 3:
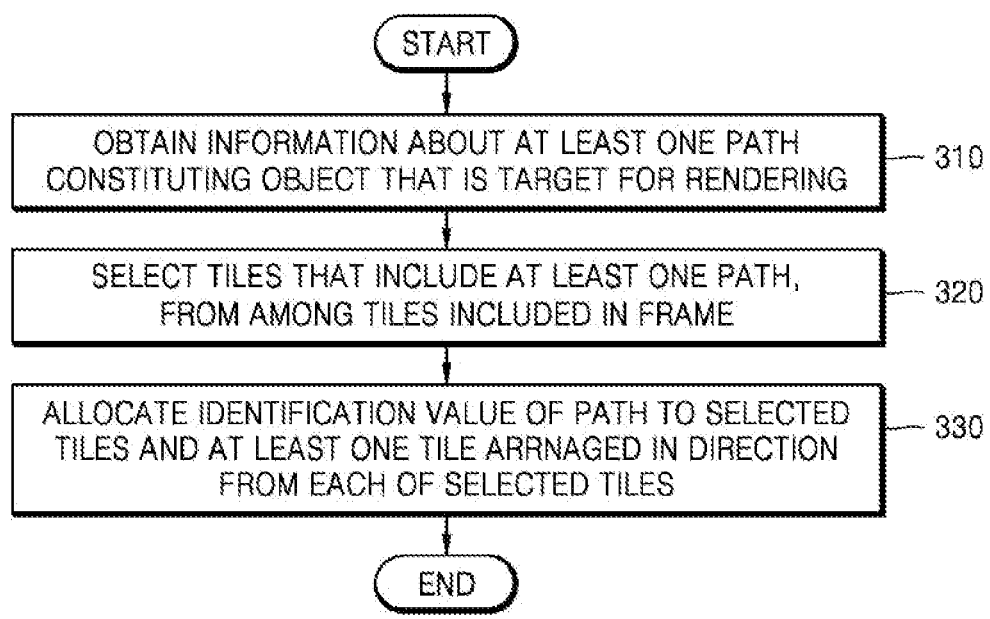
FIG. 3 illustrates a flowchart showing an example of an operation performed by the binner, according to an embodiment.

FIG. 3 illustrates a flowchart showing an example of an operation performed by the binner 140, according to an embodiment.

In operation 310, the obtainer 141 obtains information about a path of an object. For example, the obtainer 141 obtains information about an edge or information about a curve from the primitive assembler 130. Additionally, although not shown in FIG. 3, the obtainer 141 classifies the path into a first group or a second group depending on whether the path is an edge or a curve.

In operation 320, the allocator 142 selects tiles that include the path, from among tiles included in a frame. In other words, the allocator 142 selects tiles through which the path passes, from among the tiles included in the frame. The tiles selected by the allocator 142 include a tile that includes a starting point of the path, and a tile that includes an end point of the path. Hereinafter, an example of selecting a tile that includes a path from among tiles includes in a frame, which is performed by the allocator 142, is described with reference to FIGS. 4A through 5E.

Figure 4B:
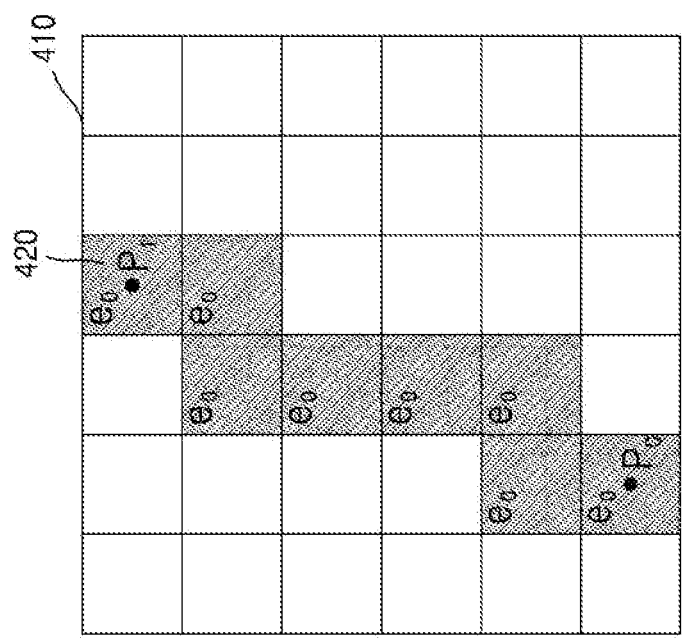
FIGS. 4A and 4B illustrate diagrams to describe an example of selecting, performed by an allocator, of a tile through which a first path passes, from among tiles included in a frame, according to an embodiment.
Figure 4A:
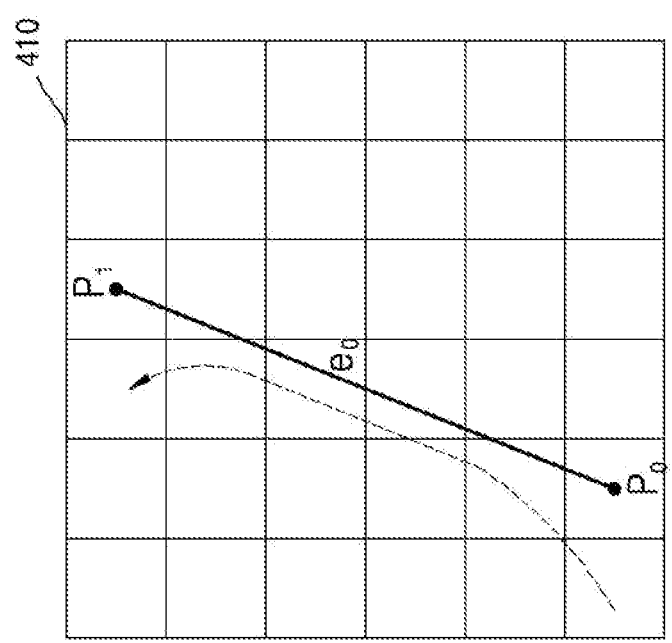

FIGS. 4A and 4B illustrate diagrams describing an example of selecting a tile through which a first path $e_0$ passes, from among tiles included in a frame, the selecting being performed by the allocator 142, according to an embodiment.

FIG. 4A shows the first path $e_0$. The first path $e_0$ is a linear path connecting a vertex $P_0$ to a vertex $P_1$. Assuming that the first path $e_0$ is viewed from a left side of the first path $e_0$, the first path $e_0$ is a path that rotates in a counterclockwise direction.

FIG. 4B shows tiles 420 through which the first path $e_0$ passes, from among tiles included in a frame 410. The allocator 142 selects the tiles 420 through which the first path $e_0$ passes, from among the tiles included in the frame 410. An example of the allocator 142 selecting the tiles 420, through which the first path $e_0$ passes, from among the tiles included in the frame 410, is described with reference to FIGS. 5A through 5E.

FIGS. 5A through 5E illustrate diagrams showing an example of selecting by the allocator 142 of tiles through which a path passes, from among tiles included in a frame, according to an embodiment.

The allocator 142 determines at least one point on a path that meets a side of the tiles included in the frame. A side of the tiles refers to one from among a left side, a right side, an upper side, and a lower side of the tiles. In other words, the allocator 142 determines a point at which an outline of a side of the tiles included in the frame and the path meet each other.

Referring to FIG. 5A, a first path $e_0$ connecting a vertex $P_0$ to a vertex $P_1$ is shown. The allocator 142 determines a point on a path that meets one side of the tiles included in the frame. For example, assuming that the side of the tiles is a right outline 510, the allocator 142 determines a point 521 at which the first path $e_0$ meets the right outline 510.

Additionally, the allocator 142 virtually divides the path with reference to the determined point 521. The virtual dividing of the path at the allocator 142 refers to calculating intermediate points of the path so as to accurately select tiles through which the path passes, from among the tiles included in the frame.

Referring to FIG. 5B, the allocator 142 divides the first path $e_0$ into a first sub-path $e_{01}$ extending from the vertex $P_0$, which is a starting vertex of the first path $e_0$ to the determined point 521, and a second sub-path $e_{02}$ extending from the determined point 521 to the vertex $P_1$, which is an end vertex of the first path $e_0$.

Additionally, the allocator 142 selects tiles that include the divided path. For example, the allocator 142 forms a rectangle having the divided path as a diagonal line, and selects tiles that include the formed rectangle. Referring to FIG. 5B, the allocator 142 forms a rectangle having the sub-path $e_{01}$ as a diagonal line. Then, the allocator 142 selects tiles 531 that include the formed rectangle.

If the side of the tiles included in the frame meets the path at a plurality of points, the allocator 142 repeats the above-described process with reference to FIGS. 5A and 5B.

Referring to FIG. 5C, the allocator 142 determines a point 522 at which the first path $e_0$ meets the right outline 510.

Furthermore, the allocator 142 virtually divides the path with reference to the determined point 522. Referring to FIG. 5D, the allocator 142 divides the second path $e_{02}$ into a third sub-path $e_{03}$ extending from the point 521 that is a starting vertex of the second sub-path $e_{02}$ to the determined point 522 and a fourth sub-path $e_{04}$ extending from the determined point 522 to the vertex $P_1$ that is an end point of the second sub-path $e_{02}$.

Additionally, the allocator 142 forms a rectangle having the divided path as a diagonal line, and selects tiles that include the formed rectangle. Referring to FIG. 5D, the allocator 142 forms a rectangle having the third sub-path $e_{03}$ as a diagonal line. Then, the allocator 142 selects tiles 532 that include the formed rectangle.

If there are no other points where the path meets the sides of the tiles included in the frame, the allocator 142 forms a rectangle having a sub-path obtained by dividing the first path $e_0$ as a diagonal line, and selects tiles included in the rectangle. Referring to FIG. 5E, the allocator 142 forms a rectangle having the fourth sub-path $e_{04}$ as a diagonal line. The allocator 142 selects tiles 533 that include the formed rectangle.

Thus, the allocator 142 combines the selected tiles 531 through 533, and determines the tiles 531 through 533 through which the first path $e_0$ passes from among tiles included in the frame.

As described with reference to FIGS. 5A through 5E, the allocator 142 divides a path into at least one sub-path, and selects tiles that include the at least one sub-path. Thus, the allocator 142 accurately selects the tiles 531 through 533 through which the first path $e_0$ passes, from among the tiles included in the frame.

Referring back to FIG. 3, in operation 330, the allocator 142 allocates an identification value of the path to the selected tiles and at least one tile arranged in a direction away from one each of the selected times. In other words, the allocator 142 allocates an identification value of the path to tiles through which the path passes, and tiles arranged in a direction away from the respective tiles through which the path passes. The direction from tiles refers to one from among a left direction, a right direction, an upward direction, and a downward direction from each position of the selected tiles; that is, the tiles through which the path passes.

The allocating of an identification value of a path, which is performed by the allocator 142, refers to generating of Edge_List of Curve_List of the tile. For example, the allocator 142 generates information, which indicates that the first path $e_0$ passes through a tile, as Edge_List for each of the tiles 420 shown in FIG. 4. The allocator 142 stores Edge_List in a memory (not shown) included in the binner 140. For example, Edge_List is stored in the form of a bitstream for each tile. Additionally, the allocator 142 generates Edge_List that includes information about the first path $e_0$, for example, a name of the first path $e_0$ that passes through the tiles 420, for the tiles arranged in a direction away from the tiles 420, shown in FIG. 4, and stores Edge_List in a memory (not shown).

Figure 6:
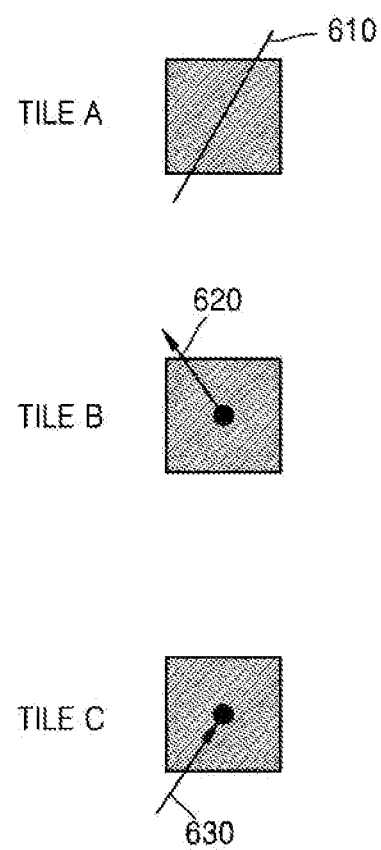
FIG. 6 illustrates a diagram describing a rule to allocate by the allocator an identification value of a path to a tile, according to an embodiment.

FIG. 6 illustrates a diagram describing a rule of allocating by the allocator 142 an identification value of a path to a tile, according to an embodiment.

Referring to FIG. 6, a tile A refers to a tile through which a path 610 passes. A tile B refers to a tile that includes a starting vertex of a path 620. Additionally, a tile C refers to a tile that includes an end vertex of a path 630.

The allocator 142 selects tiles corresponding to the tiles A through C, from among tiles included in a frame. Additionally, the allocator 142 generates Edge_List indicating that the paths 610 through 630 pass through the tiles A through C. Additionally, the allocator 142 generates Edge_List for each tile arranged in a direction away from the tiles A through C.

Figure 7:
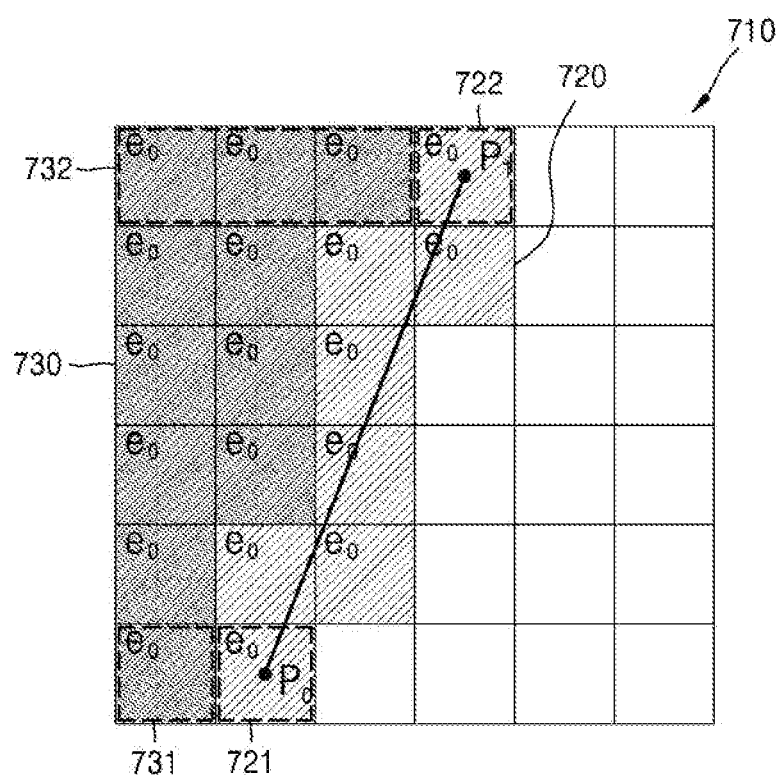
FIG. 7 illustrates a diagram for showing an example of allocating by the allocator an identification value of a path to a tile, according to an embodiment.

FIG. 7 illustrates a diagram showing an example of allocating by the allocator 142 an identification value of a path to a tile, according to an embodiment.

FIG. 7 shows an example of allocating an identification value of the first path $e_0$ to tiles 720 that includes the first path $e_0$ and tiles 730, which are arranged in a direction away from each of the tiles 720, from among tiles included in a frame 710. In other words, FIG. 7 shows an example of generating Edge_List for each of the tiles 720 and 730. Edge_List of each of the tiles 720 and 730 includes $e_0$ that is a name of the first path.

FIG. 7 shows that a direction away from each of the tiles 720 refers to a left direction from each of the tiles 720. However, a direction of one side of tiles corresponds to a right direction, an upward direction, or a downward direction from the tiles, and the left direction, as described above.

According to an embodiment, the binner 140 generates Edge_List for tiles 731 arranged in a direction away from the tiles 721 and tiles 732 arranged in a direction away from tiles 722. Accordingly, because the rendering apparatus 100 independently processes each path, that is, process paths in parallel with each other, time and cost to operate the rendering apparatus 100 are reduced. For example, power consumption in an operation of the rendering apparatus 100 is reduced.

A path representing an object corresponds to a curve, as well as an edge. In other words, the obtainer 141 obtains information about the curve, and the allocator 142 allocates an identification value of the curve to generate Curve_List for some of tiles included in a frame. Hereinafter, an example of allocating an identification value of a curve to a tile, which is performed by the allocator 142, is described with reference to FIGS. 8 and 9.

Figure 8:
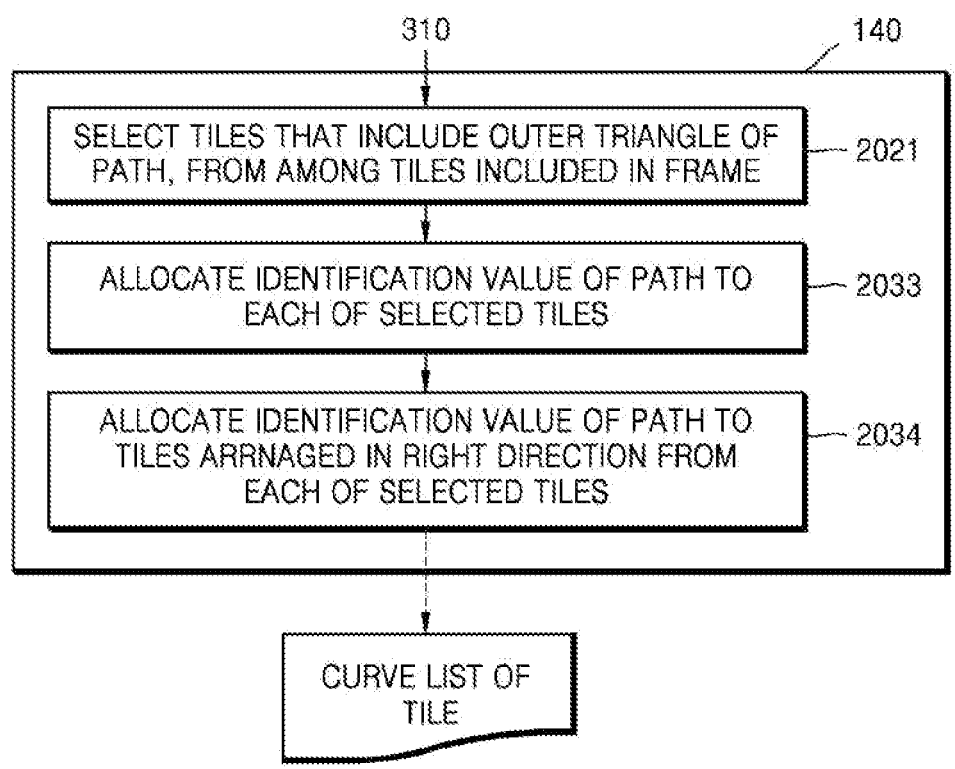
FIG. 8 illustrates a flowchart showing another example of allocating by the allocator an identification value of a path to a tile, according to an embodiment.

FIG. 8 illustrates a flowchart showing another example of allocating an identification value of a path to a tile, which is performed by the allocator 142, according to an embodiment.

It is assumed that operation 2021 described with reference to FIG. 8 is performed after operation 310 described with reference to FIG. 3.

In operation 2021, the allocator 142 selects tiles that include an outer triangle corresponding to a path, from among tiles included in a frame. The path refers to a curve, and the curve is included inside the outer triangle.

An outer triangle is divided into three edges. In other words, the outer triangle is divided into three edges with reference to vertices corresponding to vertices of a triangle. Accordingly, the allocator 142 selects tiles that respectively include three edges, from among the tiles included in the frame.

In operation 2033, the allocator 142 allocates an identification value of the path to each of the selected tiles. Then, in operation 2034, the allocator 142 allocates an identification value of the path to, that is, generates Curve_List for tiles arranged in a direction away from the selected tiles. The direction of the side refers to a right direction, but is not limited thereto.

Figure 9:
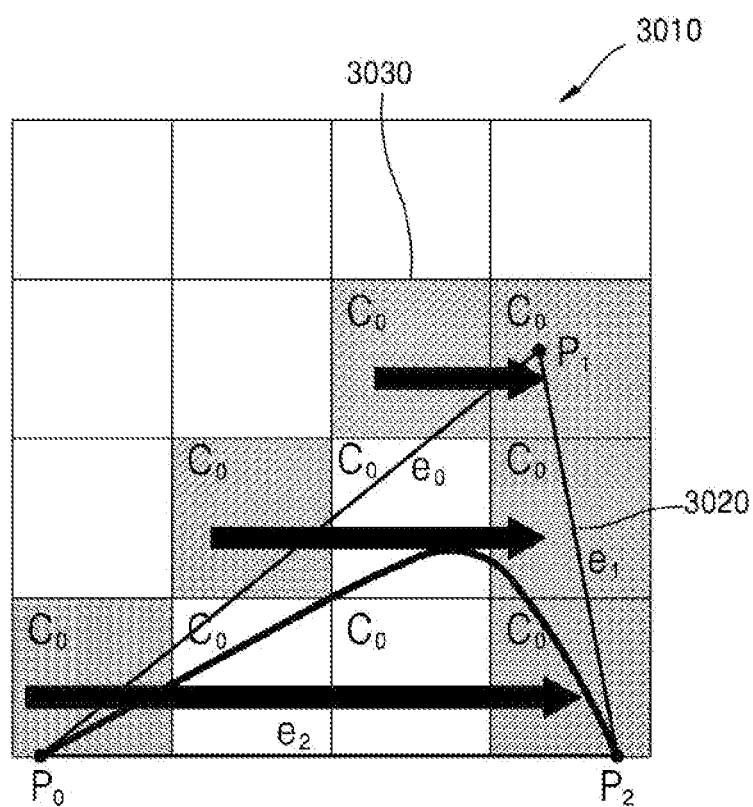
FIG. 9 illustrates a diagram showing an example of allocating by the allocator an identification value of a curve to a tile, according to an embodiment.

FIG. 9 illustrates a diagram showing an example of allocating by the allocator 142 an identification value of a curve to a tile, according to an embodiment.

Referring to FIG. 9, a path $C_0$ is shown in a frame 3010. The path $C_0$ is included in an outer triangle 3020. In detail, when a vertex at which an edge $e_0$, which corresponds to a slope at a starting vertex $P_0$ of the path $C_0$, and an edge $e_1$, which corresponds to a slope at an end vertex $P_2$ of the path $C_0$, cross each other is assumed as $P_1$, the outer triangle 3020 becomes a triangle having $P_0$, $P_1$, and $P_2$ as vertices. Additionally, the outer triangle 3020 is a triangle formed of the edges $e_0$, $e_1$, and $e_2$.

The allocator 142 selects tiles 3030 that include the outer triangle 3020, from among tiles included in the frame 3010. In detail, the allocator 142 selects tiles that include the edge $e_0$, tiles that include the edge $e_1$, and tiles that include the edge $e_2$, from among the tiles included in the frame 3010. A method of selecting the tiles 3030, which is performed by the allocator 142, is described above with reference to FIGS. 4 and 5.

The allocator 142 allocates an identification value of a path to each of the selected tiles 3030. For example, the allocator 142 generates Curve_List for each of the selected tiles 3030. Additionally, the allocator 142 allocates an identification value of a path to each of tiles arranged in a direction away from the selected tiles 3030, such as, in a right direction.

Accordingly, when the path $C_0$ is a curve, the binner 140 performs tile binning by using the outer triangle 3020 that surrounds the curve $C_0$.

As described with reference to FIGS. 2 through 9, the binner 140 performs tile binning in parallel according to a type of paths of an object. In other words, the binner 140 respectively generates Edge_List or Curve_List according to whether the path is an edge or a curve. Further, the binner 140 operates an initial winding number for a tile in parallel with each other according to a type of paths being an edge or a curve. A description of such operation performed at the binner 140 is described below.

Accordingly, an amount of power consumed by the rendering apparatus 100 and time needed for the rendering apparatus 100 to perform rendering are reduced.

Figure 10:
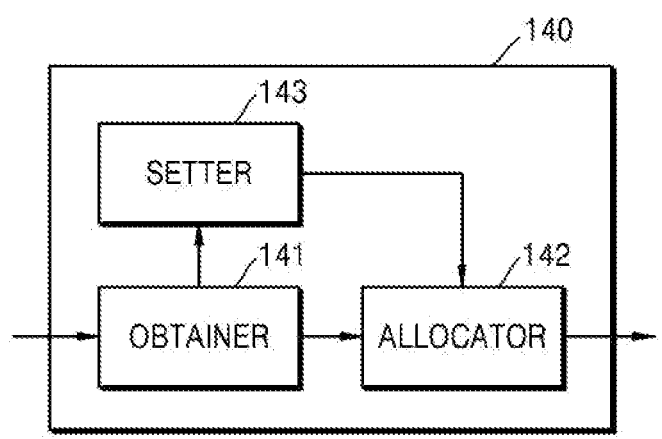
FIG. 10 illustrates a structural block diagram showing another example of the binner, according to an embodiment.

FIG. 10 illustrates a structural block diagram showing another example of the binner 140 according to an embodiment.

Referring to FIG. 10, the binner 140 includes the obtainer 141, the allocator 142, and a setter 143. The setter 143 corresponds to one or more processors. A processor is implemented as an array of a plurality of logic gates or as a combination of a general-use microprocessor and a memory storing a program executable in the microprocessor. Alternatively, it may be understood by one of ordinary skill in the art that the setter 143 may be embodied as hardware in another structural form.

An example of operating the obtainer 141 and the allocator 142 is described above with reference to FIGS. 2 through 7. Accordingly, hereinafter, a detailed description about the obtainer 141 and the allocator 142 is incorporated herein with respect to the descriptions provided in FIGS. 2 through 7.

The setter 142 sets a bounding box for a frame by using coordinates that correspond to vertices included in a path. The bounding box refers to a box set by using outermost vertices of an object. In other words, the setter 143 sets a bounding box to completely include the object.

The allocator 142 allocates an identification value of the path to tiles included in the bounding box. In other words, the allocator 142 allocates an identification value of the path to those tiles included in the bounding box, from among tiles included in the frame.

Hereinafter, an example of setting a bounding box, which is performed by the setter 143, is described in detail with reference to FIGS. 11 through 12B.

Figure 11:
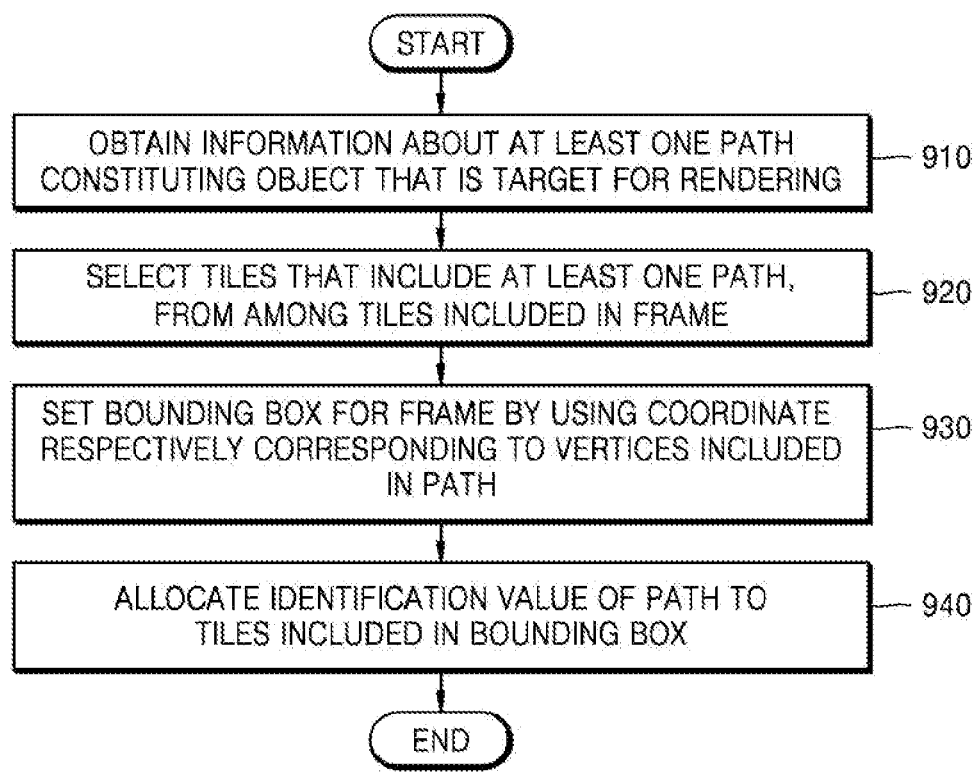
FIG. 11 illustrates a flowchart showing another example of an operation performed by the binner, according to an embodiment.

FIG. 11 illustrates a flowchart showing another example of an operation performed by the binner 140, according to an embodiment.

Operations 910 and 920 described with reference to FIG. 11 are same as operations 310 and 320 described with reference to FIG. 3. Accordingly, a detailed description about operations 910 and 920 incorporates the description of operations 310 and 320, respectively.

In operation 930, the setting box sets a bounding box for a frame by using coordinates corresponding to vertices included in a path. For example, a boundary box is a rectangle having a diagonal line connecting first coordinates to second coordinates, from among the coordinates of the vertices. The first coordinates include a maximum value among horizontal components and a maximum value among vertical components, while the second coordinates have a minimum value among horizontal components and a minimum value among vertical components.

In operation 940, the allocator 142 allocates an identification value of the path to tiles included in a bounding box. The allocating of the identification value of the path to the tiles refers to generating of Edge_List or Curve_List for the tiles. In other words, the allocator 142 generates Edge_List or Curve_List for those tiles included in the bounding box, from among the tiles 720 and 730 shown in FIG. 7.

Figure 12A:
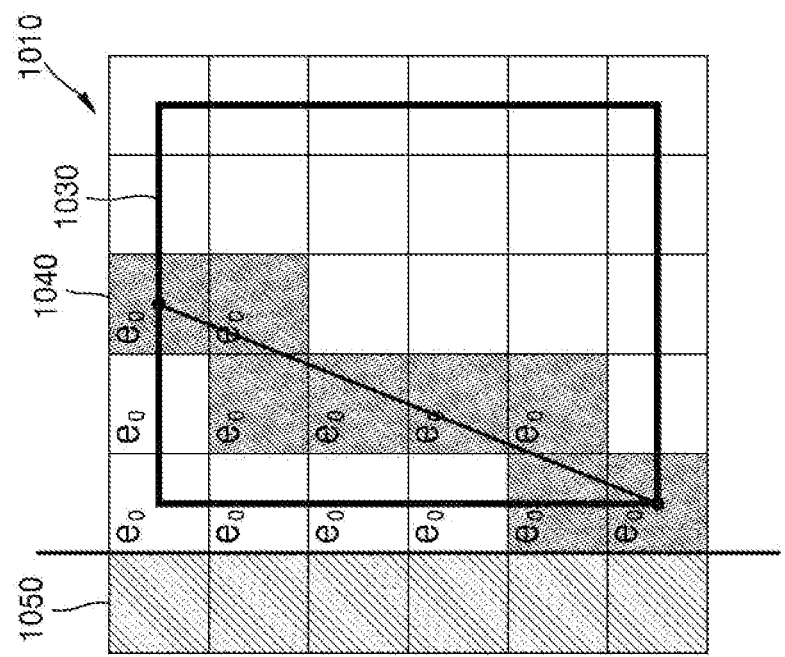
FIGS. 12A and 12B illustrate diagrams describing an example of setting by a setter of a bounding box, according to an exemplary embodiment.
Figure 12B:
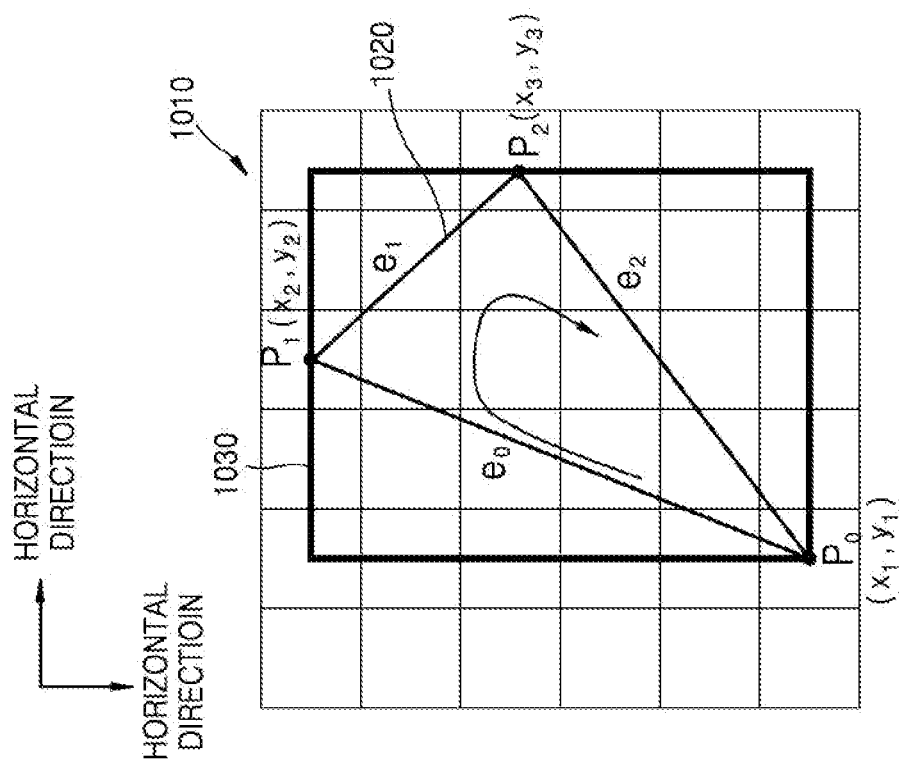

FIGS. 12A and 12B illustrate diagrams describing an example of setting by the setter 143 of a bounding box and allocating by the allocator 142 of an identification value of a path, according to an embodiment.

FIG. 12A shows an object 1020 in the form of a triangle which is included in a frame 1010. The object 1020 is assumed as including a first path $e_0$, a second path $e_1$, and a third path $e_2$. The winding number operator 150, to be later described, operates a winding number for each pixel included in the frame 1010. Accordingly, if an area of the object takes up only a small part of the frame 1010, the winding number operator 150 still performs path rendering, even without calculating the winding number of every pixel included in the frame 1010. In other words, the winding number operator 150 obtains the same result when calculating winding numbers of pixels adjacent to the object 1020, without calculating winding numbers of pixels arranged in a direction away from the object 1020, or when the winding number operator 150 calculates the winding numbers of all the pixels included in the frame 1010. Accordingly, path rendering is performed quicker when the winding number operator 150 calculates the winding numbers of pixels adjacent to the object 1020 compared to when the winding number operator 150 calculates the winding numbers of all pixels included in the frame 1010.

The setter 143 sets a bounding box 1030 for the frame 1010 by using coordinates corresponding to vertices included in the path. For example, the setter 143 sets the bounding box 1030 for the frame 1010 by using a coordinate $(x_1, y_1)$ of a vertex $P_0$, a coordinate $(x_2, y_2)$ of a vertex $P_1$, and a coordinate $(x_3, y_3)$ of a vertex $P_2$, which are included in the object 1020.

The setter 143 sets a bounding box for the frame 1010 by using a maximum value and a minimum value of horizontal-direction components, and a maximum value and a minimum value of vertical-direction components in the coordinate $(x_1, y_1)$ of the vertex $P_0$, the coordinate $(x_2, y_2)$ of the vertex $P_1$, and the coordinate $(x_3, y_3)$ of the vertex $P_2$. The setter 143 selects a maximum value $x_3$ and a minimum value $(x_1)$ from among x-coordinate components $x_1$, $x_2$, and $x_3$ of the vertices $P_0$, $P_1$, and $P_2$. Further, the setter 143 selects a maximum value $y_2$ and a minimum value $y_1$ from among y-coordinate components $y_1$, $y_2$, and $y_3$ of the vertices $P_0$, $P_1$, and $P_2$. The setter 143 forms a first coordinate $(x_3, y_2)$ by using the maximum value of the x-coordinate components and a maximum value of the y-coordinate components. The setter 143 sets a second coordinate $(x_1, y_1)$ by using a maximum value of the x-coordinate components and a minimum value of the y-coordinate components. Also, the setter 143 sets a rectangle, having a diagonal line connecting the first coordinate $(x_3, y_2)$ to the second coordinate $(x_1, y_1)$, as the bounding box 1030.

FIG. 12B shows an example of allocating an identification value of the first path $e_0$ to tile included in the bounding box 1030. Although not shown in FIG. 12B, identification values of the second path $e_1$ and the third path $e_2$ may be allocated to tile included in the bounding box 1030.

Compared to the tiles 720 and 730 in FIG. 7, FIG. 12B shows that Edge_List is not generated for tiles 1050 that are not included in the bounding box 1030, among tiles arranged in a left direction from tiles 1040 that includes the first path $e_0$. In other words, the allocator 142 generates Edge_List for tiles included in the bounding box 1030.

As described above, the setter 143 sets a bounding box that includes a minimum number of tiles to which an identification value of a path is to be allocated. Thus, the setter 143 operates a winding number for the minimum number of the tiles. Accordingly, the rendering apparatus 100 quickly performs path rendering.

Figure 13:
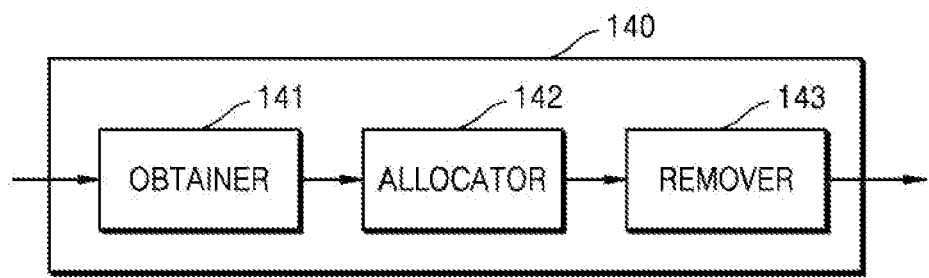
FIG. 13 illustrates a structural block diagram showing another example of the binner, according to an embodiment.

FIG. 13 illustrates a structural block diagram showing another example of the binner 140, according to an embodiment.

Referring to FIG. 13, the binner 140 includes the obtainer 141, the allocator 142, and a remover 144. The remover 144 corresponds to one or more processors. A processor is implemented as an array of a plurality of logic gates or as a combination of a general-use microprocessor, and a memory storing a program executable in the microprocessor. Alternatively, it may be understood by one of ordinary skill in the art that the remover 144 may be embodied as another hardware structure.

An example of operating the obtainer 141 and the allocator 142 is described above with reference to FIGS. 2 through 12. Accordingly, hereinafter, the detailed description about the obtainer 141 and the allocator 142 previously discussed is incorporated herein.

The remover 144 removes an identification value allocated to at least one tile from among tiles to which the identification value is allocated. The remover 144 removes the identification value according to a relation between locations of tiles that includes at least one path. In other words, the remover 144 removes an identification value of some tiles to which an identification value was already allocated by the allocator 142.

Hereinafter, an example of removing by the remover 144 of an identification value allocated to tiles, is described with reference to FIGS. 14 through 20.

Figure 14:
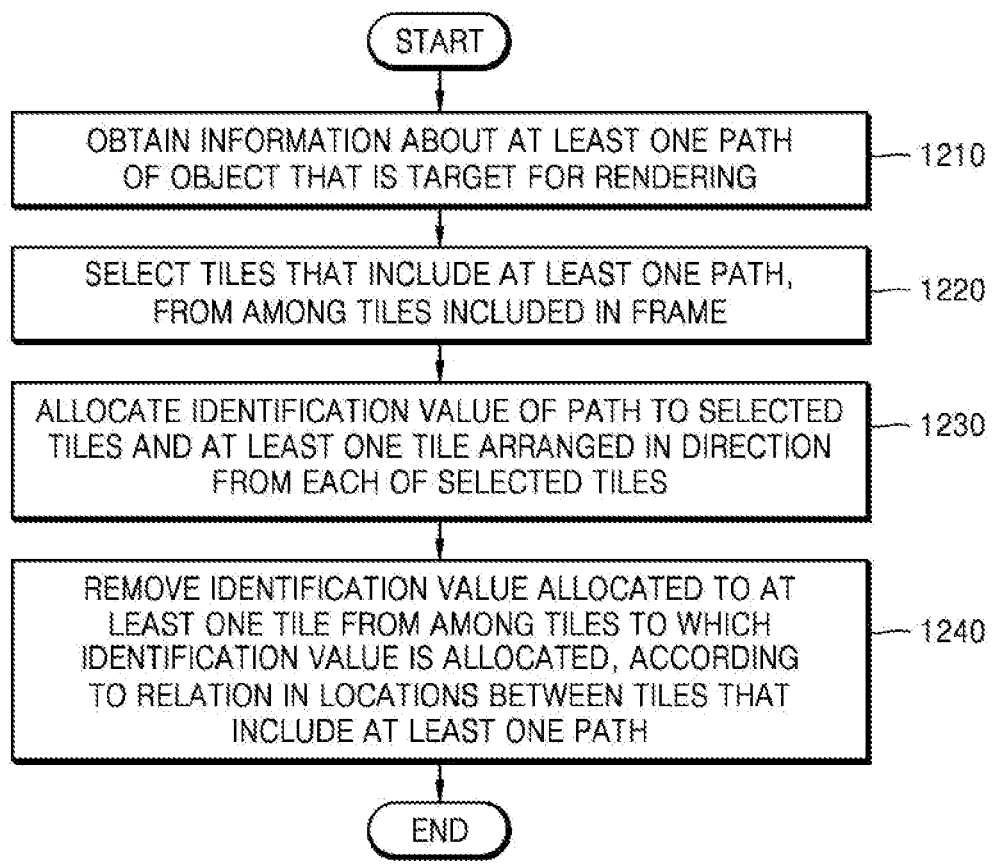
FIG. 14 illustrates a flowchart showing another example of an operation performed by the binner, according to an embodiment.

FIG. 14 illustrates a flowchart showing another example of an operation performed by the binner 140, according to an embodiment.

Operations 1210 through 1230 described with reference to FIG. 14 are same to operations 310 through 330 described with reference to FIG. 3. Accordingly, a detailed description about operations 1210 through 1230 is omitted and the descriptions of operations 310 and 330 are incorporated herein.

In operation 1240, the remover 144 removes an identification value allocated to at least one tile from among tiles to which the identification value is allocated. The remover 144 removes the identification value according to a relation between locations of tiles that includes at least one path. For example, the remover 144 determines that a tile from which an identification value is to be removed by using a coordinate of a tile through which the path passes.

Figure 15:
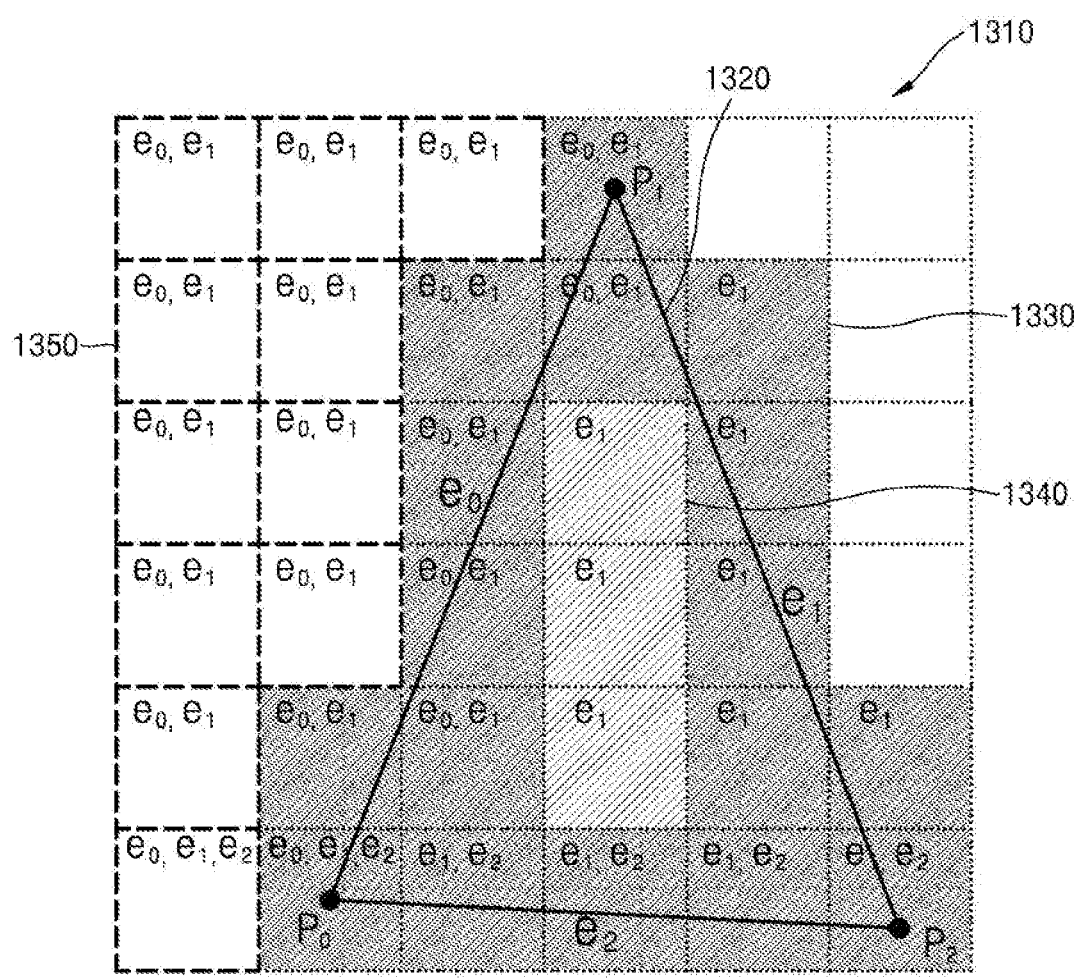
FIG. 15 illustrates a diagram showing an example of allocating an identification value of a path to tiles included in a frame, according to an embodiment.

FIG. 15 illustrates a diagram showing an example of allocating an identification value of a path to tiles included in a frame 1310, according to an embodiment.

Referring to FIG. 15, an object 1320 in the form of a triangle is shown in the frame 1310. It is assumed that the object 1320 includes a first path $e_0$ that is an edge extending from a vertex $P_0$ to a vertex $P_1$, a second path $e_1$ that is an edge extending from the vertex $P_1$ to a vertex $P_2$, and a third path $e_2$ that is an edge extending from the vertex $P_2$ to the vertex $P_0$.

The allocator 142 assigns an identification value of a path to tiles 1330 that include the first path $e_0$, the second path $e_1$, and the third path $e_2$ and to tiles 1340 and 1350 adjacent the left side of the tiles 1330. In other words, the allocator 142 generates Edge_List for each of the tiles 1340 and 1350. Accordingly, Edge_List that includes information about a path is generated for some tiles included in the frame 1310, and Edge_List that includes information about a plurality of paths are generated for other tiles.

From among the tiles 1330 through 1350 for which the Edge_List is generated, tiles 1350 are tiles for which Edge_List is unnecessarily generated. If path rendering is performed by the rendering apparatus 100, colors are set for pixels in the object 1320. In other words, colors are not set for pixels included in the tiles 1350. Accordingly, generating of the Edge_List for the tiles 1350, which is performed by the allocator 142, or operating of a winding number for the tiles 1350, which is performed by the winding number operator 150, corresponds to unnecessary work. As a result, when the remover 144 removes the Edge_List generated for the tiles 1350, efficiency of the rendering apparatus 100 is enhanced.

The remover 144 removes an identification value allocated to the tiles 1350 by using coordinates of the tiles 1330 that include the paths $e_0$, $e_1$, and $e_2$. Hereinafter, examples of removing an identification value allocated to the tiles 1350, which is performed by the remover 144, are described with reference to FIGS. 16 through 20.

Figure 16:
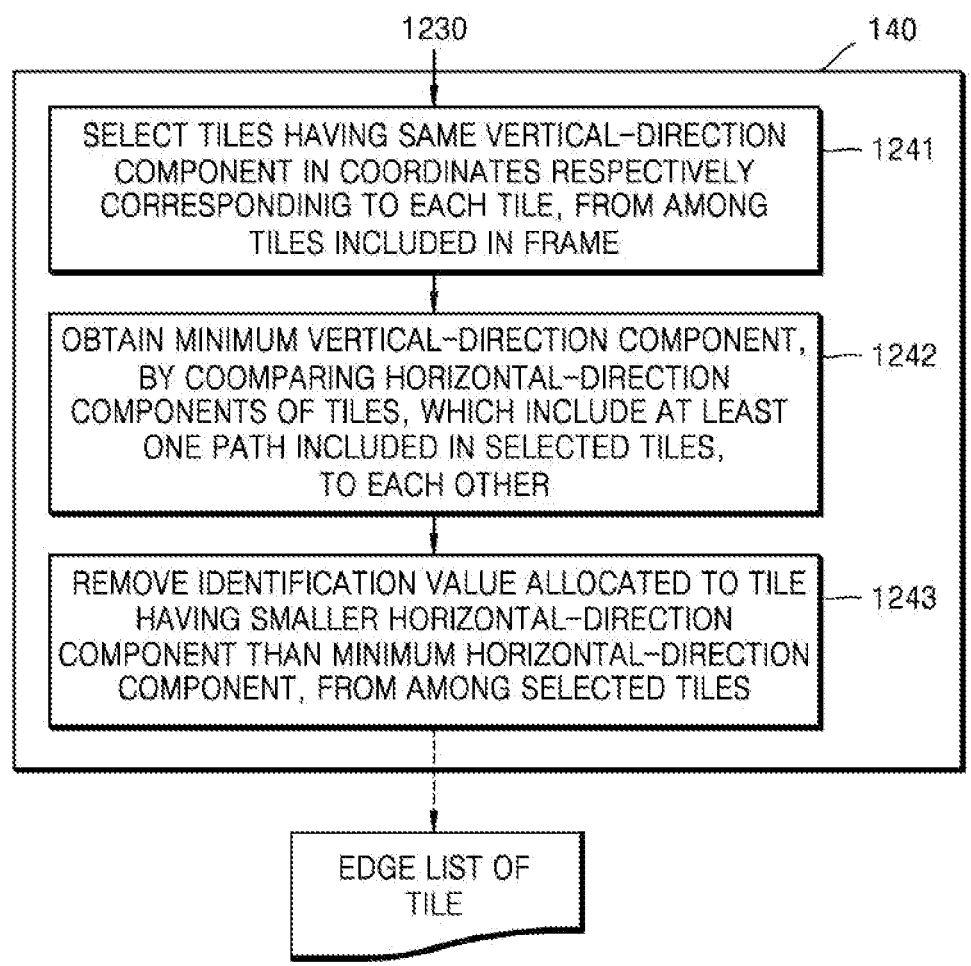
FIG. 16 illustrates an example of removing by a remover of an identification value allocated to a tile, according to an embodiment.

FIG. 16 illustrates an example of removing by the remover 144 an identification value allocated to a tile, according to an embodiment.

Operations 1241 through 1243 described with reference to FIG. 16 are provided to describe operation 1240 described with reference to FIG. 12. Accordingly, it is assumed that operation 1241, described with reference to FIG. 16, is performed after operation 1320 described with reference to FIG. 12.

In operation 1241, the remover 144 selects tiles having a same vertical direction component in coordinates corresponding to tiles, from among tiles included in a frame. In other words, tiles selected by the remover 144 correspond to tiles having a same vertical-direction component, and different horizontal components from each other. For example, the remover 144 selects tiles included in a same row from among the tiles included in the frame. However, tiles included in a same column are selected according to a direction in which a coordinate axis is set.

A coordinate of tiles is preset by the binner 140. For example, assuming that a frame is divided into 36 tiles, the binner 140 sets a coordinate for each of the 36 tiles with reference a certain tile.

In operation 1242, the remover 144 obtains a minimum horizontal-direction component by comparing horizontal-direction components of tiles, which include one of the paths in the selected tiles. Assuming that, in operation 1241, the remover 144 selected tiles included in a same row, the remover 144 detects horizontal-direction components of tiles that includes the at least one path, from among the tiles included in the same row. Additionally, the remover 144 obtains a minimum horizontal-direction component by comparing the detected horizontal-direction components to each other.

Hereinafter, an example of obtaining by the remover 144 a minimum horizontal-direction component, is described in detail with reference to FIG. 17.

Figure 17:
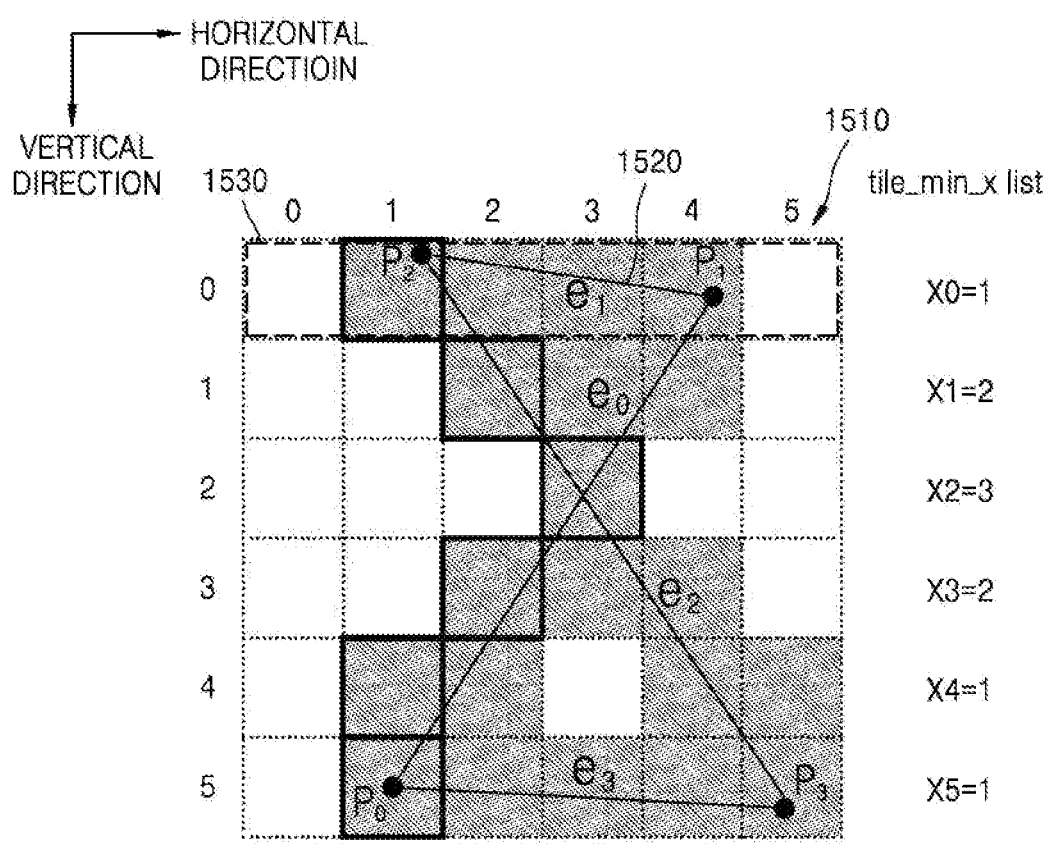
FIG. 17 illustrates a diagram describing an example of obtaining by the remover of a minimum horizontal-direction component, the obtaining being performed by the remover, according to an embodiment.

FIG. 17 illustrates a diagram describing an example of obtaining by the remover 144 a minimum horizontal direction component, according to an embodiment.

FIG. 17 shows an example of an object 1520 included in a frame 1510. It is assumed that the object 1520 includes a first path $e_0$ that is an edge extending from a vertex $P_0$ to a vertex $P_1$, a second path $e_1$ that is an edge extending from the vertex $P_1$ to a vertex $P_2$, a third path $e_2$ that is an edge extending from the vertex $P_2$ to a vertex $P_3$, and a fourth path $e_3$ that is an edge extending from the vertex $P_3$ to the vertex $P_0$.

Additionally, it is assumed that horizontal-direction coordinate components and vertical-direction coordinate components are preset for each of tiles included in the frame 1510. As shown in FIG. 17, it is assumed that the frame 1510 includes 6*6 tiles and that the binner 140 has preset values of 0 through 5 in a horizontal direction and values of 0 through 5 in a vertical direction. Accordingly, coordinates of (0, 0) through (5, 5) are set for tiles included in the frame 1510.

Additionally, the vertical direction and the horizontal direction shown in FIG. 17 may be interchanged. In other words, the horizontal direction shown in FIG. 17 may be the vertical direction, and the vertical direction shown in FIG. 17 may be the horizontal direction. Accordingly, according to an embodiment, a horizontal direction and a vertical direction may be interchanged according to which of the directions is used as a reference direction.

The remover 144 selects tiles having coordinates with vertical components that include values equal to one another, from among tiles included in the frame 1510. The remover 144 selects tiles 1530 having vertical component values equal to 0. In other words, the remover 144 may select a tile (0, 0), a tile (1, 0), a tile (2, 0), a tile (3, 0), and a tile (4, 0).

Additionally, the remover 144 compares horizontal-direction components of tiles that include the paths $e_0$, $e_1$, $e_2$, and $e_3$, from among the selected tiles 1530, to each other. Further, the remover 144 obtains a minimum horizontal-direction component. The remover selects the tile (4, 0) that includes the first path $e_0$ from among the tiles 1530, and determines a minimum horizontal-direction component tile_min_x as 4. The remover 144 updates a minimum horizontal-direction component $x_0$ by using the tile (0, 0), the tile (1, 0), the tile (2, 0), the tile (3, 0), and the tile (4, 0) that include the second path $e_1$, from among the tiles 1530. For example, because a minimum value among horizontal components of tiles that include the second $e_1$ is 1, the remover 144 updates the minimum horizontal component $x_0$ from 4 to 1. Also, from among the tiles 1530, the remover 144 updates the minimum horizontal-direction component $x_0$ by using the tile (1, 0) and the tile (2, 0) that include the third path $e_2$. For example, because a minimum value of horizontal-direction components of tiles that include the third $e_2$ is one (1), the remover 144 maintains the minimum horizontal-direction component $x_0$ to one (1). Thus, the remover 144 determines the minimum horizontal-direction component $x_0$ of the tiles 1530 as one (1).

By using the method described above, the remover 144 obtains minimum horizontal-direction components $x_1$, $x_2$, $x_3$, $x_4$, and $x_5$ for respective tiles having a same vertical-direction component in coordinates. As shown in FIG. 15, the minimum horizontal-direction component $x_1$ is determined as two (2), and the minimum horizontal-direction component $x_2$ is determined as three (3), the minimum horizontal-direction component $x_3$ is determined as two (2), the minimum horizontal-direction component $x_4$ is determined as one (1), and the minimum horizontal-direction component $x_5$ is determined as one (1).

Referring back to FIG. 16, in operation 1243, from among the selected tiles, the remover 144 removes an identification value allocated to a tile having a smaller horizontal-direction component than a minimum horizontal-direction component. In one example, the removing of an identification value allocated to a tile refers to deleting of Edge_List or Curve_List generated for the tile.

Hereinafter, an example of removing an identification value allocated to a tile, which is performed by the remover 144, is described in detail with reference to FIGS. 18A and 18B.

Figure 18B:
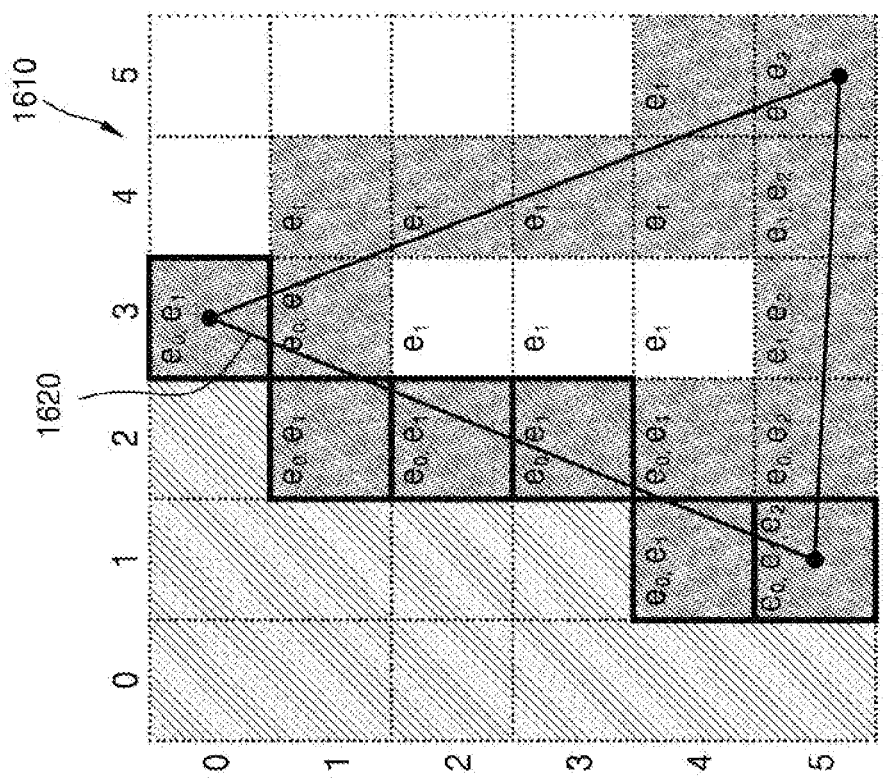
FIGS. 18A and 18B illustrate diagrams describing an example of removing by the remover of an identification value allocated to a tile, according to an embodiment.
Figure 18A:
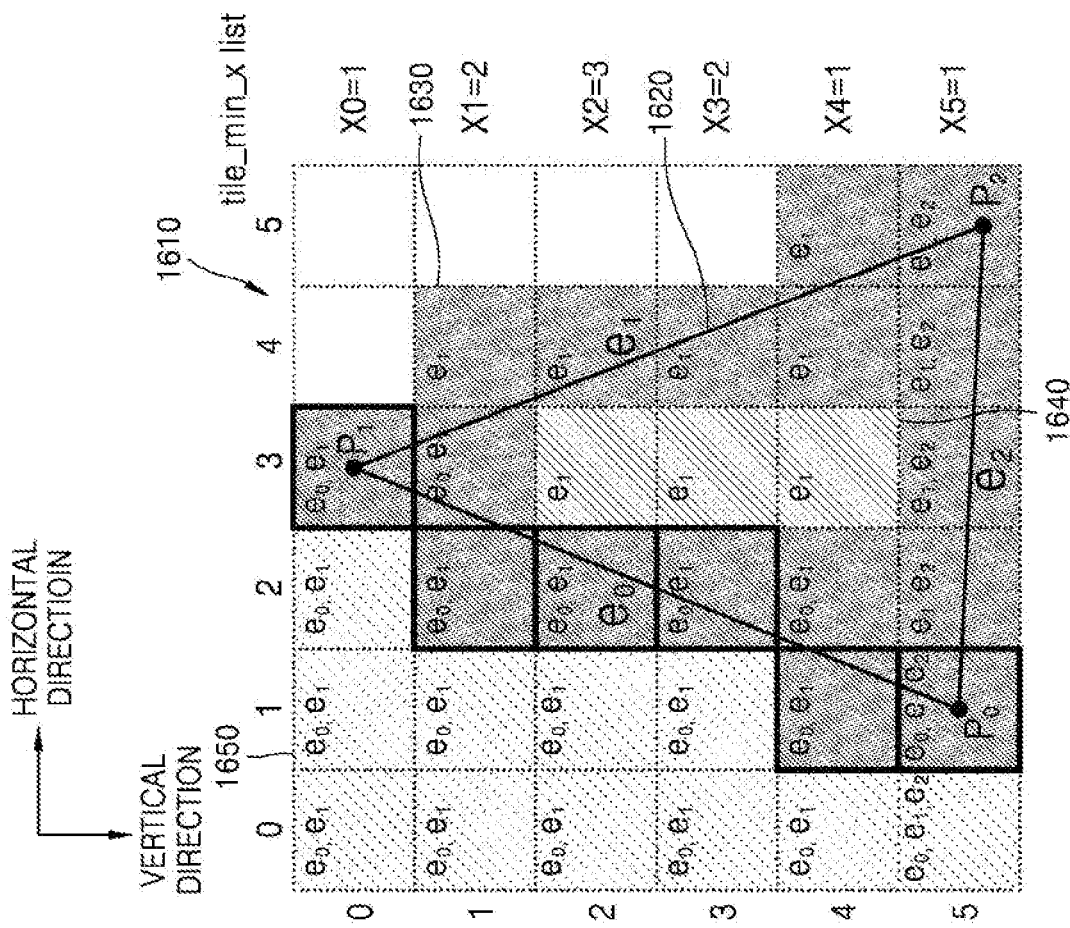

FIGS. 18A and 18B illustrate diagrams describing an example of removing by the remover 144 of an identification value allocated to a tile, according to an embodiment.

FIG. 18A shows an example of an object 1620 included in a frame 1610. The object 1620 is assumed to include a first path $e_0$, which is an edge extending from a vertex $P_0$ to a vertex $P_1$, a second path $e_1$, which is an edge extending from the vertex $P_1$ to a vertex $P_2$, and a third path $e_2$, which is an edge extending from the vertex $P_2$ to the vertex $P_3$. Additionally, FIG. 18 shows an example of generating Edge_List for tiles 1630, which includes the paths $e_0$, $e_1$, and $e_2$ and tiles 1640 and 1650 that are arranged in a left direction from the tiles 1630. A person of ordinary skill in the relevant art will appreciate that the object 1620 may include less than or additional to the three paths $e_0$, $e_1$, and $e_2$ and tiles 1640 and 1650 illustrated and described without departing from the intended scope of the embodiment.

The remover 144 removes an identification value. In other words, the remover 144 removes Edge_List allocated to a tile having a smaller horizontal-direction component than a minimum-direction component, from among tiles having a same vertical-direction component in coordinates.

Referring back to FIG. 17, because the minimum horizontal-direction component $x_0$ of the tiles 1530 is one (1) tile, the remover 144 removes an identification value allocated to the tile (0, 0) having a horizontal-direction component with a value less than one tile. Additionally, because the minimum value of the horizontal component $x_1$ is two (2) tiles among tiles having a vertical component with a value of one (1) tile, the remover 144 removes an identification value assigned to the tiles (0, 1) and (1, 1) because the values of the horizontal components thereof are less than two (2) tiles. By using such a method, the remover 144 removes an identification value allocated to tiles (0, 2), (1, 2), (2, 2), (0, 3), (1, 3), (0, 4) and (0, 5).

Referring back to FIG. 18A, the remover 144 removes Edge_List generated for the tiles 1650 by using the method described with reference to FIG. 15. In detail, because a minimum horizontal-direction component $x_0$ of tiles included in a first row of the frame 1610 is three (3) tiles, the remover 144 removes Edge-List generated for the tiles (0, 0), (0, 1), and (0, 2). Additionally, because a minimum horizontal-direction component $x_1$ of tiles included in a second row of the frame 1610 is two tiles, the remover 144 removes Edge-List generated for the tiles (1, 0) and (1, 1). By using such a method, the remover 144 removes Edge-List generated for the tiles (2, 0), (2, 1), (3, 0), (3, 1), (4, 0), and (5, 0).

FIG. 18B shows a result obtained by removing an identification value of a path allocated to tiles. Because the remover 144 removes an identification value allocated to tiles that are not needed for rendering of the object 1620, consumption of time and power needed for rendering of the object 1620 are reduced.

A method of removing by the remover 144 of an identification value allocated to a tile, is not limited to the method described with reference to FIGS. 16 through 18B. A tile, from which an identification value is to be removed, may vary depending on a shape of the object 1620. Accordingly, the remover 144 determines a minimum vertical-direction component of tiles having a same horizontal-direction component in coordinates, and determines a tile from which an identification value is to be removed, based on the minimum vertical-direction component.

Hereinafter, another example of removing an identification value allocated to a tile, which is performed by the remover 144, is described.

Figure 19:
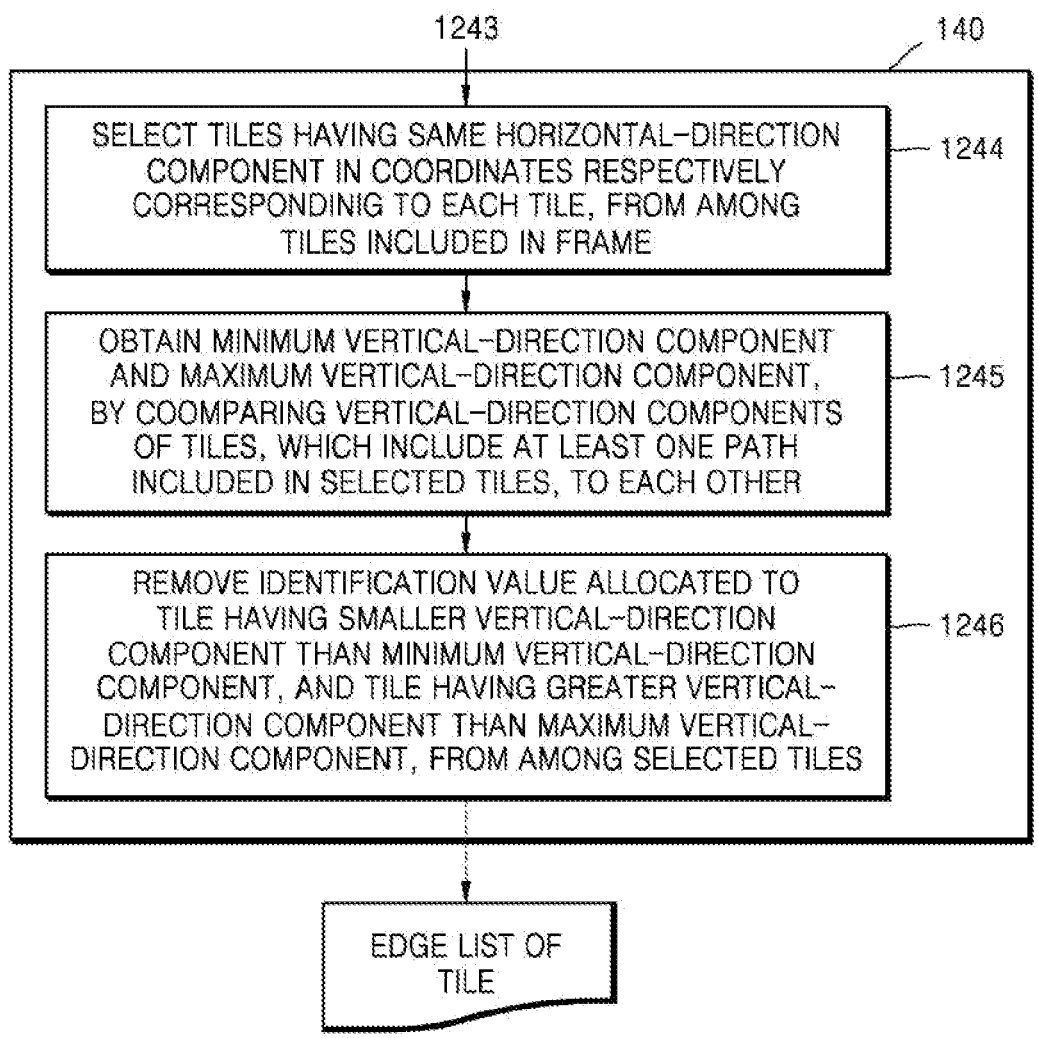
FIG. 19 illustrates a flowchart showing another example of removing by the remover of an identification value allocated to a tile, according to an embodiment.

FIG. 19 illustrates a flowchart showing another example of removing an identification value allocated to a tile, which is performed by the remover 144, according to an embodiment.

Operations 1244 through 1246 described with reference to FIG. 19 are provided to further describe operation 1240 as illustrated and described FIG. 14. Accordingly, in one illustrative example, operation 1244, as illustrated and described in FIG. 19, is performed after operation 1230, as illustrated and described, with reference to FIG. 14.

Additionally, in one embodiment, FIG. 19 shows that operation 1244 is performed after operation 1243, as illustrated and described in FIG. 16. However, embodiments are not limited thereto. In other words, operations 1244 through 1246, as illustrated and described in FIG. 19, may be performed right after operation 1230 as illustrated and described in FIG. 14, without having to perform operations described with reference to FIG. 16.

In operation 1244, from among tiles included in a frame, the remover 144 selects tiles having coordinates whose horizontal component values are equal to one another. In other words, tiles selected by the remover 144 correspond to tiles having horizontal component values equal to one another and vertical component values different from one another. For example, the remover 144 selects tiles included in a same row from among tiles included in a frame. Alternatively, tiles included in a same column are selected according to a direction in which a coordinate axis is set.

A coordinate of a tile is predetermined by the binner 140. In other words, in an example in which a frame is divided into thirty-six tiles, the binner 140 sets a coordinate for each of the thirty-six tiles with reference to a certain tile.

In operation 1245, the remover 144 obtains a minimum horizontal-direction component and a maximum vertical-direction component by comparing horizontal-direction components of tiles, which include one of the paths in the selected tiles. In operation 1244, in one example, from among ties included in the same column, the remover 144 selects tiles included in a same column and detects vertical-direction components of tiles that include the path. Additionally, the remover 144 obtains a minimum horizontal-direction component and a maximum vertical-direction component by comparing the detected horizontal-direction components to each other.

In operation 1246, from among the selected tiles, the remover 144 removes an identification value allocated to tiles having a smaller vertical-direction component than the minimum vertical-direction component. Additionally, the remover 144 removes an identification value allocated to tiles having a greater vertical-direction component than the maximum vertical-direction component, from among the selected tiles. In one example, the removing of an identification value allocated to a tile refers to deleting of Edge_List or Curve_List generated for the tile.

Hereinafter, an example of removing an identification value allocated to a tile, which is performed by the remover 144, is described in detail with reference to FIG. 20.

Figure 20:
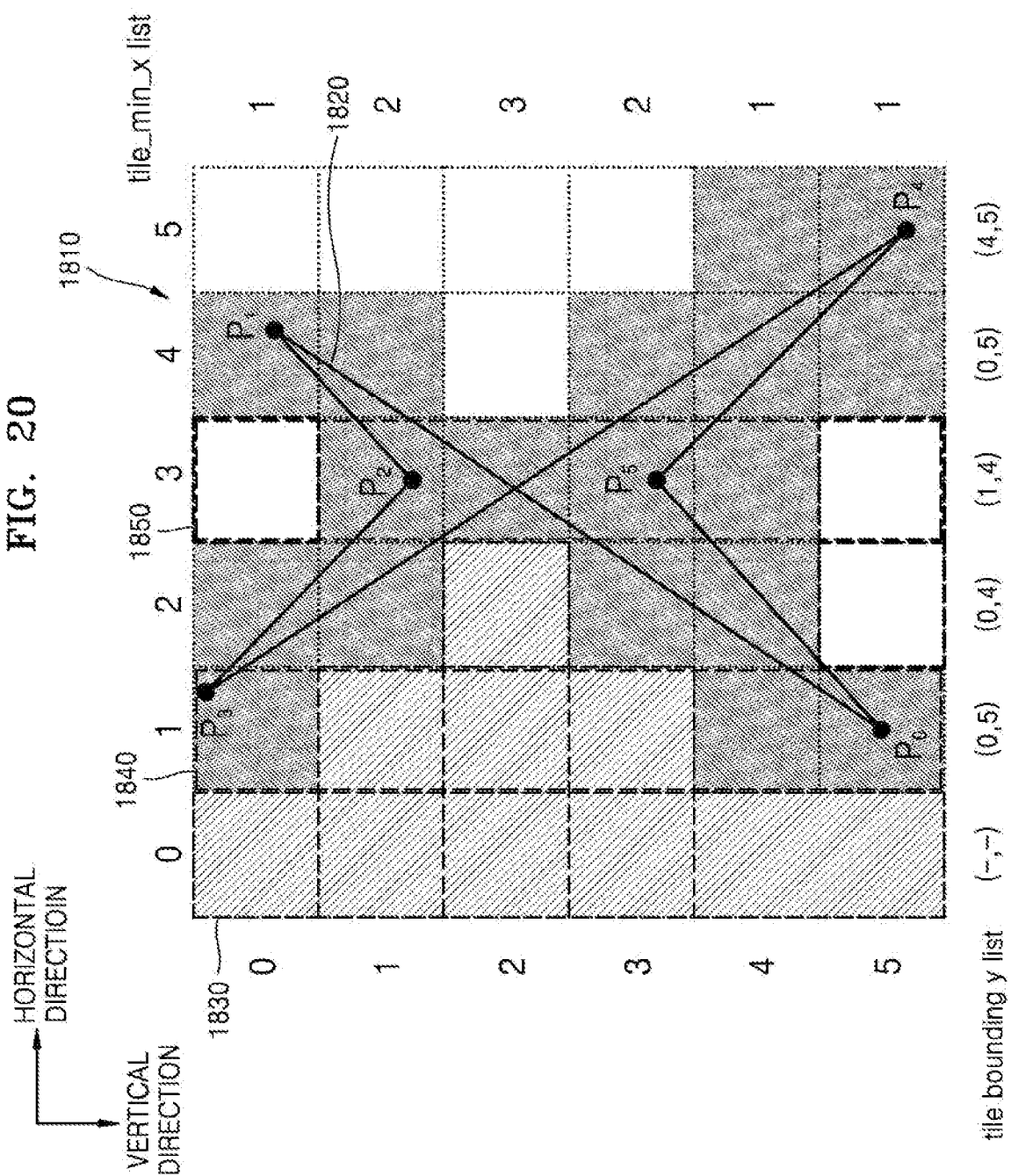
FIG. 20 illustrates a diagram describing another example of removing by the remover of an identification value allocated to a tile, according to an embodiment.

FIG. 20 illustrates diagrams describing another example of removing an identification value allocated to a tile, which is performed by the remover 144, according to an embodiment.

FIG. 20 shows an example of an object 1820 included in a frame 1810. In one illustrative example, the object 1820 includes edges sequentially connected between vertices $P_0$ through $P_5$. Additionally, although not shown in FIG. 20, an identification value of a path may be allocated to, such as, Edge_List being generated, each tile included in the frame 1810.

Additionally, in one embodiment, a horizontal-direction coordinate component and a vertical-direction coordinate component are preset for each tile included in the frame 1810. As shown in FIG. 20, the frame 1810 includes 6*6 (six-by-six) tiles and that the binner 150 has preset values of zero through five in a horizontal direction and values of zero through five in a vertical direction. Accordingly, coordinates of (0, 0) through (5, 5) are set for the tiles included in the frame 1810.

Additionally, the vertical direction and the horizontal direction, shown in FIG. 20, may be interchanged. In other words, the horizontal direction shown in FIG. 20 may be the vertical direction, and the vertical direction shown in FIG. 20 may be the horizontal direction. Accordingly, according to an embodiment, a horizontal direction and a vertical direction may be interchanged and one of the directions is used as a reference direction.

As described above with reference to FIGS. 16 through 18B, the remover 144 removes an identification value allocated to some tiles 1830 from among the tiles included in the frame 1810. In other words, the remover 144 obtains minimum horizontal-direction components tile_min_x list by using a coordinate component of tiles, and removes an identification value allocated to the tiles 1830 by using the minimum horizontal-direction component tile_min_x list.

From among the tiles included in the frame 1810, the remover 144 selects tiles having a same vertical-direction component in coordinates. The remover 144 selects tiles 1840 having a vertical-direction component with a value equal to one (1). In other words, the remover 144 select a tile (0, 1), a tile (1, 1), a tile (2, 1), a tile (3, 1), and a tile (4, 1).

Additionally, the remover 144 compares vertical-direction components of tiles to each other that include paths $e_0$, $e_1$, $e_2$, and $e_3$, from among the selected tiles 1840. Also, the remover 144 obtains a minimum vertical-direction component and a maximum vertical-direction component. For example, the remover 144 determines the minimum vertical-direction component of the tiles 1840 as zero (0) and the maximum vertical-direction component of the tiles 1840 as five (5). In one example, the method described with reference to FIG. 17 may be employed as a method performed by the remover 144 to obtain a minimum horizontal-direction component and a minimum horizontal-direction component.

In the method described above, the remover 144 is configured to obtain a minimum vertical-direction component and a maximum vertical-direction component for respective tiles having a same vertical-direction component in coordinates. As shown in FIG. 20, a minimum vertical-direction component in a third column is determined as zero (0) and a maximum vertical-direction component in the third column is determined as four (4). Additionally, a minimum vertical-direction component in a fourth column is determined as one (1) and a maximum vertical-direction component in the fourth column is determined as four (4). A minimum vertical-direction component in a fifth column is determined as zero (0) and a maximum vertical-direction component in the fifth column is determined as five (5). A minimum vertical-direction component in a sixth column may be determined as four and a maximum vertical-direction component in the sixth column may be determined as five.

From among tiles having a same horizontal-direction component in coordinates, the remover 144 removes an identification value allocated to a tile, such as Edge_List, which has a smaller vertical-direction component than a minimum vertical-direction component. Additionally, from among tiles having a same horizontal-direction component in coordinates, the remover 144 removes an identification value, such as Edge_List, allocated to a tile, which has a greater vertical-direction component than a maximum vertical-direction component. For example, because a minimum vertical-direction component of the tiles 1850 is one (1), the remover 144 removes an identification value allocated to a tile (0, 3) having a vertical-direction component with a value less than one (1). Additionally, because a maximum vertical-direction component of the tiles 1850 is four (4), the remover 144 removes an identification value allocated to a tile (5, 3) having a vertical-direction component with a value of greater than one (1).

The remover 144 removes an identification value allocated to tiles (5, 2), (0, 3) and (5, 3), by using such a method. Accordingly, the rendering apparatus 100 efficiently performs rendering on the object 1830.

As described with reference to FIGS. 10 through 12, the setter 143 sets a bounding box for a frame. If a bounding box is set for a frame, the remover 144 removes an identification value only from tiles included in the bounding box.

FIGS. 21A and 21B illustrate diagrams describing an example of operating the remover 144 if a bounding box is set in a frame, according to an embodiment.

Referring to FIG. 21A, an object 1920 is shown in a frame 1910, and a bounding box 1930 is set outside the object 1920. The setter 143 sets the bounding box 1930 for the frame 1910 by using coordinates corresponding to vertices $P_0$, $P_1$, and $P_2$ included in the object 1920. Additionally, from among tiles included in the frame 1910, the allocator 142 allocates an identification value of a path for the tiles included in the bounding box 1930. An example of generating Edge_List for the tiles included in the bounding box 1930 is shown in FIG. 21A.

The remover 144 removes an identification value allocated to some tiles, from among the tiles to which an identification value is allocated. For example, the remover 144 obtains minimum horizontal-direction components tile_min_x list by using the method described with reference to FIGS. 13 through 20, and removes identification value that are not needed, by using the minimum horizontal-direction components tile_min_x list.

FIG. 21B illustrates a result obtained by the remover 144 removing identification values allocated to some tiles. Comparing the diagrams shown in FIG. 21A to the diagram shown in FIG. 21B, a person of ordinary skill in the relevant art will appreciate that the remover 144 removes identification values allocated to the tiles 1940. A method of removing by the remover 144 of identification values allocated to the tiles 1940, is described above with reference to FIGS. 13 through 20. Accordingly, a detailed description thereof is not provided here again.

Figure 22:
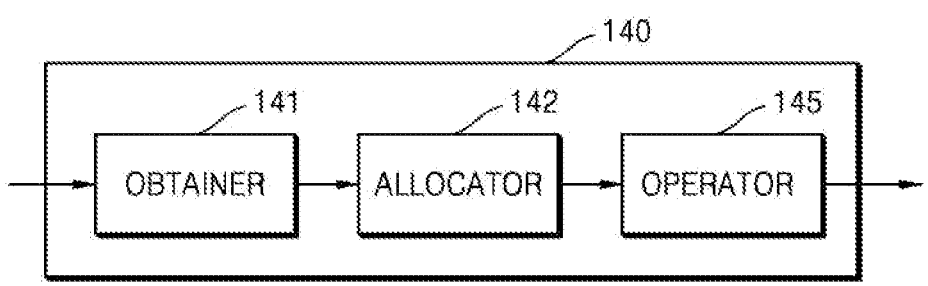
FIG. 22 illustrates a structural block diagram showing another example of the binner, according to an embodiment.

FIG. 22 illustrates a structural block diagram showing another example of the binner 140, according to an embodiment.

Referring to FIG. 22, the binner 140 includes the obtainer 141, the allocator 142, and the operator 145. The operator 145 corresponds to one or more processors. A processor is implemented as an array of a plurality of logic gates or as a combination of a general-use microprocessor and a memory storing a program executable in the microprocessor. Alternatively, it may be understood by one of ordinary skill in the art that the operator 145 is embodied as hardware.

An example of operating the obtainer 141 and the allocator 142 is described above with reference to FIGS. 2 through 21. Accordingly, hereinafter, a detailed description about the obtainer 141 and the allocator 142 previously described is incorporated herein.

The operator 145 operates an initial winding number for at least one tile arranged in a direction away from third tiles. The one tile is selected from among tiles that include a path. In one example, the third tiles refer to tiles other than a first tile that includes a starting vertex of the path and a second tile that includes an end point of the path.

An initial winding number for a tile is operated when an identification value, such as Edge_List or Curve_List, of a path is allocated to the tile. However, generally, an identification value is not allocated to the tiles 731 of FIG. 7 and arranged in a direction away from the tiles 721 of FIG. 7. Further, the identification value is not allocated to the tiles 731 that include a starting point of a path, and the tiles 732 of FIG. 7 and arranged in a direction away from the tiles 722 of FIG. 7 and include a starting point of a path.

If an object is in the shape of a closed polygon in which a plurality of paths are combined and a first path is connected to a second path, an end point of the first path is a starting vertex of the second path. In other words, a tile that includes the end vertex of the first path is identical to a tile that includes the starting vertex of the second path. Accordingly, generally, an initial winding number for the tiles 732, shown in FIG. 7, is defined after processing of the second path, as well as the first path, is finished. Accordingly, each path is not independently processed, and dependency may occur when a path is processed.

According to an embodiment, as shown in FIG. 7, the allocator 142 allocates an identification value of a path to the tiles 731 and arranged in a direction away from the tiles 721 and the tiles 732, and arranged in a direction away from the tiles 722. Accordingly, the operator 145 defines an initial winding number for tiles independently for each path. In other words, because the rendering apparatus 100 independently processes each path, that is, processes the paths in parallel to each other, time and cost, such as, power consumption needed to operate the rendering apparatus 100 is reduced.

Hereinafter, an example of operating an initial winding number for tiles, which is performed by the operator 145, is described with reference to FIGS. 23 through 30B.

Figure 23:
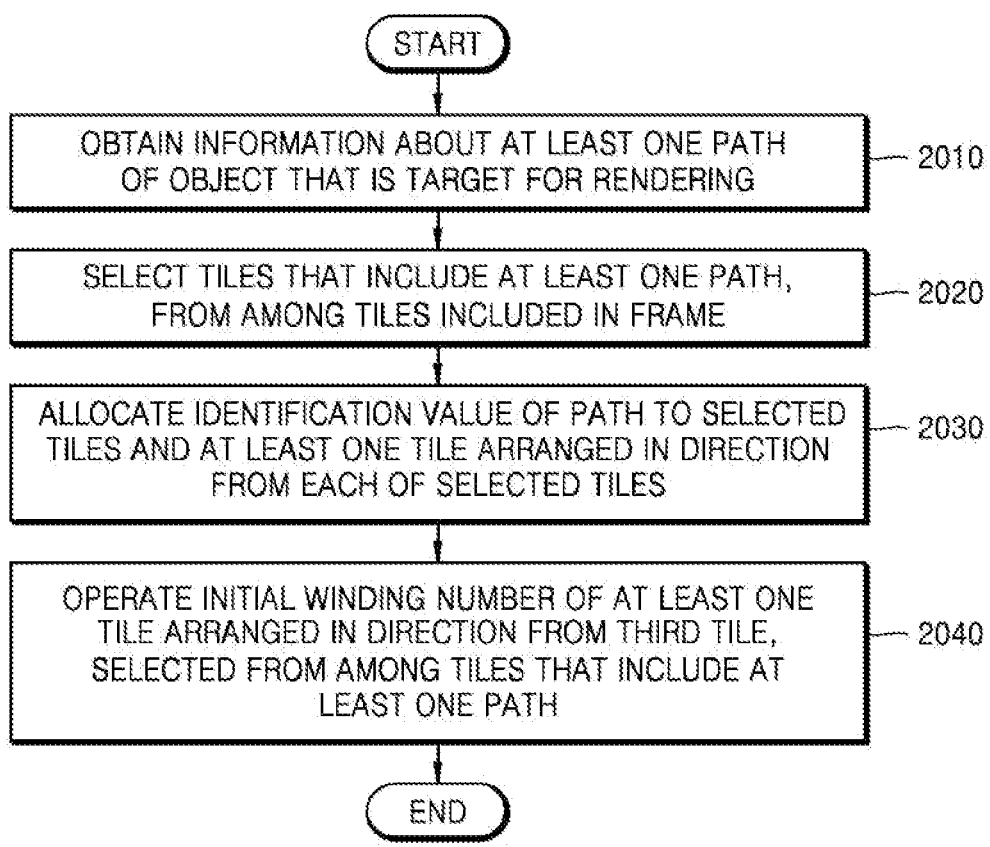
FIG. 23 illustrates a flowchart showing another example of an operation performed by the binner, according to an embodiment.

FIG. 23 illustrates a flowchart showing another example of an operation performed by the binner 140, according to an embodiment.

Operations 2010 through 2030 described with reference to FIG. 23 are same as operations 310 through 330 described with reference to FIG. 3. Accordingly, a detailed description about operations 2010 through 2030 are not provided here again.

In operation 2040, the operator 145 operates an initial winding number for tiles arranged in a direction away from third tiles, selected from among tiles that include at least one path. For example, the operator 145 calculates initial winding numbers assigned to tiles arranged in one direction away from the third tiles, based on a shape formed by a path that passes through the third tiles. In detail, the operator 145 operates an initial winding number, based on a direction in which a path passes through the third tiles.

The initial winding number refers to an initial value used for the winding number operator 150 to operate a winding number for a tile. Hereinafter, a winding number is described in detail, with reference to FIGS. 24A and 24B.

Figure 24A:
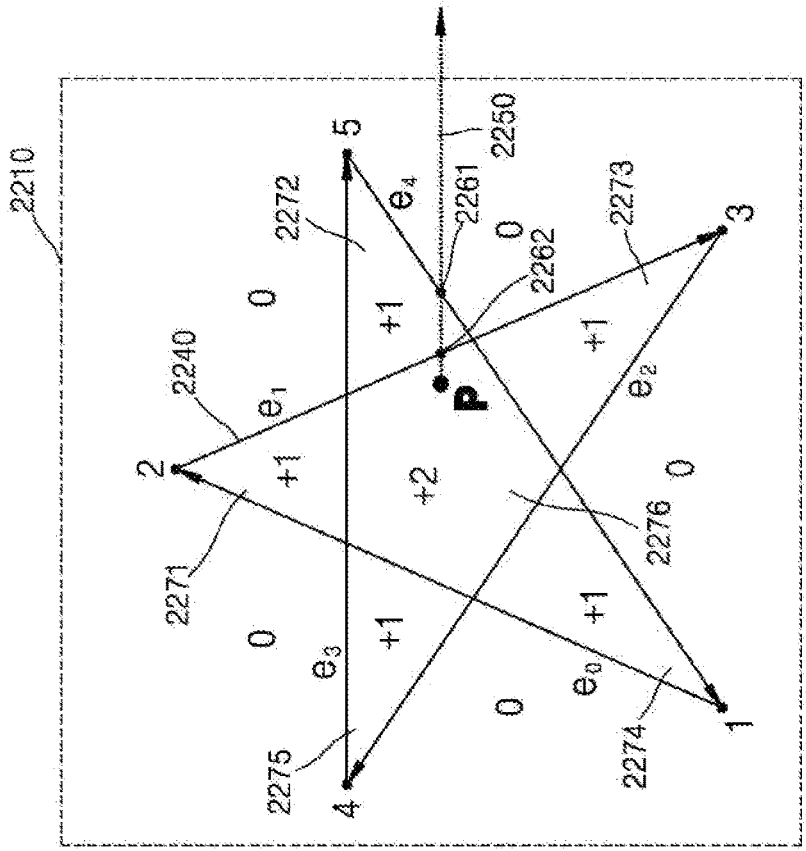
FIGS. 24A and 24B illustrate diagrams describing a winding number, according to an embodiment.
Figure 24B:
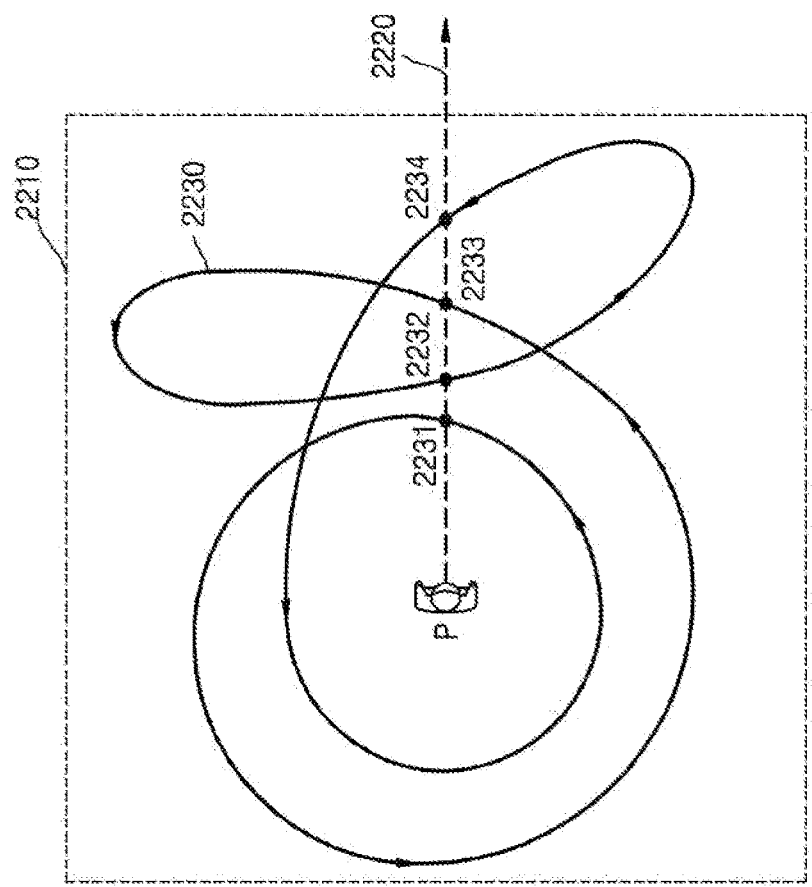

FIGS. 24A and 24B illustrate diagrams describing a winding number, according to an embodiment.

FIGS. 24A and 24B show an example describing a winding number corresponding to a pixel P from among pixels included in a frame 2210. For convenience of description, FIG. 24A shows the pixel P in the form of a person viewing in a direction, for example, a right direction.

Referring to FIG. 24A, a path 2230 is shown along a periphery of the pixel P, and the path 2230 is shown as a closed path. FIG. 24A shows that a winding number for the pixel P is operated based on vertices 2231 through 2234 on the path 2230, which are present at a right side of the pixel P. However, operating of a winding number is not limited to a right side. In one example, a right side of the pixel P refers to vertices on a virtual half line 2220 drawn in a right horizontal direction from the pixel P.

If the virtual half line 2220 is drawn from the pixel P in a right horizontal direction, the virtual half line 2220 and the path 2230 cross each other at first 2231 through fourth vertices 2234. In other words, the path 2230 is drawn to include the first 2231 through fourth vertices 2234. Accordingly, a winding number for the pixel P is determined based on a direction in which the path 2230 is drawn at each of the first 2231 through fourth vertices 2234.

In detail, a direction in which the path 2230 is drawn at the first vertex 2231 corresponds to a counterclockwise direction. In other words, the path 2230 is drawn in an upward direction. Accordingly, in one example, a winding number for the pixel P is $-1$. A direction in which the path 2230 is drawn at the second vertex 2232 corresponds to a clockwise direction or in a downward direction. Thus, a winding number for the pixel P is operated to be $-1+1=0$. A direction in which the path 2230 is drawn at the third vertex 2233 corresponds to a counterclockwise direction. Further, a winding number for the pixel P is operated to be $-1+1-1=-1$. A direction in which the path 2230 is drawn at the fourth vertex 2234 corresponds to a counterclockwise direction. As a result, a winding number for the pixel P is operated to be $-1+1-1-1=-2$.

Referring to FIG. 24B, five paths are located along a periphery of the pixel P, and the five paths form an object 2240 in the shape of a star. For example, the object 2240 in the form of the star is formed by combining an edge $e_0$ extending from a vertex 1 to a vertex 2, an edge $e_1$ extending from the vertex 2 to a vertex 3, an edge $e_2$ extending from the vertex 3 to a vertex 4, an edge $e_3$ extending from the vertex 4 to a vertex 5, and an edge ea extending from the vertex 5 to the vertex 1.

As described with reference to FIG. 24A, a winding number for the pixel P shown in FIG. 24B is operated based on a direction in which a path is drawn at vertices 2261 and 2262 at which a virtual line 2250, drawn in a right horizontal direction from the pixel P, and paths cross each other.

Accordingly, a winding number for pixels in areas 2271 through 2275, differentiated from each other by the paths, is operated to be +1, and a winding number for pixels in an area 2276 is operated to be +2. Additionally, a winding number for pixels that are not included in the area 2271 through 2276; that is, pixels not included in the object 240, from among the pixels included in the frame 2210, is operated as 0.

Referring to FIGS. 24A and 24B, a winding number for the pixel P is described as being operated considering a path located at the right side of the pixel P. However, the operating of the winding number is not limited thereto. In other words, in an alternative embodiment, the winding number operator 150 operates a winding number for the pixel P considering at least one of a path located at one from among a left side, a right side, an upper side, and a lower side of the pixel P. The winding number operator 150 operates a winding number for the pixel P, without having to use a stencil buffer.

Additionally, according to an embodiment, the winding number operator 150 operates a winding number by using threads. A single thread is used to operate a winding number for a single pixel. Because the threads are processed in parallel to each other, the winding number operator 150 operates a winding number for each of the pixels by using the threads at a same time. Accordingly, the rendering apparatus 100 perform path rendering quickly.

Figure 25:
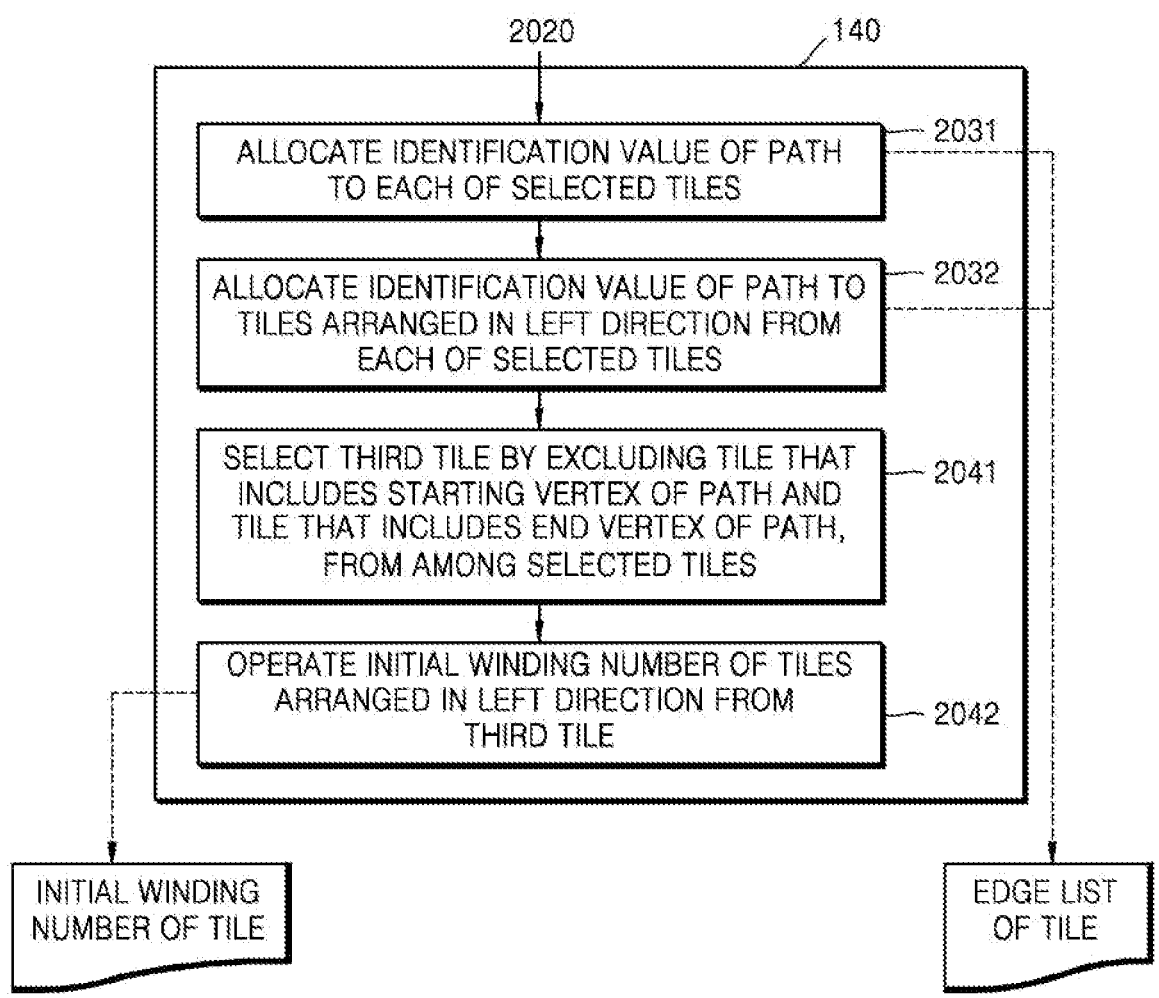
FIG. 25 illustrates a flowchart showing an example of operating by an operator of an initial winding number for a tile, according to an embodiment.

FIG. 25 illustrates a flowchart showing an example of allocating by the allocator 142 of an identification value of a path to a tile, and operating by the operator 145 of an initial winding number for the tile, according to an embodiment.

Operations 2031 through 2042 described with reference to FIG. 25 are provided to describe operations 2030 and 2040 described with reference to FIG. 23 in detail. Accordingly, that the description of operation 2031 described with reference to FIG. 25 is performed after operation 2020 described with reference to FIG. 23 is performed.

In operation 2031, the allocator 142 allocates an identification value of a path to each of selected tiles. In other words, the allocator 142 allocates an identification value of the path to each of tiles through which the path passes. For instance, the allocator 142 generates Edge_List or Curve_List.

In operation 2032, the allocator 142 allocates an identification value of the path to tiles arranged in a left direction from each of the selected tiles. In other words, the allocator 142 allocates an identification value of the path to tiles arranged in a left direction, from each of the tiles through which the path passes.

In operation 2041, the operator 145 selects third tiles by excluding a tile that includes a starting vertex of the path and a tile that includes an end vertex of the path. For example, assuming that the path is located over tiles X, Y, Z, and W and the path is an edge extending from a vertex $P_0$ included in the tile X to a vertex $P_1$ included in the tile W, the operator 145 determines the tiles Y and Z as the third tiles.

In operation 2040, the operator 145 operates an initial winding number for tiles arranged in a left direction from the third tiles. In the example described above, the operator 145 operates a winding number for tiles arranged in a left direction from the tile Y and a winding number for tiles arranged in a left direction from the tile Z. In one configuration, the operator 145 operates an initial winding number for the tiles arranged in a left direction from the third tiles. However, operating of an initial winding number is not limited thereto. In other words, if the operator 145 calculates a winding number in the same direction for all tiles included in a frame, the direction may be any direction.

The operator 145 operates an initial winding number for the tiles arranged in the left direction from the third tiles, by increasing or decreasing a predetermined value according to a direction in which the path passes through the third tiles. Additionally, the third tiles exclude a tile that includes a starting vertex of the path and a tile that includes an end vertex of the path. Accordingly, with respect to tiles arranged in a left direction away from tiles, through which the path passes, such as the tiles Y and Z described above), Edge_List is generated and an initial winding number is calculated. However, with respect to tiles arranged in a left direction from a tile that includes a starting vertex of a path, such as the tile X described above, only Edge_List is generated. Additionally, with respect to tiles arranged in a left direction from a tile that includes an end vertex of a path, such as the tile W described above, only Edge_List is generated.

Figure 26:
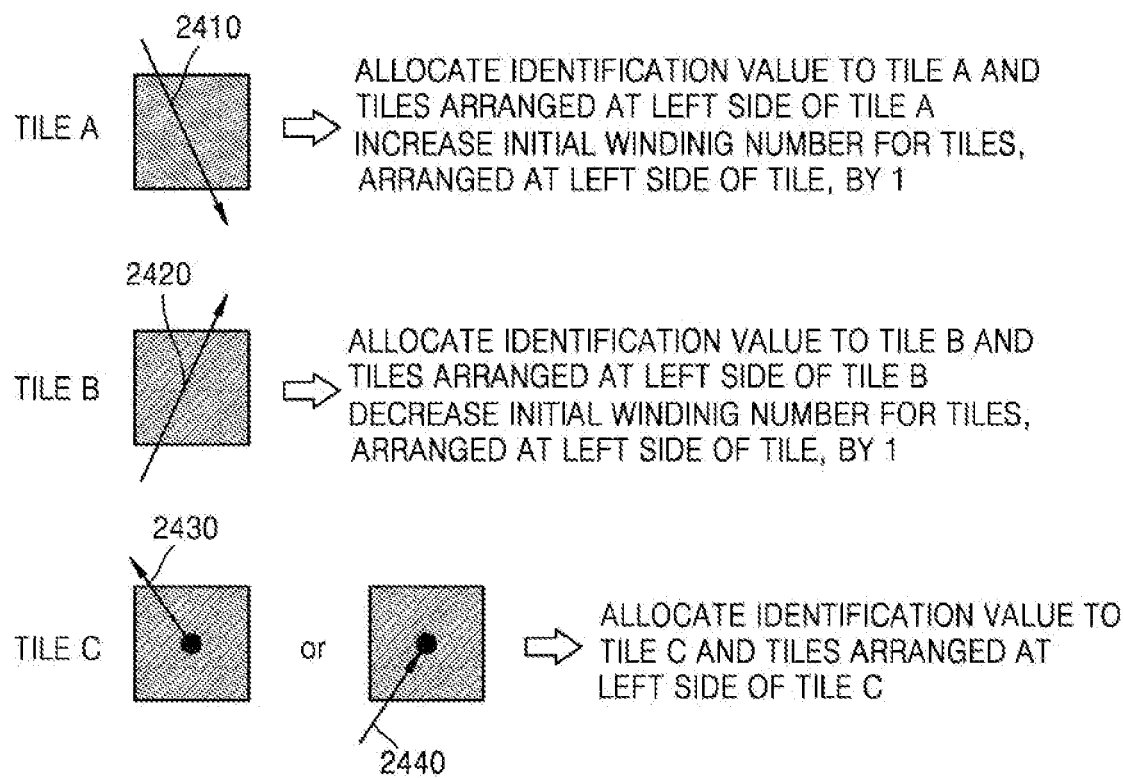
FIG. 26 illustrates a diagram describing an example of allocating by the allocator an identification value of a path to a tile, and operating by the operator of an initial winding number for the tile, according to an embodiment.

FIG. 26 illustrates a diagram describing an example of allocating by the allocator 142 of an identification value of a path to a tile, and operating by the operator 145 of an initial winding number for the tile, according to an embodiment.

The operator 145 operates an initial winding number for tiles according to a certain rule corresponding to a direction in which a path proceeds.

As an example, the operator 145 operates an initial winding number by increasing a predetermined value in response to a path passing in a clockwise direction through two boundaries of a tile that face each other. The operator 145 operates an initial winding number by decreasing a predetermined value in response to a path passing in a counterclockwise direction through two boundaries of a tile that face each other.

As another example, the operator 145 operates an initial winding number by decreasing a predetermined value in response to a path passing in a clockwise direction through two boundaries of a tile that face each other. The operator 145 operates an initial winding number by increasing a predetermined value in response to a path passing in a counterclockwise direction through two boundaries of a tile that face each other. The predetermined value may be one (1), but is not limited thereto. In other words, the predetermined value may correspond to any number value predetermined in accordance with a direction in which a path proceeds, without limitation.

Referring to FIG. 26, the path 2410 passes through a tile A from an upper side to a lower side of the tile A. In other words, the path 2410 passes through the tile A in a clockwise direction. The operator 145 recognizes that the path 2410 passes through the tile A in the clockwise direction, and determines an initial winding number for tiles arranged at the left side of the tile A to be +1. Additionally, the allocator 142 allocates an identification value of the path 2410 to the tile A and the tiles arranged at the left side of the tile A. In one example, the allocator 142 generates Edge_List for the tile A and the tiles arranged at the left side of the tile A.

A path 2420 passes through a tile B from a lower side to an upper side of the tile B. In other words, the path 2410 passes through the tile A in a counterclockwise direction. The operator 145 recognizes that the path 2410 passes through the tile A in the counterclockwise direction, and determines an initial winding number for tiles arranged at the left side of the tile A to be −1. Additionally, the allocator 142 allocates an identification value of the path 2410 to the tile B and the tiles arranged at the left side of the tile B. In one example, the allocator 142 allocates the identification value of the path 2410 to generate Edge_List for the tile B and the tiles arranged at the left side of the tile B.

Paths 2430 and 2440 do not pass through a tile C. For instance, the path 2430 is a path that starts from a vertex included in the tile C, and the path 2440 is a path that ends at a vertex included in the tile C. Accordingly, the operator 145 does not operate an initial winding number for tiles arranged at the left side of the tile C. Instead, the allocator 142 allocates identification values of the paths 2430 and 2440 to the tile C and the tiles arranged at the left side of the tile C.

As shown in FIG. 26, one path is included respectively in the tiles A, B, and C. If the tiles A, B, and C include a plurality of paths, the operator 145 and the allocator 142 perform the above-described method for each path. For example, if two paths passing through the tile A in a clockwise direction are present, the operator 145 determines an initial winding number for the tiles arranged at the left side of the tile A to be +2, and the allocator 142 allocates identification values of both the two paths to the tile A and the tiles arranged at the left side of the tile A.

Hereinafter, an example of operating an initial winding number for a tile, which is performed by the operator 145, is described in detail with reference to FIGS. 27A through 27C.

Figure 27A:
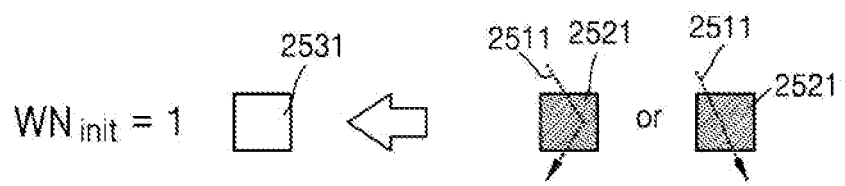
FIGS. 27A through 27C illustrate diagrams showing an example of a rule of providing by the operator an initial winding number, according to an embodiment.
Figure 27B:
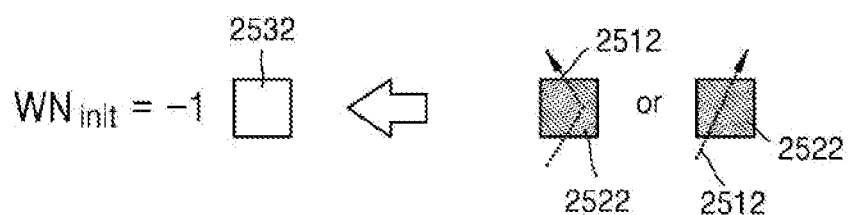
Figure 27C:
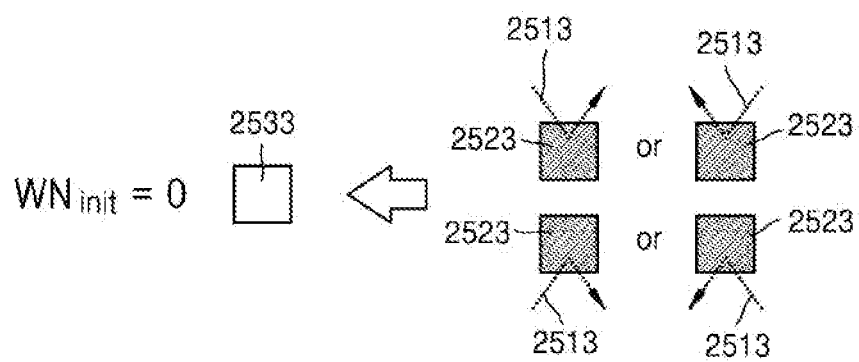

FIGS. 27A through 27C illustrate diagrams showing an example of a rule of providing using the operator 145 an initial winding number.

FIG. 27A shows a case when a path 2511 passes through two boundaries of a tile 2521, which face each other, in a clockwise direction (that is, from an upper side to a lower side of the tile 2521). FIG. 27B shows a case when a path 2512 passes through two boundaries of a tile 2522, which face each other, in a counterclockwise direction. For instance, FIG. 27B shows a case when the path 2512 passes through two boundaries of the tile 2522, which face each other, from a lower side to an upper side of the tile 2521. FIG. 27C shows a case when a path 2513 enters, and then, exits from a tile 2523 through a boundary of the tile 2523.

The tiles 2521 through 2523 shown in FIGS. 27A through 24C are tiles obtained by combining two or more tiles. For example, in response to a path passing through two or more consecutive tiles in a horizontal direction, the two or more consecutive tiles are processed as one tile 2521, 2522, or 2523, as shown in FIGS. 27A through 27C.

Referring to FIG. 27A, in response to the path 2511 passing in a clockwise direction, such as from an upper side to a lower side of the tile 2521, through two boundaries of the tile 2521 that face each other, the operator 145 provides +1 to at least one tile 2531 located at the left side of the tile 2521 as an initial winding number. In other words, the operator 145 increases by one an initial winding number $WN_{init}$ of the at least one tile 2531, located at the left side of the tile 2521.

Referring to FIG. 27B, in response to the path 2512 passing in a counterclockwise direction, such as from a lower side to an upper side of the tile 2522, through two boundaries of the tile 2522 that face each other, the operator 145 provides −1 to at least one tile 2532 located at the left side of the tile 2521 as an initial winding number. In other words, the operator 145 decreases by one an initial winding number $WN_{init}$ of the at least one tile 2532, located at the left side of the tile 2522.

Referring to FIG. 27B, in response to the path 2513 entering and exiting from the tile 2513 through a boundary of the tile 2523, the operator 145 provides zero to at least one tile 2533 located at the left side of the tile 2523 as an initial winding number. In other words, the operator 145 does not operate an initial winding number $WN_{init}$ for the at least one tile 2533 located at the left side of the tile 2523.

It is described with reference to FIGS. 27A through 27C that the operator 145 provides +1 as an initial winding number, that is, increasing the initial winding number by one in response to a path passing through a tile in a clockwise direction. Further, it is described that the operator 145 provides −1 as an initial winding number; that is, decreasing the initial winding number by one in response to a path passing through a tile in a counterclockwise direction. However, operating of an initial winding number is not limited thereto. As an example, the operator 145 may provide −1 as an initial winding number in response to a path passing through a tile in a clockwise direction, and provide +1 as an initial winding number in response to a path passing through a tile in a counterclockwise direction. As another example, the operator 145 may provide +0.5 as an initial winding number; that is, increasing the initial winding number by 0.5, in response to a path passing through a tile in a clockwise direction. The operator 145 may also provide −0.5 as an initial winding number; that is, decreasing the initial winding number by −0.5, in response to a path passing through a tile in a counterclockwise direction.

In response to an object includes a plurality of paths, the operator 145 operates an initial winding number for a tile based each paths. In other words, the operator 145 operates an initial winding number for a tile in consideration of the plurality of paths sequentially. For example, the operator 145 sets a first initial winding number $WN_{init\_1}$ based on a location of a first path $e_0$ and a direction in which the first path $e_0$ proceeds, and then, sets a second initial winding number $WN_{init\_2}$ based on a location of a second path $e_1$ and a direction in which the second path $e_1$ proceeds.

Hereinafter, an example of operating an initial winding number for a tile with respect to each of a plurality of paths, which is performed by the operator 145, is described in detail with reference to FIGS. 28A through 29C.

Figure 28B:
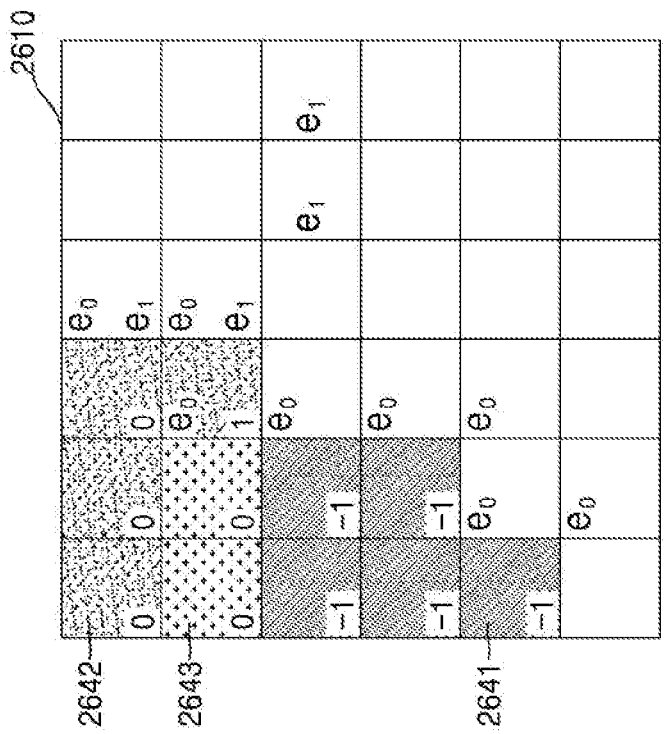
FIGS. 28A and 28B illustrate diagrams describing an example of operating by the operator of a second initial winding number for tiles arranged in a direction away from a tile through which a second path passes, from among tiles included in a frame, according to an embodiment.
Figure 28A:
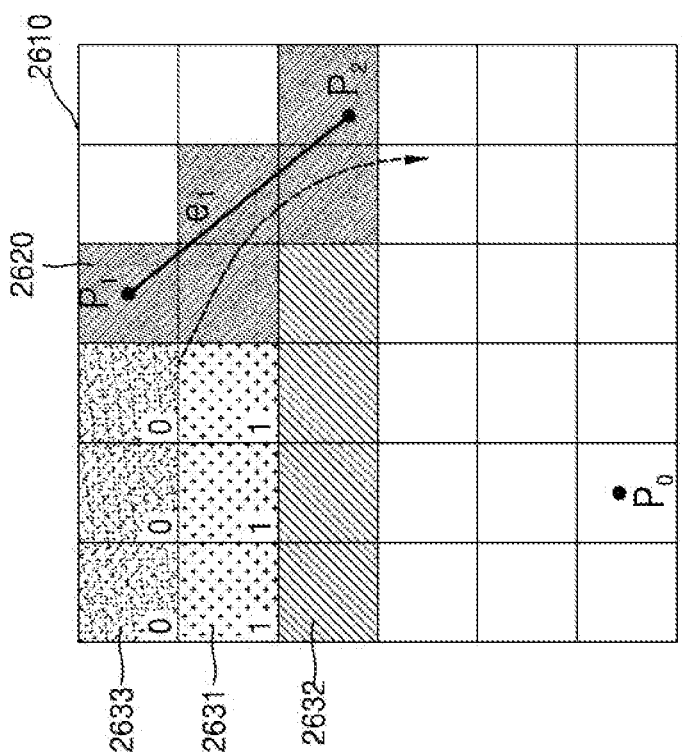

FIGS. 28A and 28B illustrate diagrams describing an example of operating by the operator 145 of a second initial winding number for tiles arranged in a direction away from a tile, through which the second path $e_1$ passes, from among tiles included in a frame 2610, according to an embodiment.

FIG. 28A shows a second path $e_1$. The second path $e_1$ may be a path drawn after the first path $e_0$ is drawn in the frame 2610. The first path $e_0$ may be an edge connecting a vertex $P_0$ to a vertex $P_1$. Additionally, the second path $e_1$ is an edge connecting the vertex $P_1$ to a vertex $P_2$. Accordingly, in one illustrative example, the second path $e_1$ may be a path proceeding in a clockwise direction.

The allocator 142 selects tiles 2620, through which the second path $e_1$ passes, from among tiles included in the frame 2610. Additionally, the allocator 142 generates information indicating that the second path $e_1$ passes through a tile, as Edge_List for each of the selected tiles 2620. In addition, the allocator 142 stores the information in a memory (not shown). If Edge_List is a tile that has been generated, the allocator 142 stores information indicating that the second path passes through the already-generated Edge_List. As shown in FIG. 28B, '$e_0, e_1$' or '$e_1$' indicated on the tiles 2620 refers to information included in the respective Edge_List of the tiles 2620. In other words, a tile on which '$e_0, e_1$' is shown refers to a tile through which the first path $e_0$ and the second path $e_1$ pass. Additionally, a tile on which '$e_1$' is shown refers to a tile through which the second path '$e_1$' passes.

Additionally, the operator 145 provides the second initial winding number $WN_{init\_2}$ to each of the tiles 2631 located at a side of the selected tiles 2620. For example, the operator 145 provides the second initial winding number $WN_{init\_2}$ to each of the tiles 2631 located in a left direction from the selected tiles 2631. In other words, because the second path $e_1$ passes through the tiles 2620 in a clockwise direction, the operator 145 provides +1 to each of the tiles 2631 as the second initial winding number $WN_{init\_2}$. Additionally, the operator 145 stores the second initial winding number $WN_{init\_2}$ in the memory for each of the tiles 2631. In an alternative configuration, although the allocator 142 and the operator 145 store information in the memory, a person of ordinary skill in the relevant art will appreciate that the allocator 142 and the operator 145 may be further configured to store the information therein, without relying on another structural element, such as the memory.

The operator 145 does not provide a second initial winding number $WN_{init\_2}$ to the tiles 2632 located in a left direction from a tile that includes the end vertex $P_2$ of the second path $e_1$. The operator 145 provides a third initial winding number $WN_{init\_3}$ to the tiles 2632 that are not provided with the second initial winding number $WN_{init\_2}$ considering a form in which the second path $e_1$ and the third path $e_2$ pass through the tiles 2632.

In a case of tiles 2633 located in a left direction from a tile that includes a starting vertex $P_1$ of the second path $e_1$, the operator 145 provides the second initial winding number $WN_{init\_2}$ to the tiles 2633, considering a form in which the first path $e_0$ and the second path $e_1$ pass through the tiles 2633. Hereinafter, an example of providing the second initial winding number $WN_{init\_2}$ to each of the tiles 2633, which is performed by the operator 145, is described with reference to FIGS. 29A through 29C.

Figure 29A:
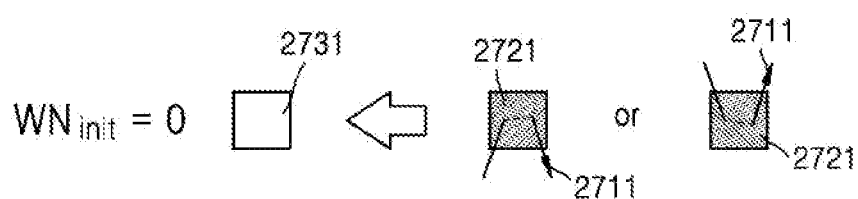
FIGS. 29A through 29C illustrate diagrams showing an example of a rule to provide by the operator an initial winding number in consideration of directions in two or more paths proceed, according to an embodiment.
Figure 29B:
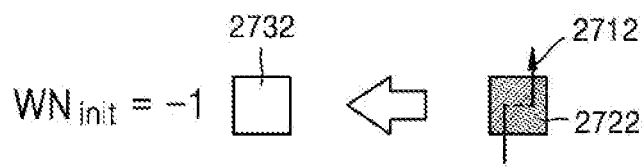
Figure 29C:
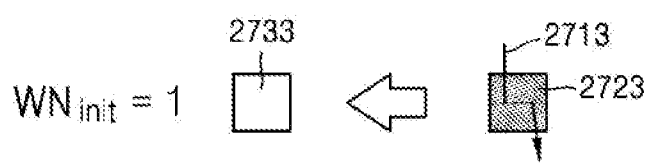

FIGS. 29A through 29C illustrate diagrams showing an example of a rule of providing an initial winding number in consideration of directions in which two or more paths proceed, which is performed by the operator 145, according to an embodiment.

FIG. 29A shows a case when a path 2711 enters, and then, exits from a tile 2721 through a boundary of the tile 2721. FIG. 29B shows a case when a path 2712 passes through two boundaries of a tile 2722 that face each other, in a counterclockwise direction. The counterclockwise direction is from a lower boundary to an upper boundary of the tile 2722. FIG. 29C shows a case when a path 2713 passes through two boundaries of a tile 2723 that face each other, in a clockwise direction. The clockwise direction is from an upper boundary to a lower boundary of the tile 2723.

The paths 2711 through 2713 shown in FIGS. 29A through 29C are paths in which two or more paths are combined. For example, if an end vertex of a first path is a vertex identical to a starting vertex of a second path, the paths 2711 through 2713 shown in FIGS. 27A through 27C are a path obtained by connecting the first path to the second path.

The tiles 2721 through 2723 shown in FIGS. 29A through 29C are tiles obtained by combining two or more tiles. For example, if a path passes through two or more tiles which are consecutively arranged in a horizontal direction, the two or more tiles are determined to be one tile 2721, 2722, or 2723 shown in FIGS. 29A through 29C.

Referring to FIG. 29A, in response to the path 2711 entering the tile 2721 through a boundary of the tile 2721 and exits from the tile 2721 in a same direction through the boundary of the tile 2721, the operator 145 provides zero (0) to at least one tile 2731, which is located at the left side of the tile 2721, as an initial winding number.

Referring to FIG. 29B, in response to the path 2712 passes through two boundaries of the tile 2722, which face each other, in a counterclockwise direction, the operator 145 provides −1 to at least one tile 2732 located at the left side of the tile 2722 as an initial winding number. The counterclockwise direction is from a lower boundary to an upper boundary of the tile 2722.

Referring to FIG. 29C, in response to the path 2713 passes through two boundaries of the tile 2723, which face each other, in a clockwise direction (that is, from an upper boundary to a lower boundary of the tile 2723), the operator 145 provides +1 to at least one tile 2733 located at the left side of the tile 2723 as an initial winding number.

As shown in FIGS. 29A through 29C, the operator 145 provides +1 as an initial winding number in response to a path passing through a tile in a clockwise direction. The operator 145 provides −1 as an initial winding number if a path passes through a tile in a counterclockwise direction. However, operating of an initial winding number is not limited thereto.

As an example, the operator 145 provides −1 as an initial winding number in response to a path passes through a tile in a clockwise direction. The operator 145 also provides +1 as an initial winding number in response to a path passing through a tile in a counterclockwise direction. As another example, the operator 145 provides +0.5 as an initial winding number in response to a path passing through a tile in a clockwise direction, and provides −0.5 as an initial winding number in response to a path passing through a tile in a counterclockwise direction.

Referring back to FIG. 28A, a path connecting the first path $e_0$ to the second path $e_1$ enters a tile that includes the vertex $P_1$ through a lower side of the tile, The path exits from the tile through the lower side of the tile. Accordingly, the operator 145 provides 0 as the second initial winding number $WN_{init\_2}$ for each of the tiles 2633.

FIG. 28B shows a result of adding the first initial winding number $WN_{init\_1}$ to the second initial winding number $WN_{init\_2}$. For example, the first initial winding number $WN_{init\_1}$ and the second initial winding number $WN_{init\_2}$ is stored in the memory (not shown) in the form of a bitstream for each tile. Accordingly, the operator 145 adds the first initial winding number $WN_{init\_1}$ to the second initial winding number $WN_{init\_2}$ for the tile provided with both the first initial winding number $WN_{init\_1}$ and the second initial winding number $WN_{init\_2}$.

As described with reference to FIG. 28A, some tiles 2641, shown in FIG. 28B, have the first initial number $WN_{init\_1}$ (for example, −1). In a further example, some tiles 2641 have exclusively the first initial number $WN_{init\_1}$ (for example, −1). Additionally, some tiles 2642, shown in FIG. 28B, have the second initial number $WN_{init\_2}$ (for example, 0 or +1). In a further example, some tiles 2642 have exclusively the second initial number $WN_{init\_2}$ (for example, 0 or +1). Additionally, some tiles 2643, shown in FIG. 28B, have both the first initial number $WN_{init\_1}$ (for example, −1) and the first initial number $WN_{init\_2}$ (for example, +1). Accordingly, the operator 145 adds up the first initial number $WN_{init\_1}$ and the second initial number $WN_{init\_2}$ (for example, −1+1=0), with respect to each of the tiles 2643 shown in FIG. 28B.

As shown in FIG. 28B, 0', '−1', or '1' indicated on the tiles 2641 through 2643 refers to the first initial number $WN_{init\_1}$, the second initial number $WN_{init\_2}$, and a result of adding the first initial number $WN_{init\_1}$ to the second initial number $WN_{init\_2}$ for each of the tiles 2641 through 2643.

As described with reference to FIGS. 28A through 29C, because the operator 145 operates the second initial winding number $WN_{init\_2}$ based on a location of the second path $e_1$ and a direction in which the second path $e_1$ proceeds, the operator 145 operates a third initial winding number $WN_{init\_3}$ based on a location of the third path $e_2$ and a direction in which the third path $e_2$ proceeds.

FIGS. 30A and 30B illustrate diagrams describing an example of operating by the operator 145 a third initial winding number $WN_{init\_3}$ of tiles, which are arranged in a direction away from a tile through which a third path $e_2$ passes, from among tiles included in a frame, according to an embodiment.

FIG. 30A shows the third path $e_2$. The third path $e_2$ is an edge connecting a vertex $P_2$ to a vertex $P_0$. Accordingly, the third path $e_2$ is a path proceeding in a clockwise direction. However, in an alternative configuration, the third path $e_2$ may proceed in a counterclockwise direction.

The allocator 142 selects tiles 2820 through which the third path $e_2$ passes, from among tiles included in the frame 2810. Then, the allocator 142 generates information, which indicates that the third path $e_2$ passes through a tile, as Edge_List for each of the selected tiles 2820 and stores the information in a memory (not shown). In an alternative configuration, the allocator 142 may store the information therein. If Edge_List is a tile that has already been generated, the allocator 142 additionally stores information that indicates that the third path $e_2$ passes through the already-generated Edge_List, in a memory (not shown). As shown in FIG. 30B, '$e_0, e_2$', '$e_1, e_2$' or '$e_2$', labeled on the tiles 2820, refers to information included in the Edge_List for each of the tiles 2820. In other words, a tile on which '$e_0, e_2$' is labeled refers to a tile through which the first path $e_0$ and the third path $e_2$ pass. A tile on which '$e_1, e_2$' is a tile through which the second path $e_1$ and the third path $e_2$ pass. Additionally, a tile on which '$e_2$' is labeled is a tile through which the third path $e_2$ passes.

Additionally, the operator 145 operates the third initial winding number $WN_{init\_3}$ for each of the tiles 2831 located at a side of the selected tiles 2820. For example, the operator 145 operates the third initial winding number $WN_{init\_3}$ for each of the tiles 2831 located in a left direction from the selected tiles 2820. In other words, because the third path $e_2$ passes through the tiles 2820 in a clockwise direction, the operator 145 provides +1 to each of the tiles 2831 as the third initial winding number $WN_{init\_3}$. Additionally, the operator 145 stores the third initial winding number $WN_{init\_3}$ in a memory (not shown) or therein for each of the tiles 2631.

In a case of the tiles 2832, located in a left direction from a tile that includes a starting vertex $P_2$ of the third path $e_2$, the operator 145 provides the third initial winding number $WN_{init\_3}$ taking into account the second path $e_1$ and the third path $e_2$ passing through the tiles 2832. A method of providing the third initial winding number $WN_{init\_3}$ to each of the tiles 2832, which is performed by the operator 145, is described with reference to FIGS. 29A through 29C. In other words, because a single path in which the second path $e_1$ and the third path $e_2$ are combined passes in a clockwise direction through two boundaries of the tile 2821 that face each other, in a clockwise direction, the operator 145 provides +1 to each of the tiles 2832 as the third initial winding number $WN_{init\_3}$. The clockwise direction a clockwise direction is from an upper boundary to a lower boundary of the tile 2821. Then, the operator 145 stores the third initial winding number $WN_{init\_3}$ in a memory (not shown) or therein for each tile.

In a case of tiles 2833 located in a left direction from a tile that includes an end vertex $P_0$ of the third path $e_2$, the operator 145 provides the third initial winding number $WN_{init\_3}$ taking into account the third path $e_2$ and the first path $e_0$ pass through the tiles 2833. The method of providing the third initial winding number $WN_{init\_3}$ to each of the tiles 2833, which is performed by the operator 145, is described with reference to FIGS. 29A through 29C. In other words, because a single path in which the third path and the first path are combined enters the tile 2822 through a side, such as, an upper side of the tile 2822, and then, exits from the tile 2822 through the side of the tile 2822, the operator 145 provides zero (0) to the tile 2833 as the initial winding number $WN_{init\_3}$. Additionally, the operator 145 stores the third initial winding number $WN_{init\_3}$ of the tile 2833 in the memory (not shown) or therein.

FIG. 30B shows a result of adding the first initial winding number $WN_{init\_1}$, the second initial winding number $WN_{init\_2}$, and the third initial winding number $WN_{init\_3}$. The operator 145 stores the first initial winding number $WN_{init\_1}$, the second initial winding number $WN_{init\_2}$, and the third initial winding number $WN_{init\_3}$ for a tile in a memory (not shown) or therein. For example, the operator 145 stores the first initial winding number $WN_{init\_1}$, the second initial winding number $WN_{init\_2}$, and the third initial winding number $WN_{init\_3}$ in the memory (not shown) or therein for each tile in the form of a bitstream. Accordingly, with respect to the tile provided with two or more initial winding numbers from among the first initial winding number $WN_{init\_1}$, the second initial winding number $WN_{init\_2}$, and the third initial winding number $WN_{init\_3}$, the operator 145 adds up the provided two or more initial winding numbers.

As shown in FIG. 30B, in some tiles 2841, shown in FIG. 30B, the third initial number $WN_{init\_3}$, for example, 0 or +1, is exclusively included. Additionally, some tiles 2842 exclusively have the second initial number $WN_{init\_2}$, for example, 0 or +1, is exclusively included. Some tiles 2843, shown in FIG. 30B, have both the first initial number $WN_{init\_1}$, for example, −1, and the third initial number $WN_{init\_3}$, for example, +1. Some tiles 2844, shown in FIG. 30B, have the first initial number $WN_{init\_1}$, for example, −1, and the second initial number $WN_{init\_2}$, for example, +1.

Accordingly, the operator 145 adds up initial winding numbers, for example, −1+1=0, with respect to each of the tiles 2841 through 2844 shown in FIG. 30B.

As shown in FIG. 30B, '0' or '1' respectively indicated on the tiles 2841 through 2844, refers to the first initial number $WN_{init\_1}$, the second initial number $WN_{init\_2}$, the third initial number $WN_{init\_3}$, and a result of adding up the first initial number $WN_{init\_1}$, the second initial number $WN_{init\_2}$, and the third initial number $WN_{init\_3}$ for each of the tiles 2841 through 2844.

Based on the first initial number $WN_{init\_1}$ through the third initial number $WN_{init\_3}$, the operator 145 sets a final initial winding number $WN_{init\_1}$ for each tile included in the frame 2810. For example, in a case of a tile provided with one of the first initial number $WN_{init\_1}$ through the third initial number $WN_{init\_3}$, the operator 145 sets the provided initial winding number as the final initial winding number $WN_{init\_1}$. In a case of a tile provided with two or more from among the first initial number $WN_{init\_1}$ through the third initial number $WN_{init\_3}$, the operator 145 sets the final initial winding number $WN_{init\_1}$ by adding up the provided initial winding numbers. Additionally, in the case of a tile that is not provided with any of the first initial number $WN_{init\_1}$ through the third initial number $WN_{init\_3}$, the operator 145 sets the final initial winding number $WN_{init\_1}$ as 0.

Referring back to FIG. 1, the winding number operation number 150 operates a winding number for each pixel included in a frame, by using a result of tile binning. For example, the winding number operator 150 operates a winding number for a pixel by using an identification value of a path, which is allocated to each tile, such as, Edge_List or Curve_List, and an initial winding number.

In detail, the winding number operator 150 identifies a path needed to operate a winding number, with reference to Edge_List or Curve_List generated for a tile. Further, the winding number operator 150 operates a winding number for a pixel based on a location of the identified path and a direction in which the identified path proceeds.

As an example, in response to the binner 140 operating an initial winding number for a tile, the winding number operator 150 operates a winding number for a pixel based on the initial winding number. As another example, in response to the binner 140 not operating an initial winding number for a tile, the winding number operator 150 operates an initial winding number for the tile, and operates a winding number for a pixel.

Hereinafter, examples of operating by the winding number operator 150 of a winding number for a pixel, are described with reference to FIGS. 31A through 35.

Figure 31B:
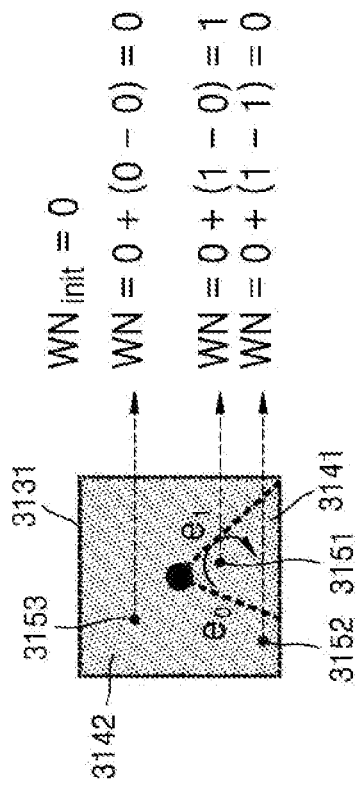
FIGS. 31A through 31C illustrate diagrams describing an example of operating by a winding number operator of a winding number for a pixel, according to an embodiment.
Figure 31C:
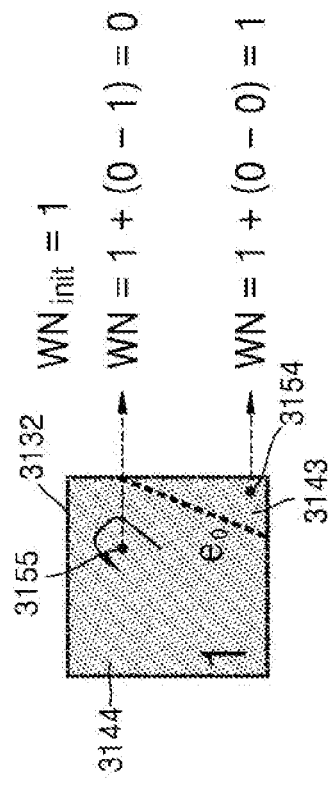
Figure 31A:
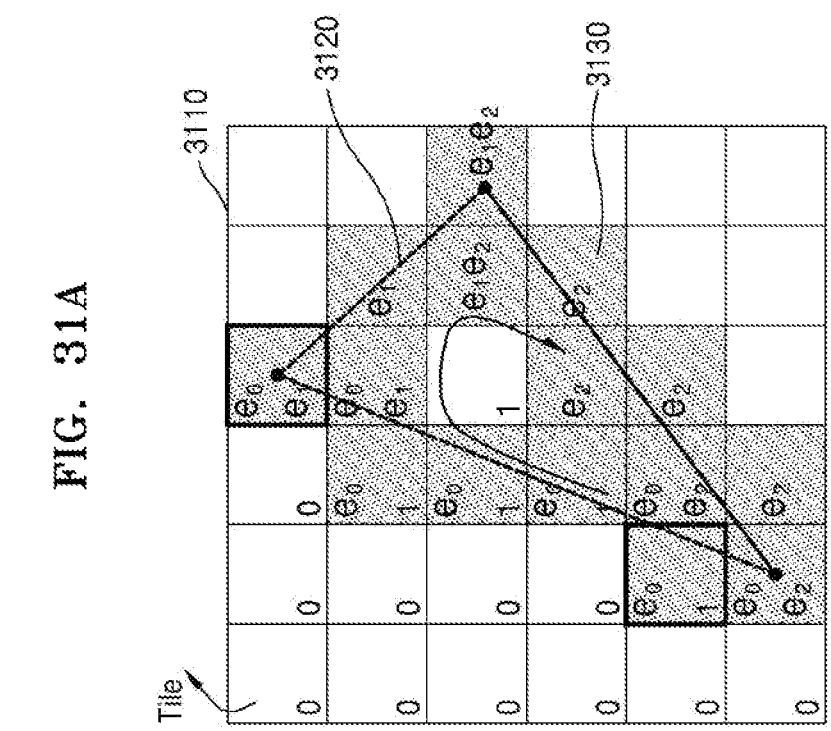

FIGS. 31A through 31C illustrate diagrams describing an example of operating by the winding number operator 150 of a winding number for a pixel, according to an embodiment.

FIG. 31A shows a frame 3110 including six by six (6*6) tiles and an object 3120 in a shape of a triangle. A description is provided with reference to FIGS. 31A through 31C in which the allocator 145 generates Edge_List for tiles 3130 through which first through third paths $e_0$, $e_1$, and $e_2$ pass and the operator 145 operates an initial winding number $WN_{init}$ for each tile included in the frame 3110.

A tile includes a plurality of pixels. Accordingly, a winding number for a pixel varies according to pixels included in a tile. Hereinafter, a description thereof is described in detail with reference to FIGS. 31B and 31C.

FIG. 31B shows a tile 3131, from among tiles 3130, through which the first through third paths $e_0$, $e_1$, and $e_2$ shown in FIG. 31A pass. An area inside the tile 3131 is divided into two areas by a first path $e_0$ and a second path $e_1$. Hereinafter, an area surrounded by the first and second paths $e_0$ and $e_1$ is referred to as a first area 3141, and an area other than the first area 3141 is referred to as a second area 3142.

The winding number operator 150 operates a winding number WN for a pixel as shown in Equation 1.

$$WN = WN_{init} + (N_{CW} - N_{CCW})\quad\text{[Equation 1]}$$

In Equation 1, WN represents a winding number for a pixel. $WN_{init}$ represents an initial winding number for a tile that includes the pixel. Additionally, $N_{CW}$ represents a value determined based on a path that is located at a side of the pixel, and proceeds in a clockwise direction or in a downward direction. Additionally, $N_{CCW}$ is a value determined based on a path that is located at a side of the pixel and proceeds in a counterclockwise direction or in an upward direction. A side of a pixel refers to a left, right, upper, or lower side of the pixel with reference to a location of the pixel.

In other words, the winding number operator 150 operates a winding number for a pixel by using an initial winding number $WN_{init}$ for a tile that includes a pixel and a direction in which a path, which is located at a side of the pixel, proceeds. Hereinafter, an example of determining $N_{CW}$ and $N_{CCW}$ in Equation 1, which is performed by the winding number operator 150, is described with reference to FIGS. 32A through 33D.

Figure 32A:
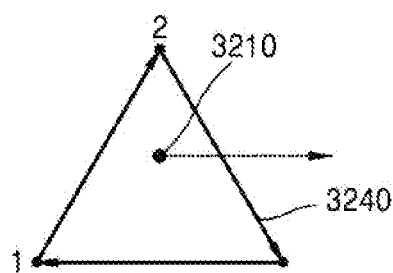
FIGS. 32A and 32B illustrate diagrams describing an example of operating by the winding number operator of a winding number for a pixel, according to an embodiment.
Figure 32B:
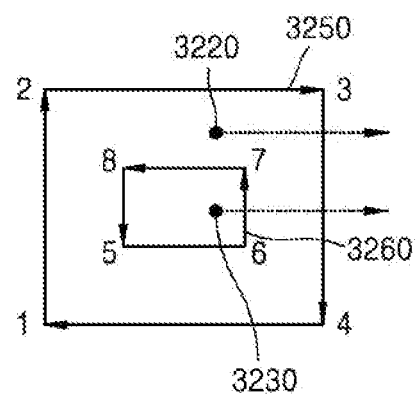

FIGS. 32A and 32B illustrate diagrams describing an example of operating by the winding number operator 150 of a winding number for a pixel, according to an embodiment.

FIG. 32A shows an object 3240 that includes a vertex 1, a vertex 2, and a vertex 3. In detail, the object 3240 is formed of a first path extending from the vertex 1 to the vertex 2, a second path extending from the vertex 2 to the vertex 3, and a third path extending from the vertex 3 to the vertex 1.

The winding number operator 150 checks whether a path is located at a side of pixels included in a frame with reference to each location of the pixels. A side refers to one from among a left side, a right side, an upper side, and a lower side of a pixel with reference to a location of the pixel. As one illustrative example, a description is provided in which the winding number operator 150 checks whether a path is located at a right side of a pixel 3210 relative to a location of the pixel 3210.

The winding number operator 150 determines whether a direction, in which a path, located at the right side of the pixel 3210, proceeds is a clockwise direction or a counterclockwise direction. For example, in response to the winding number operator 150 determining that the path is located at the right side of the pixel 3210, the winding number operator 150 determines whether a direction, in which the path located at the right side of the pixel 3210 proceeds, is a clockwise direction or a counterclockwise direction. If the winding number operator 150 determines that the path is not located at the right side of the pixel 3210, the winding number operator 150 determines $N_{CW}$ and $N_{CCW}$ in [Equation 1], as previously defined, as zero (0).

Referring to FIG. 32A, the winding number operator 150 determines whether a direction in which the second path located at the right side of the pixel 3210, from among the three paths including the object 3240, proceeds is a clockwise direction or a counterclockwise direction. In other words, because the first path and the third path are not located at the right side of the pixel 3210, the winding number operator 150 does not determine a direction in which the first path and the third path proceed, but a direction in which the second path proceeds. Because the second path proceeds from the vertex 2 to the vertex 3, the winding number operator 150 determines that a direction in which the second path proceeds is a clockwise direction.

Then, the winding number operator 150 adds a value predetermined by the winding number operator 150 to $N_{CW}$, according to a number of paths proceeding in a clockwise direction. The winding number operator 150 adds the predetermined value to $N_{CCW}$ of the winding number operator 150, according to a number of paths proceeding in a counterclockwise direction. The predetermined value may be one (1), but is not limited thereto.

In one example, in response to the predetermined value being one (1), because the winding number operator 150 determines a direction in which the second path proceeds is a clockwise direction, the winding number operator 150 determines $N_{CW}$ for the pixel 3210 to be +1.

In an example, as shown in FIG. 32A, in response to the winding number operator 150 operating $N_{CW}$ for each pixel included in a frame by using the method described above, $N_{CW}$ for all pixels present inside the object 3240 is determined to be +1, and $N_{CW}$ of all pixels present outside the object 3240 are determined to be zero (0).

Hereinafter, for convenience of description, the winding number operation 150 determines $N_{CW}$ to be +1 if a direction in which a path proceeds is a clockwise direction. The winding number operation 150 determines $N_{CCW}$ to be +1 if a direction in which the path proceeds is a counterclockwise direction.

FIG. 32B shows a first object 3250 including a vertex 1, a vertex 2, a vertex 3, and a vertex 4, and a second object 3260 including a vertex 5, a vertex 6, a vertex 7, and a vertex 8. The first object 3250 is formed of a first path extending from a vertex 1 to a vertex 2, a second path extending from the vertex 2 to a vertex 3, a third path extending from the vertex 3 to a vertex 4, and a fourth path extending from the vertex 4 to the vertex 1. Additionally, the object 3260 is formed of a fifth path extending from a vertex 5 to a vertex 6, a sixth path extending from the vertex 6 to a vertex 7, a seventh path extending from the vertex 7 to a vertex 8, and an eighth path extending from the vertex 8 to the vertex 5.

Hereinafter, in one example, the winding number operator 150 checks whether a path is located at a right side of a pixel 3220 or 3230 with reference to a location of the pixel 3220 or 3230.

As an example, a method performed by the winding number operator 150 of determining $N_{CW}$ and $N_{CCW}$ for the pixel 3220 is described.

The winding number operator 150 checks whether a path is present at the right side of the pixel 3220, relative to the location of the pixel 3220. In detail, the winding number operator 150 checks that a third path included in the first object 3250 is present at the right side of the pixel 3220.

Base on a result of the checking, the winding number operator 150 determines whether a direction, in which the third path proceeds, is a clockwise direction or a counterclockwise direction. The winding number operator 150 determines whether a direction in which the third path proceeds is a clockwise direction. Accordingly, the winding number operator 150 determines $N_{CW}$ of the pixel 3220 to be +1.

As another example, a method performed by the winding number operator 150 to determine $N_{CW}$ and $N_{CCW}$ of the pixel 3230 is described.

The winding number operator 150 checks that a sixth path included in the second object 3260 and the third path included in the first object 3250 are present at the right side of the pixel 3230. Then, the winding number operator 150 determines a direction in which the sixth path proceeds in a counterclockwise direction, and a direction in which the third path proceeds in a clockwise direction. Because the winding number operator 150 determines the direction in which the sixth path proceeds as a counterclockwise direction, the winding number operator 150 determines $N_{CCW}$ for the pixel 3230 to be +1. Additionally, because the winding number operator 150 determines the direction in which the third path proceeds as a clockwise direction, the winding number operator 150 determines $N_{CW}$ for the pixel 3230 to be +1.

As shown in FIG. 32B, in response to the winding number operator 150 determining $N_{CW}$ and $N_{CCW}$ for each pixel included in a frame, $N_{CW}$ for all pixels that are present inside the first object 3250 and outside the object 3260, are determined to be +1. Also, $N_{CW}$ and $N_{CCW}$ for pixels present inside the second object 3260 are determined to be +1.

Regardless of whether the winding number operator 150 selects a left side, a right side, an upper side, or a lower side of the pixel with respect to a location of the pixel when calculating a winding number, the winding number operator 150 obtains the same result. Hereinafter, an example in which the winding number operator 150 calculates $N_{CW}$ and $N_{CCW}$ for a pixel by selecting different sides of the pixel is described with reference to FIG. 33D.

FIGS. 33A through 33D illustrate diagrams describing an example of selecting by the winding number operator 150 of different sides of a pixel and calculating a winding number for the pixel, according to an embodiment.

FIG. 33A through 33D show objects consisting of vertices 1 through 5. The objects shown in FIG. 33A through 33D are a closed polygon in the shape of a star, and are identical to each other.

Figure 33A:
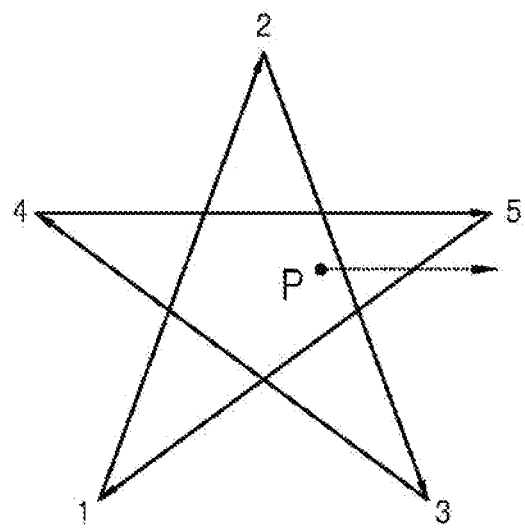
FIGS. 33A through 33D illustrate diagrams describing an example of selecting different sides of a pixel and operating a winding number for the pixel by the winding number operator, according to an embodiment.

Referring to FIG. 33A, the winding number operator 150 checks whether a path is present at a right side of a pixel P with reference to a location of the pixel P. In detail, the winding number operator 150 checks whether a path extending from the vertex 2 to the vertex 3 and a path extending from the vertex 5 to the vertex 1 are present at the right side of the pixel P. The winding number operator 150 checks whether the path extending from the vertex 2 to the vertex 3 and the path extending from the vertex 5 to the vertex 1 are at a location of a virtual half line drawn in a right horizontal direction from the pixel P. Because a direction in which the path extending from the vertex 2 to the vertex 3 proceeds and a direction in which the path extending from the vertex 5 to the vertex 1 proceeds are in a clockwise direction, the winding number operator 150 determines $N_{CW}$ for the pixel P to be +2.

Figure 33B:
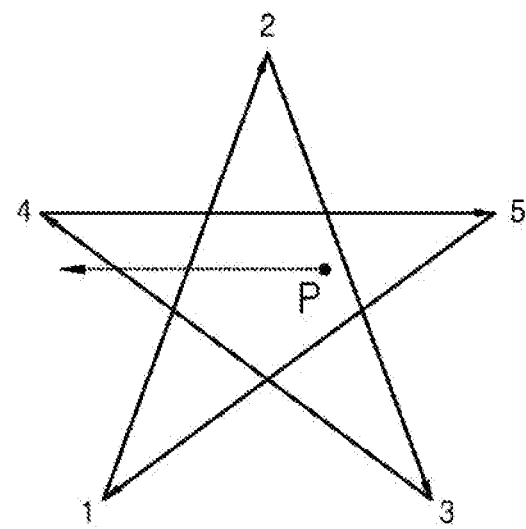

Referring to FIG. 33B, the winding number operator 150 checks whether a path is present at a left side of the pixel P with reference to a location of the pixel P. In detail, the winding number operator 150 checks whether a path extending from the vertex 1 to the vertex 2 and a path extending from the vertex 3 to the vertex 4 are present at a left side of the pixel P. The winding number operator 150 checks whether the path extending from the vertex 1 to the vertex 2 and the path extending from the vertex 3 to the vertex 4 are at a location of a virtual half line drawn in a left horizontal direction from the pixel P. Because a direction in which the path extending from the vertex 1 to the vertex 2 proceeds and a direction in which the path extending from the vertex 3 to the vertex 4 proceeds are a clockwise direction, the winding number operator 150 determines $N_{CW}$ for the pixel P to be +2.

Figure 33C:
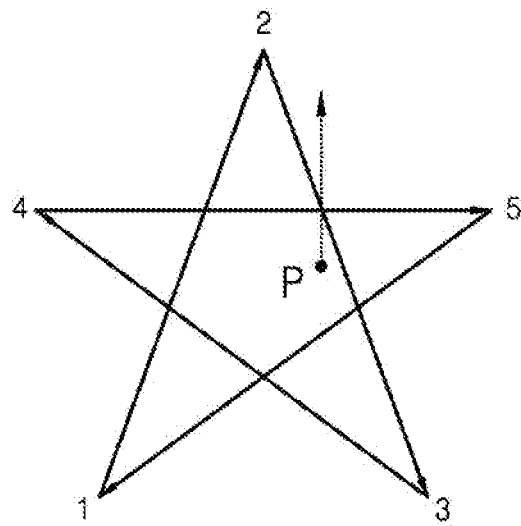

Referring to FIG. 33C, the winding number operator 150 checks whether a path is located above the pixel P with respect to a location of the pixel P. In detail, the winding number operator 150 checks whether a path extending from the vertex 2 to the vertex 3 and a path extending from the vertex 4 to the vertex 5 are present above the pixel P. The winding number operator 150 checks whether the path extending from the vertex 2 to the vertex 3 and the path extending from the vertex 5 to the vertex 1 are at a location of a virtual half line drawn in an upper horizontal direction from the pixel P. Because a direction in which the path extending from the vertex 2 to the vertex 3 proceeds and a direction in which the path extending from the vertex 4 to the vertex 5 proceeds are a clockwise direction, the winding number operator 150 determines $N_{CW}$ for the pixel P to be +2.

Figure 33D:
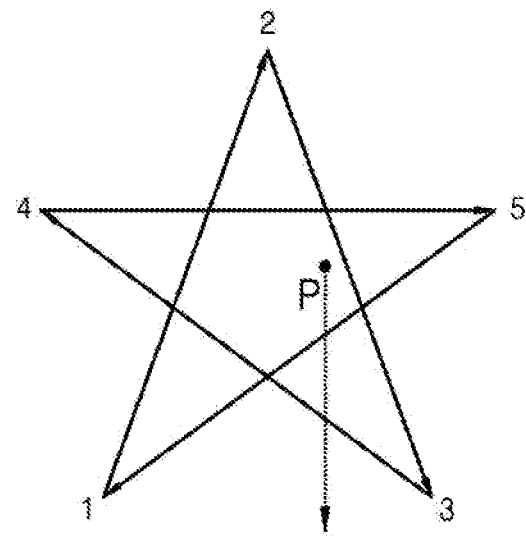

Referring to FIG. 33D, the winding number operator 150 checks whether a path is present below a pixel P with reference to a location of the pixel P. In detail, the winding number operator 150 checks whether a path extending from the vertex 5 to the vertex 1 and a path extending from the vertex 3 to the vertex 4 are present below the pixel P. The winding number operator 150 checks whether the path extending from the vertex 5 to the vertex 1 and the path extending from the vertex 3 to the vertex 4 are at a location of a virtual half line drawn in a lower horizontal direction from the pixel P. Because a direction in which the path extending from the vertex 5 to the vertex 1 proceeds and a direction in which the path extending from the vertex 3 to the vertex 4 proceeds is a clockwise direction, the winding number operator 150 determines $N_{CW}$ for the pixel P to be +2.

As described above, regardless of whether the winding number operator 150 selects a left side, a right side, an upper side, or a lower side of the pixel with respect to a location of the pixel when calculating $N_{CW}$ and $N_{CCW}$, the winding number operator 150 obtains the same result. Additionally, as shown in FIGS. 33A through 33D, $N_{CW}$ and $N_{CCW}$ for pixels present in a same area, from among area differentiated by a path, are identical to each other.

The winding number operator 150 selects a side to determine $N_{CW}$ and $N_{CCW}$ for each pixel included in a frame while considering locations of a pixel and a path. In other words, the winding number operator 150 selects a side of a pixel P according to a location of the pixel P so as to determine $N_{CW}$ and $N_{CCW}$ for the pixel P. In other words, the winding number operator 150 selects a side to determine $N_{CW}$ and $N_{CCW}$ based on a direction in which the least number of paths are expected to be present with respect to a location of the pixel P.

For example, if it is assumed that the pixel P is located at a left side of a center line of a frame, the winding number operator 150 selects a left side of the pixel P, rather than a right side of the pixel P, as a side to determine $N_{CW}$ and $N_{CCW}$, so as to determine $N_{CW}$ and $N_{CCW}$ for the pixel P while using a relatively smaller number of paths. In one example, in response to the pixel P being present at a right side of the center line of the frame, the winding number operator 150 selects a right side of the pixel P rather than a left side of the pixel P as a side for determining $N_{CW}$ and $N_{CCW}$ to determine $N_{CW}$ and $N_{CCW}$ for the pixel P by using a small number of paths.

Accordingly, the winding number operator 150 may determine $N_{CW}$ and $N_{CCW}$ by selecting different sides of each pixel included in a frame. Then, the winding number operator 150 may determine locations where paths of an object are distributed in a frame. Further, based on a direction in which a shortest path is present with respect to a location of a pixel, the winding number operator 150 may select a side for calculating $N_{CW}$ and $N_{CC}$ of said pixel.

Referring back to FIG. 31B, the winding number operator 150 operates a winding number WN for the pixel 3151 included in the first area 3141 to be +1. For example, because an initial winding number $WN_{init}$ for the tile 3131 is zero (0) and a direction in which a second path $e_1$ located at a right side of the pixel 3151 proceeds is a clockwise direction, $N_{CW}$ is one (1). Additionally, because a path proceeding in a counterclockwise direction is not present at a right side of the pixel 3151, $N_{CCW}$ is zero (0). Accordingly, the winding number operator 150 operates the winding number WN for the pixel 3151 to be +1 in accordance with Equation 1.

Additionally, the winding number operator 150 operates a winding number WN for the pixel 3152 included in the second area 3142 as 0. In detail, because an initial winding number $WN_{init}$ for the tile 3131 is zero (0) and the first path $e_0$ located at a right side of the pixel 3152 proceeds in a counterclockwise direction, $N_{CW}$ is one (1). Additionally, because the second path $e_1$ located at a right side of the pixel 3152 proceeds in a clockwise direction, $N_{CW}$ is one (1). Accordingly, the winding number operator 150 operates the winding number WN for the pixel 3152 as zero (0) in accordance with [Equation 1].

Additionally, the winding number operator 150 operates a winding number WN for the pixel 3153 included in the second area 3142 as zero (0). In detail, because an initial winding number $WN_{init}$ for the tile 3131 is zero (0) and a path is not present at a right side of the pixel 3153, $N_{CW}$ and $N_{CCW}$ are zero (0). Accordingly, the winding number operator 150 operates the winding number WN for the pixel 3153 as zero (0) in accordance with [Equation 1].

As shown in FIG. 31B, each winding number WN for pixels included in the first area 3141 is operated as one (1), and each winding number WN for pixels included in the second area 3142 is operated as zero (0). In other words, even if pixels are included in a same tile, winding numbers WN for pixels are different from each other, according to an area differentiated by a path.

FIG. 31C shows a tile 3132, from among tiles 3130 through which paths $e_0$, $e_1$, and $e_2$, shown in FIG. 31A, pass. An area inside the tile 3132 is divided into two areas by a first path $e_0$. Hereinafter, an area surrounded by the first path $e_0$ and boundaries of the tile 3132 is referred to as a third area 3143, and an area other than the third area 3143 is referred to as a fourth area 3144.

The winding number operator 150 operates a winding number WN for a pixel 3154 included in the third area 3143 may be operated to be +1. For instance, because an initial winding number $WN_{init}$ for the tile 3132 is one (1) and a path is not present at a right side of the pixel 3154, $N_{CW}$ and $N_{CCW}$ are zero (0). Accordingly, the winding number operator 150 operates a winding number WN for the pixel 3154 as zero (0) in accordance with [Equation 1].

The winding number operator 150 operates a winding number WN for a pixel 3155 included in the fourth area 3144 as zero (0). For example, because the initial winding number $WN_{init}$ of the tile 3132 is one (1) and the first path $e_0$ located at a right side of the pixel 3155 proceeds in a counterclockwise direction, $N_{CCW}$ is one (1). Additionally, because a path proceeding in a clockwise direction is not present at a right side of the pixel 3154, $N_{CW}$ is zero (0). Accordingly, the winding number operator 150 operates a winding number WN for the pixel 3155 as zero (0) in accordance with [Equation 1].

As such, each winding number WN for pixels included in the third area 3143, shown in FIG. 31C, is operated as one (1). Each winding number WN for pixels included in the fourth area 3144 is operated as zero (0).

Figure 34B:
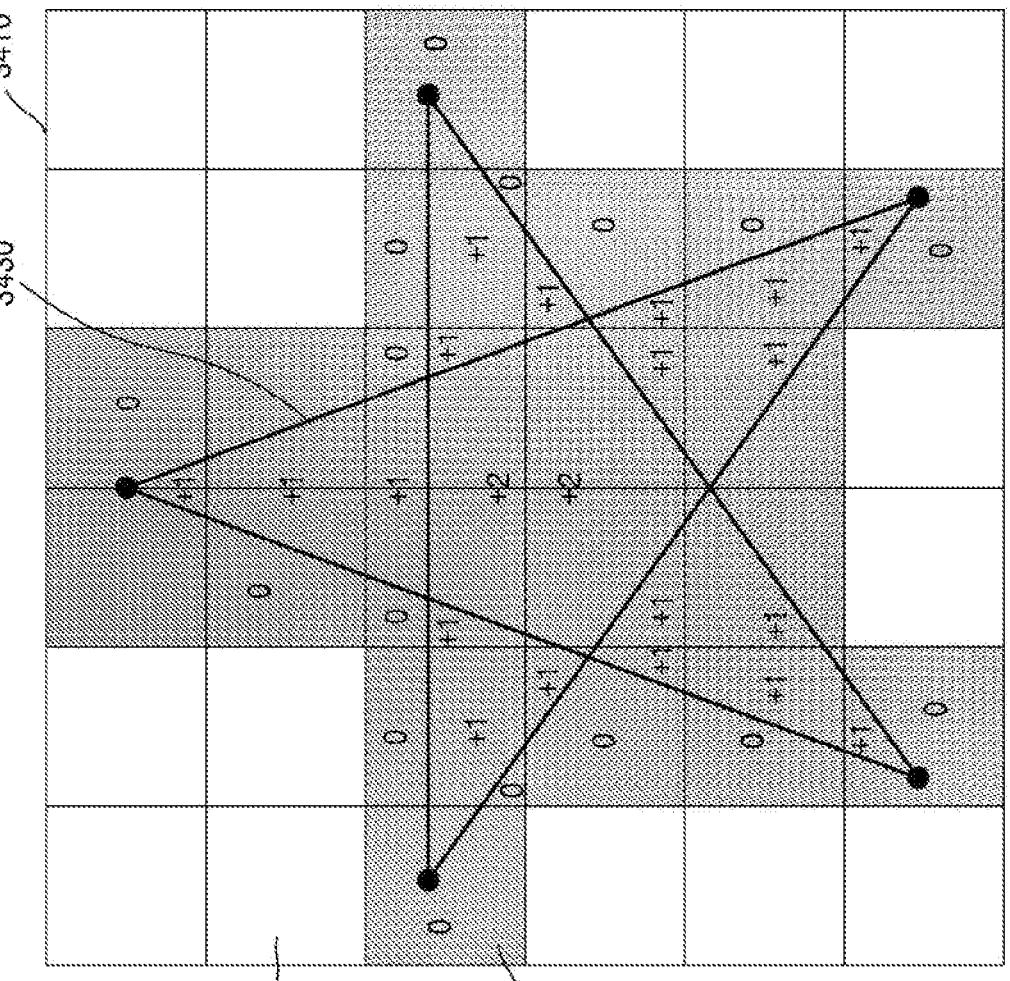
FIGS. 34A through 34B illustrate diagrams describing examples of operating by the winding number operator of a winding number for pixels included in tiles through which a path passes, according to an embodiment.
Figure 34A:
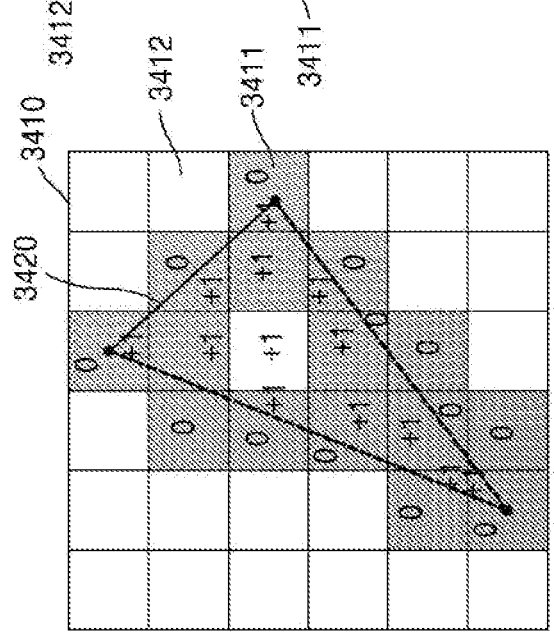

FIGS. 34A through 34B illustrate diagrams showing examples of a result of operating by the winding number operator 150 of a winding number for pixels included in tiles through which a path passes, according to an embodiment.

FIG. 34A shows an object 3420 in the shape of a triangle, and FIG. 34B shows an object 3430 in the shape of a star.

Referring to FIGS. 34A and 34B, winding numbers WN for pixels included in tiles 3411, through paths of the object 3420, are shown. If the winding number operator 150 operates winding numbers WN for all pixels included in the frame 3410, winding numbers WN for pixels included in the tiles 3412 through which paths do not pass are identical to each initial winding number $WN_{init}$ for the tiles 3412. Accordingly, the winding number operator 150 operates only the winding number WN for pixels included in the tiles 3411. The winding numbers WN for pixels included in the tiles 3412 are determined as each initial winding number $WN_{init}$ of for tiles 3412.

As described above, the winding number operator 150 does not need to operate a winding number WN for all pixels included in the frame 3410. Accordingly, the rendering apparatus 100 quickly operates the winding numbers WN for all pixels included in the frame 3410.

The winding number operator 150 operates an initial winding number $WN_{init}$ for a tile. In detail, in response to the operator 145 included in the binner 140 does not operate an initial winding number $WN_{init}$ for a tile, the winding number operator 150 operates the initial winding number $WN_{init}$ for the tile.

Figure 35:
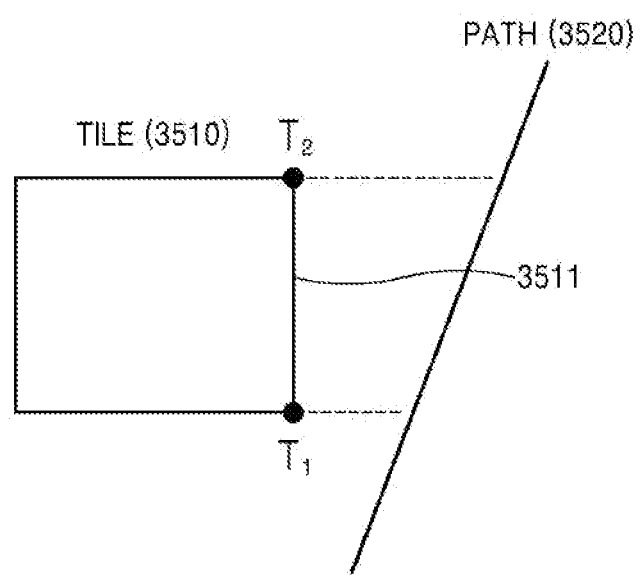
FIG. 35 illustrates a diagram describing an example of operating by the winding number operator of an initial winding number for a pixel, according to an embodiment.

FIG. 35 illustrates a diagram describing an example of operating by the winding number operator 150 of an initial winding number for a pixel, according to an embodiment.

Referring to FIG. 35, a path 3520 is present at a right side of a tile 3510. In an example, the tile 3510 is in the shape of a rectangle. The winding number operator 150 selects a side 3511 nearest the path 3520, from among four sides of the tile 3510. Additionally, the winding number operator 3510 compares a location of two vertices $T_1$ and $T_2$ included in the side 3511 to a location of the path 3520. For example, assuming that the two vertices $T_1$ and $T_2$ are present at a left side of the path 3520 and the path 3520 proceeds in a clockwise direction, the winding number operator 150 determines an initial winding number $WN_{init}$ for the tile 3510 as one (1). Assuming that the two vertices $T_1$ and $T_2$ are present at the left side of the path 3520 and the path 3520 proceeds in a counterclockwise direction, the winding number operator 150 determines an initial winding number $WN_{init}$ for the tile 3510 to be −1. Assuming that any of the two vertices $T_1$ and $T_2$ is present at the right side of the path 3520, the winding number operator 150 determines an initial winding number $WN_{init}$ for the tile 3510 as zero (0).

As described above with reference to FIG. 35, in response to the winding number operator 150 operating an initial winding number $WN_{init}$ for a tile, cost to operate and store the initial winding number $WN_{init}$ for the tile, which is performed by the binner unit 140, is reduced. In other words, in accordance with some of the many advantages of the various embodiments described above, while the initial winding number $WN_{init}$ of the tile is stored and updated, the binner 140 stores data therein or in a memory (not shown) or read data from the memory (not shown) at least once. Accordingly, if the winding number operator 150 operates an initial winding number $WN_{init}$ for a tile, time or cost to operate hardware is reduced.

In response to the winding number operator 150 operating an initial winding number $WN_{init}$ for a tile, cost needed for the binner 140 to transmit the initial winding number $WN_{init}$ of the tile to the winding number operator 150 is reduced.

Referring back to FIG. 1, the pixel shader determines a color corresponding to a pixel based on a winding number WN for a pixel.

For example, the pixel shader determines a color corresponding to each pixel based on a predetermined rule. The predetermined pixel refers to one of a first rule of allocating a color value to pixels having a winding number with a value other than zero (0), and a second rule of allocating a color value to pixels having a winding number that is an odd number. Hereinafter, an example of determining a color corresponding to a pixel, which is performed by the pixel shader, is described with reference to FIGS. 36A through 36C.

Figure 36B:
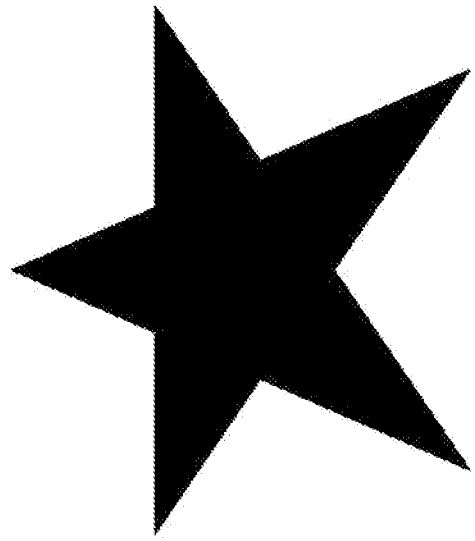
FIGS. 36A through 36C illustrate a diagram describing an example of determining by a pixel shader a color corresponding to each pixel included in a frame, according to an embodiment.
Figure 36C:
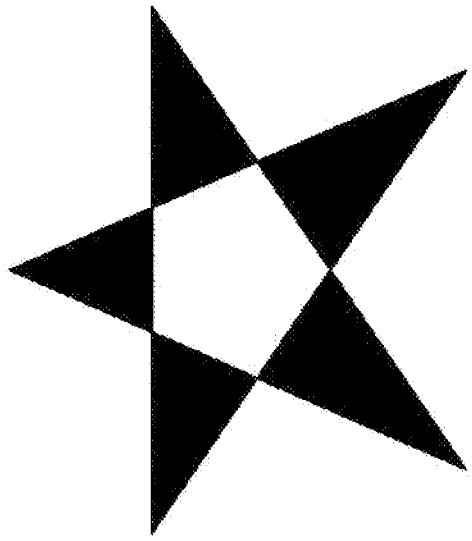
Figure 36A:
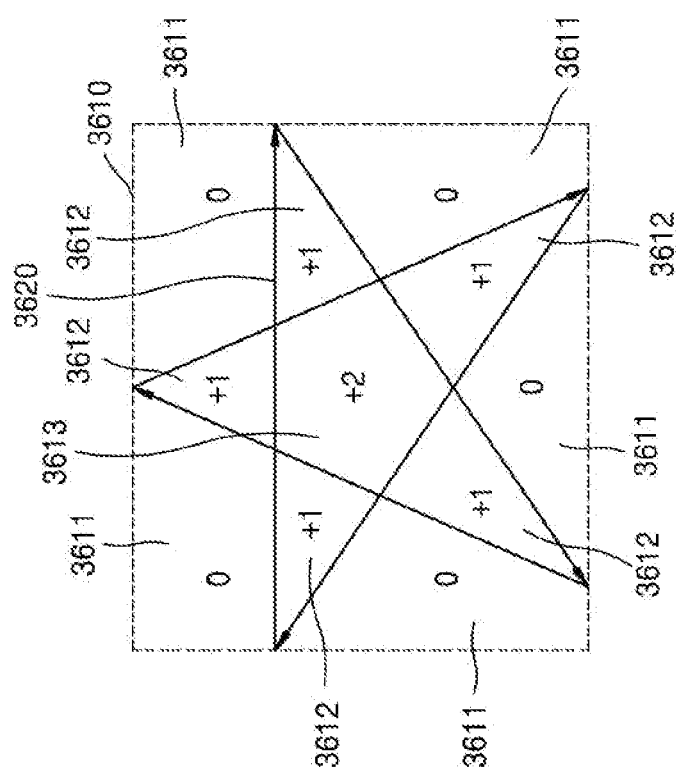

FIGS. 36A through 36C illustrate a diagram describing an example of determining by the pixel shader of a color corresponding to each pixel included in a frame, according to an embodiment.

FIG. 36A illustrates a diagram showing a winding number for each pixel included in a frame 3610. FIG. 36B illustrates a diagram showing a result of allocating a color value to each pixel according to the first rule. FIG. 36C illustrates a diagram showing a result of allocating a color value to each pixel according to the second rule.

Referring to FIG. 36A, a winding number for each pixel included in an area 3611 is operated as zero (0), a winding number for each pixel included in an area 3612 is operated to be +1, and a winding number for each pixel included in an area 3613 is operated to be +2.

As an example, the pixel shader assigns a color to each pixel based on the first rule. The first rule refers to assigning a color value to pixels having a winding number other than zero (0). Referring to FIG. 36B, the pixel shader sets a color for pixels included in the area 3612 and the area 3613, as shown in FIG. 36A. According to the first rule, the pixel shader determines not to assign a color to pixels included in the area 3611.

As another example, the pixel shader determines a color corresponding to each pixel based on the second rule. The second rule refers to assignment of a color value to pixels having a winding number that is an odd number. An example in which a winding number is an odd number refers to a case when an absolute value of a winding number of a pixel is an odd number. For example, if a winding number is +3, the winding number is determined to be an odd number. If a winding number is −3, the winding number is also determined to be an odd number. Additionally, if a winding number is zero (0), the winding number is determined to be an even number. Referring to FIG. 36C, the pixel shader sets a color for pixels included in the area 3612, shown in FIG. 36A. According to the second rule, the pixel shader determines not to set a color for pixels included in the areas 3611 and 3613.

Additionally, the pixel shader allocates a color value to pixels for which it is determined that a color is to be set.

In accord with some of the many advantages associated with the various embodiments described above, because the rendering apparatus 100 performs tile binning independently for each path, time and cost needed to operate the rendering apparatus 100 and, therefore, involving power consumption, is reduced. Additionally, efficiency of the rendering apparatus 100 is enhanced by removing identification values of paths, which are unnecessarily allocated to tiles included in a frame.

Additionally, because the rendering apparatus 100 operates a winding number for pixels included in tiles through which a path passes, from among pixels included in a frame, an operation speed of the rendering apparatus 100 is enhanced. Additionally, because the rendering apparatus 100 operates a winding number for each pixel without having to use a stencil buffer, a problem that excessive or redundant memory input/output occurs when a stencil buffer is used is resolved.

Additionally, because the rendering apparatus 100 generates a winding number in parallel for each pixel included in a frame, path rendering is performed quickly, and high-resolution rendering is performed in quick time.

The assemblers, shaders, binners, operators, units, buffers, and other components illustrated in FIGS. 1, 2A, 10, 13, and 22 that perform the operations described herein with respect to FIGS. 3, 8, 11, 14, 16, 19, 23, and 25 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3, 8, 11, 14, 16, 19, 23, and 25. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 8, 11, 14, 16, 19, 23, and 25 that perform the operations described herein with respect to other figures are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing tile binning, comprising:
obtaining information about a plurality of paths defining an object to be rendered,
the plurality of paths including at least a first path and a second path;
classifying the first path into a first group and the second path into a second group based on shapes of the paths,
the first group being a group of one or more edges,
the second group being a group of one or more curves,
the one or more edges each being a straight line connecting two different vertices to each other, and the one or more curves each being a curved line connecting a plurality of vertices to each other; and
performing tile binning based on the classification, the tile binning including, allocating an identifier of the first path to an edge list of each of tiles, from among a plurality of tiles included in a frame, that have a first spatial relationship with the first path, allocating an identifier of the second path to a curve list of each of tiles, from among the plurality of tiles, that have a second spatial relationship with the second path, and removing the identifier of the first path allocated to the edge list of at least one tile, from among the tiles that have a first spatial relationship with the first path, based on a position of the at least one tile relative to other tiles from among the tiles that have a first spatial relationship with the first path.

2. The method of claim 1, wherein the performing of the tile binning comprises:

selecting tiles through which the first path passes, from among the plurality of tiles; and assigning, to the selected tiles and one of the tiles arranged in one direction from the selected tiles, an identification value of the first path.

3. The method of claim 2, wherein the selected tiles comprise a first tile, which comprises a starting point of the first path and a second tile, which comprises an end point of the first path.

4. The method of claim 2, wherein the direction is one of a left direction, a right direction, an upward direction, and a downward direction with respect to locations of the selected tiles.

5. The method of claim 2, further comprising:

setting a bounding box of the frame based on a plurality of coordinates corresponding to vertices defining the first path; and allocating the identification value to a tile included in the bounding box.

6. The method of claim 5, wherein the bounding box is rectangular shaped, and a diagonal of the bounding box connects a first coordinate to a second coordinate of the plurality of coordinates, wherein the first coordinate is determined based on a maximum value of values of horizontal components and a maximum value of values of vertical components, and the second coordinate is determined based on a minimum value of the values of the horizontal components and a minimum value of the values of the vertical components of the plurality of coordinates.

7. The method of claim 2, further comprising:

calculating an initial winding number for a tile arranged in a direction away from a third tile selected from the selected tiles that comprise the first path, wherein the third tile is different from a first tile that comprises a starting point of the first path and a second tile that comprises an end point of the first path and is among the selected tiles that comprise the first path.

8. The method of claim 7, wherein the calculating of the initial winding number comprises calculating the initial winding number based on a form in which the first path passes through the third tile.

9. The method of claim 8, wherein the calculating of the initial winding number comprises:

increasing the initial winding number by in response to the first path passing through two boundaries of the third tile that face each other, and traveling in a clockwise direction, and decreasing the initial winding number by in response to the first path passing through two boundaries of the third tile that face each other, and traveling in a counterclockwise direction.

10. The method of claim 8, wherein the calculating of the initial winding number comprises:

decreasing the initial winding number in response to the first path passing through two boundaries of the third tile that face each other, and traveling in a clockwise direction, and increasing the initial winding number in response to the first path passing through two boundaries that face each other, and traveling in a counterclockwise direction.

11. The method of claim 1, wherein the removing the identifier of the first path allocated to the edge list of at least one tile, from among the tiles that have the first spatial relationship with the first path, comprises:

for each of one or more rows in the frame, determining a lowest horizontal component value, from among horizontal components of one or more first tiles, to be a minimum horizontal component value of the row, the one or more first tiles being one or more tiles through which the first path passes, from among tiles included in the row, and removing an identification from one or more tiles in the row in response to the one or more tiles having a horizontal component which is lower than the minimum horizontal component value of the row.

12. The method of claim 1, wherein the removing the identifier of the first path allocated to the edge list of at least one tile, from among the tiles that have the first spatial relationship with the first path, comprises:

for each of one or more columns in the frame, determining a lowest vertical component value, from among vertical components of one or more first tiles, to be a minimum vertical component value of the column, determining a highest vertical component value, from among the vertical components of the one or more first tiles, to be a maximum vertical component value of the column, the one or more first tiles being one or more tiles through which the first path passes, from among tiles included in the column, removing an identification from one or more second tiles in the column in response to the one or more second tiles having a vertical component which is lower than the minimum vertical component value of the column, and removing an identification from one or more third tiles in the column in response to the one or more third tiles having a vertical component which is higher than the maximum vertical component value of the column.

13. The method of claim 1, wherein the performing of the tile binning comprises:

selecting tiles that comprise an outer triangle corresponding to the one of the paths in the second group, from among tiles included in a frame; and assigning, to the selected tiles, an identification value of the second path and a tile arranged in a direction away from the selected tiles.

14. A non-transitory computer-readable recording storage medium having stored thereon a computer program which, when executed by a computer, performs the method of claim 1.

15. An apparatus configured to perform tile binning for tile-based rendering, the apparatus comprising:
  memory storing computer-executable instructions; and
  one or more processors configured to execute the computer-executable instructions such that the one or more processors are configured to,
    obtain information about a plurality of paths defining an object to be rendered, the plurality of paths including at least a first path and a second path,
    classify the first path into a first group and the second path into a second group based on shapes of the paths, the first group being a group of one or more edges, the second group being a group of one or more curves, and
    perform the tile binning based on the classification,
  wherein the one or more edges are each a straight line connecting two different vertices to each other, and the one or more curves are each a curved line connecting a plurality of vertices to each other, and
  wherein the tile binning includes,
    allocating an identifier of the first path to an edge list of each of tiles, from among a plurality of tiles included in a frame, that have a first spatial relationship with the first path,
    allocating an identifier of the second path to a curve list of each of tiles, from among the plurality of tiles, that have a second spatial relationship with the second path, and
    removing the identifier of the first path allocated to the edge list of at least one tile, from among the tiles that have a first spatial relationship with the first path, based on a position of the at least one tile relative to other tiles from among the tiles that have a first spatial relationship with the first path.

16. The apparatus of claim 15, wherein the one or more processors are further configured to,
  select tiles through which the first path passes, from among tiles included in a frame, and
  assign, to the selected tiles and at least one tile arranged in one direction from the selected tiles, an identification value of the first path.

17. The apparatus of claim 16, wherein the selected tiles comprise a first tile, which comprises a starting point of the first path and a second tile, which comprises an end point of the first path.

18. The apparatus of claim 16, wherein the direction is one of a left direction, a right direction, an upward direction, and a downward direction with respect to locations of the selected tiles.

19. The apparatus of claim 16, wherein the one or more processors are further configured to,
  set a bounding box for the frame based on a plurality of coordinates respectively corresponding to vertices defining the one of the paths in the first group, and
  allocate the identification value to a tile included in the bounding box.

20. The apparatus of claim 19, wherein the one or more processors are further configured such that,
  the bounding box is rectangular shaped, and a diagonal of the bounding box connects a first coordinate to a second coordinate of the plurality of coordinates,
  the one or more processors determine the first coordinate based on a maximum value of values of horizontal components and a maximum value of values of vertical components, and
  the one or more processors determine the second coordinate based on a minimum value of the values of the horizontal components and a minimum value of the values of the vertical components of the plurality of coordinates.

21. The apparatus of claim 16, wherein the one or more processors are further configured to, calculate an initial winding number for a tile arranged in a direction away from a third tile selected from the selected tiles that comprise the one of the paths in the first group,
  wherein the third tile is different from a first tile that comprises a starting point of the first path and a second tile that includes an end point of the first path and is among the selected tiles that include the first path.

22. The apparatus of claim 21, wherein the one or more processors are further configured to calculate the initial winding number based on a form in which the first path passes through the third tile.

23. The apparatus of claim 22, wherein the one or more processors are further configured to,
  increase the initial winding number in response to the first path passing through two boundaries of the third tile that face each other, and traveling in a clockwise direction, and
  decreases the initial winding number in response to the first path passing through two boundaries of the third tile that face each other, and traveling in a counterclockwise direction.

24. The apparatus of claim 22, wherein the one or more processors are further configured to decrease the initial winding number in response to the first path passing through two boundaries of the third tile that face each other, and traveling in a clockwise direction and increasing the initial winding number in response to the first path passing through two boundaries that face each other, and traveling in a counterclockwise direction.

25. The apparatus of claim 15, wherein the one or more processors are further configured such that the removing the identifier of the first path allocated to the edge list of at least one tile, from among the tiles that have the first spatial relationship with the first path, includes, for each of one or more rows in the frame,
  determining a lowest horizontal component value, from among horizontal components of one or more first tiles, to be a minimum horizontal component value of the row,
  the one or more first tiles being one or more tiles through which the first path passes, from among tiles included in the row, and
  removing an identification from one or more tiles in the row in response to the one or more tiles having a horizontal component which is lower than the minimum horizontal component value of the row.

26. The apparatus of claim 15, wherein the one or more processors are further configured such that the removing the identifier of the first path allocated to the edge list of at least one tile, from among the tiles that have the first spatial relationship with the first path, includes, for each of one or more columns in the frame,
  determining a lowest vertical component value, from among vertical components of one or more first tiles, to be a minimum vertical component value of the column,
  determining a highest vertical component value, from among the vertical components of the one or more first tiles, to be a maximum vertical component value of the column,
  the one or more first tiles being one or more tiles through which the first path passes, from among tiles included in the column, removing an identification from one or more second tiles in the column in response to the one or more second tiles having a vertical component which is lower than the minimum vertical component value of the column, and removing an identification from one or more third tiles in the column in response to the one or more third tiles having a vertical component which is higher than the maximum vertical component value of the column.

27. A method of performing tile-based rendering, the method comprising:

obtaining information about a plurality of paths defining an object to be rendered, the plurality of paths including at least a first path and a second path;

classifying the first path into a first group and the second path into a second group based on shapes of the first and second paths, the first group being a group of one or more edges, the second group being a group of one or more curves;

calculating winding numbers of tiles included in a frame based on locations of the first and second paths and directions in which each of the first and second paths proceed;

shading pixels in the frame based on the calculated winding numbers, the one or more edges each being a straight line connecting two different vertices to each other, and the one or more curves each being a curved line connecting a plurality of vertices to each other; and performing tile binning based on the classification, the tile binning including, allocating an identifier of the first path to an edge list of each of tiles, from among a plurality of tiles included in a frame, that have a first spatial relationship with the first path, allocating an identifier of the second path to a curve list of each of tiles, from among the plurality of tiles, that have a second spatial relationship with the second path, and removing the identifier of the first path allocated to the edge list of at least one tile, from among the tiles that have a first spatial relationship with the first path, based on a position of the at least one tile relative to other tiles from among the tiles that have a first spatial relationship with the first path.

28. The method of claim 27, wherein the shading of the pixels comprises shading the pixels based on a rule, and the rule comprises assigning a first color value to pixels having a winding number that is an even number or zero and assigning a second color value to pixels having a winding number that is an odd number.

29. A non-transitory computer-readable recording storage medium having stored thereon a computer program which, when executed by a computer, performs the method of claim 27.

* * * * *